(12) United States Patent  
Silveri

(10) Patent No.: US 7,767,067 B2  
(45) Date of Patent: Aug. 3, 2010

(54) SYSTEM FOR MAINTAINING PH AND SANITIZING AGENT LEVELS OF WATER IN A WATER FEATURE

(76) Inventor: Michael A. Silveri, 986 Fourth Green, Incline Village, NV (US) 89451

( * ) Notice: Subject to any disclaimer, the term of this patent is extended or adjusted under 35 U.S.C. 154(b) by 0 days.

(21) Appl. No.: 12/433,816

(22) Filed: Apr. 30, 2009

(65) Prior Publication Data

US 2009/0212782 A1 Aug. 27, 2009

Related U.S. Application Data

(62) Division of application No. 11/960,688, filed on Dec. 19, 2007, now abandoned, which is a division of application No. 10/997,796, filed on Nov. 24, 2004, now Pat. No. 7,393,450.

(60) Provisional application No. 60/525,584, filed on Nov. 26, 2003.

(51) Int. Cl.  
*G01N 27/26* (2006.01)

(52) U.S. Cl. .................. 204/406; 204/412; 204/416; 204/433; 204/435; 324/438; 210/96.1

(58) Field of Classification Search .......... 204/400, 204/406, 408, 409, 412, 416, 433, 435; 210/85, 210/96.1, 103, 143, 149, 167, 167.11, 198.1, 210/205, 206; 324/425, 438, 439, 446; 205/775, 205/778.5, 787.5

See application file for complete search history.

(56) References Cited

U.S. PATENT DOCUMENTS

| | | |
|---|---|---|
| 2,014,037 A | 9/1935 | Burkett et al. |
| 3,975,271 A | 8/1976 | Saunier et al. |
| 4,033,830 A | 7/1977 | Fletcher, III |
| 4,224,154 A | 9/1980 | Steininger |
| 4,427,772 A | 1/1984 | Kodera et al. |
| 4,783,252 A * | 11/1988 | Benton .......... 204/416 |
| 4,992,156 A | 2/1991 | Silveri |
| 5,019,250 A | 5/1991 | Lorenzen |
| 5,221,444 A | 6/1993 | Silveri |
| 5,240,228 A | 8/1993 | Silveri |
| 5,251,656 A | 10/1993 | Sexton, Sr. |
| 5,320,748 A | 6/1994 | Dupuis |

(Continued)

FOREIGN PATENT DOCUMENTS

WO 9421918 A1 9/1994

*Primary Examiner*—Joseph W Drodge  
(74) *Attorney, Agent, or Firm*—Jerry Turner Sewell

(57) ABSTRACT

A system automatically maintains at least one of a pH level and a sanitizing agent level of water in a water feature. The system includes a sensor assembly responsive to at least one of a pH level of the water and a sanitizing agent level of the water. The system further includes a controller which generates control signals in response to signals from the sensor assembly. The system further includes at least one of a first source containing a sanitizing agent material and a second source containing a pH-modifying material. The system further includes a third source comprising a valve assembly and a third container containing a liquid calibrant material. The valve assembly is responsive to at least a portion of the control signals from the controller by selectively allowing the calibrant material to flow from the third container through the sensor assembly to the water feature.

7 Claims, 45 Drawing Sheets

U.S. PATENT DOCUMENTS

| | | |
|---|---|---|
| 5,359,769 A | 11/1994 | Silveri |
| 5,389,210 A | 2/1995 | Silveri |
| 5,401,373 A | 3/1995 | Silveri |
| 5,422,014 A | 6/1995 | Allen et al. |
| 5,441,073 A | 8/1995 | Hoadley |
| 5,545,310 A | 8/1996 | Silveri |
| 5,580,438 A | 12/1996 | Silveri |
| 5,616,239 A | 4/1997 | Wendell et al. |
| 5,666,987 A | 9/1997 | Combs |
| 5,676,805 A | 10/1997 | Silveri |
| 5,752,282 A | 5/1998 | Silveri |
| 5,759,384 A | 6/1998 | Silveri |
| 5,885,426 A | 3/1999 | Silveri |
| 5,932,093 A | 8/1999 | Chulick |
| 6,007,693 A | 12/1999 | Silveri |
| 6,123,839 A | 9/2000 | Sussman |
| 6,125,481 A | 10/2000 | Sicilano |
| RE37,055 E | 2/2001 | Silveri |
| 6,182,681 B1 | 2/2001 | Robertson et al. |
| 6,238,555 B1 | 5/2001 | Silveri et al. |
| 6,270,680 B1 | 8/2001 | Silveri et al. |
| 6,309,538 B1 | 10/2001 | Khan |
| 6,340,431 B2 | 1/2002 | Khan |
| 6,536,272 B1 | 3/2003 | Houston et al. |
| 6,609,070 B1 * | 8/2003 | Lueck ........................ 702/50 |
| 6,643,108 B2 * | 11/2003 | Cline et al. .................... 361/42 |
| 6,653,842 B2 * | 11/2003 | Mosley et al. ............... 324/446 |
| 6,894,502 B2 * | 5/2005 | Feng et al. .................. 324/438 |
| 7,393,450 B2 | 7/2008 | Silveri |
| 2002/0079901 A1 * | 6/2002 | Rezvani ..................... 324/426 |

* cited by examiner

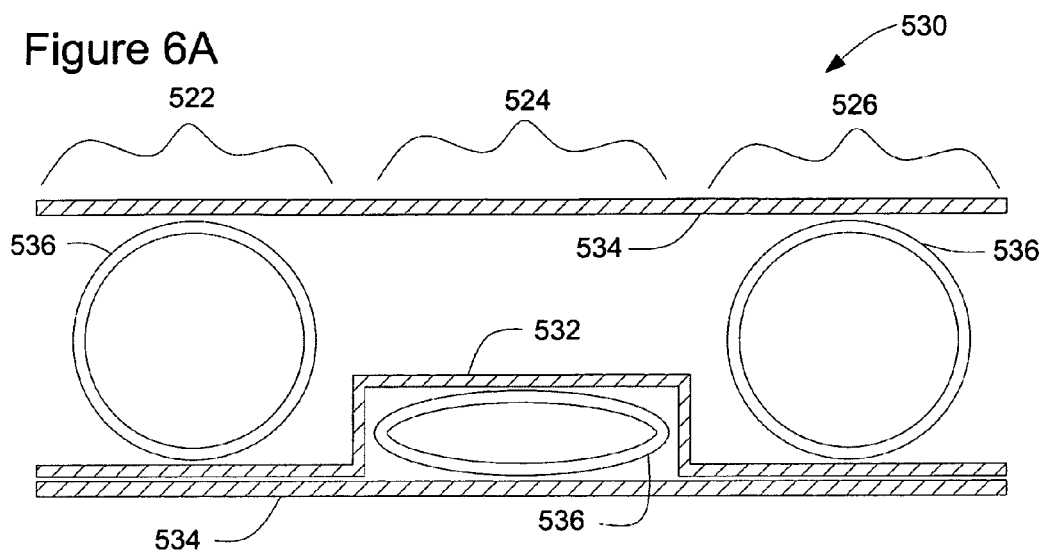
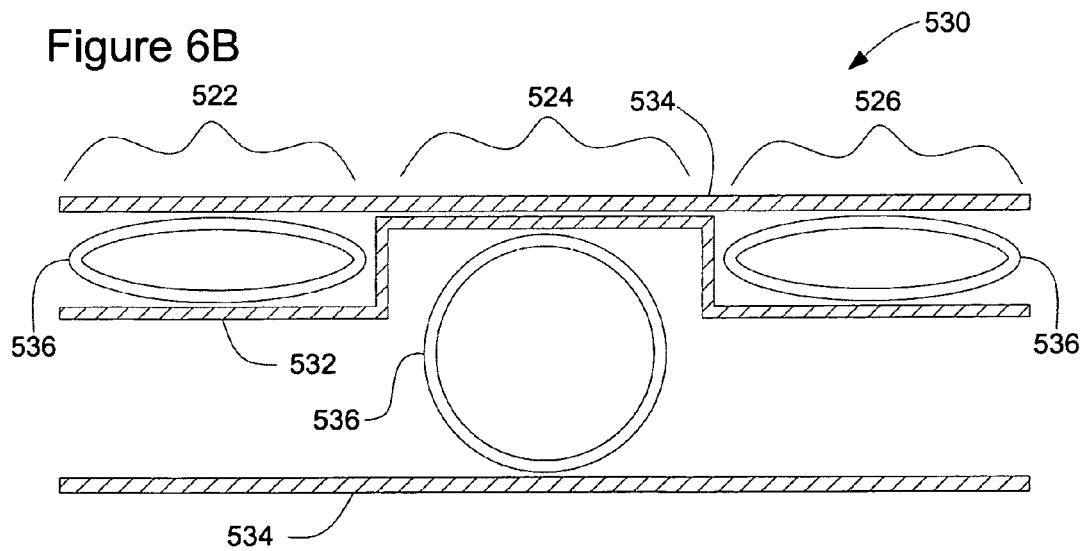

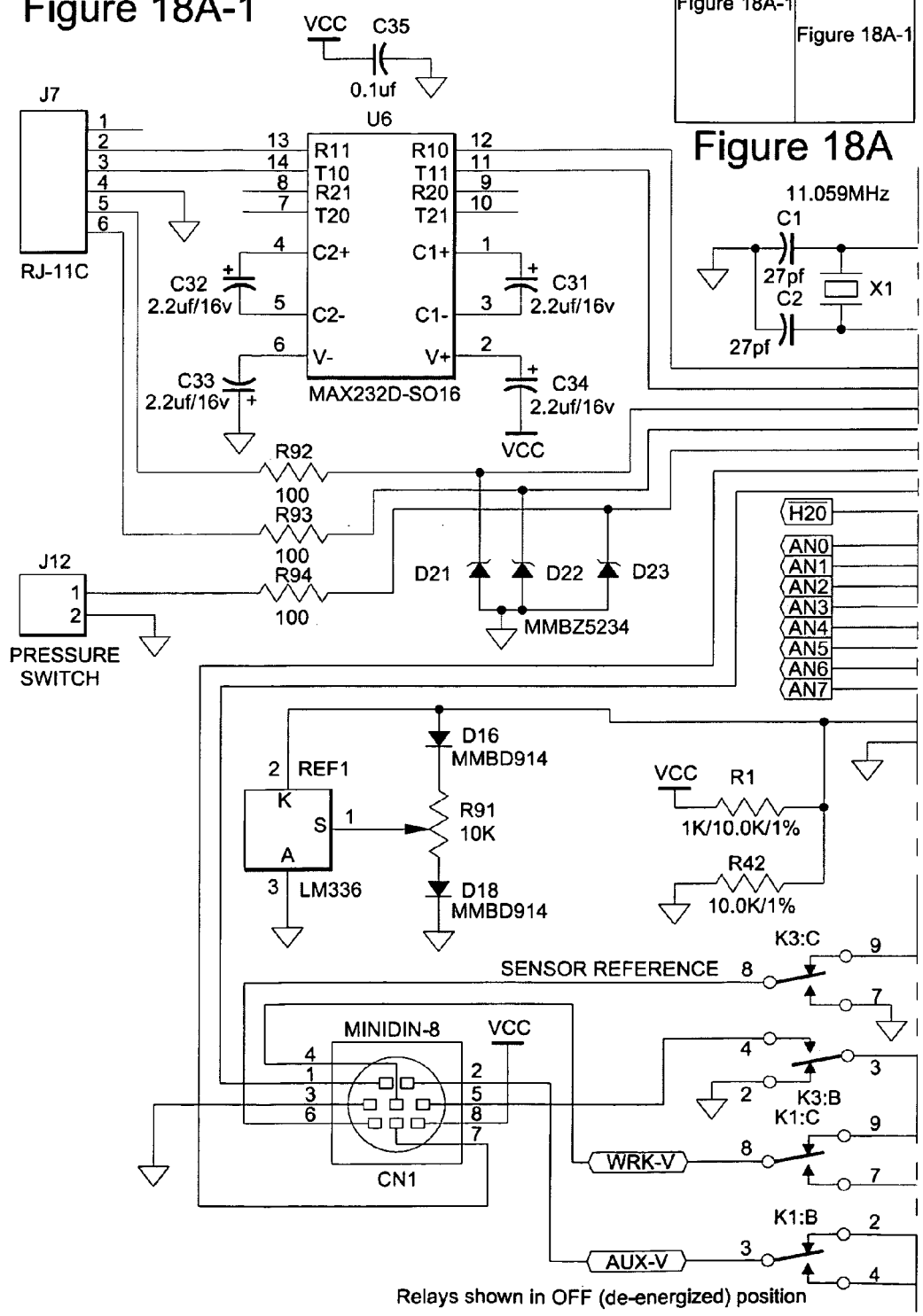
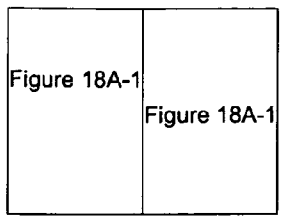
Figure 18A
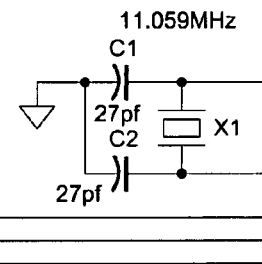

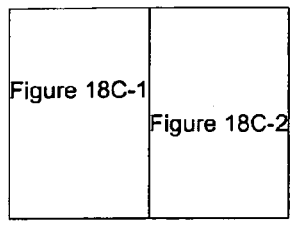
Figure 18C
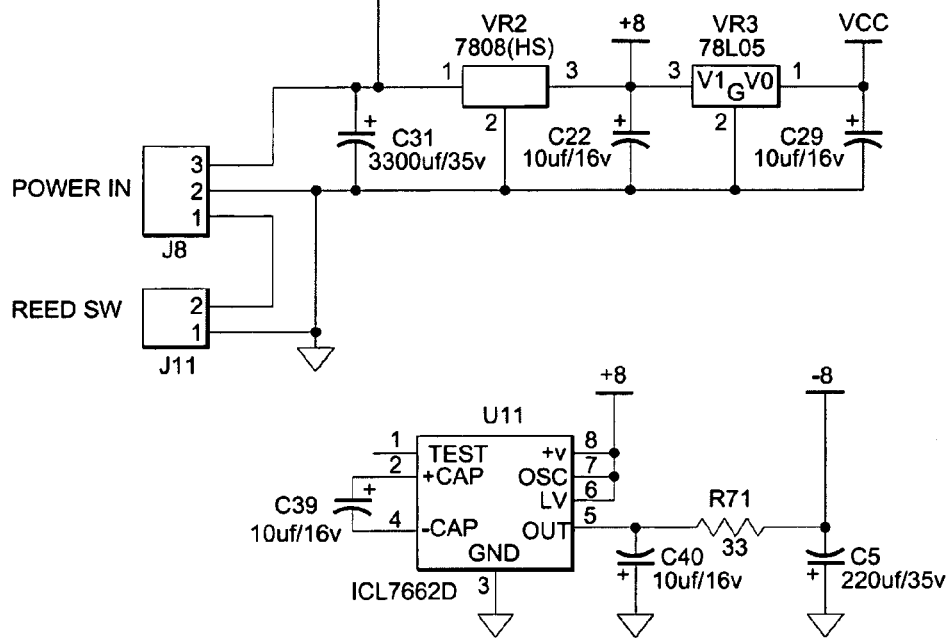
Figure 18C-1
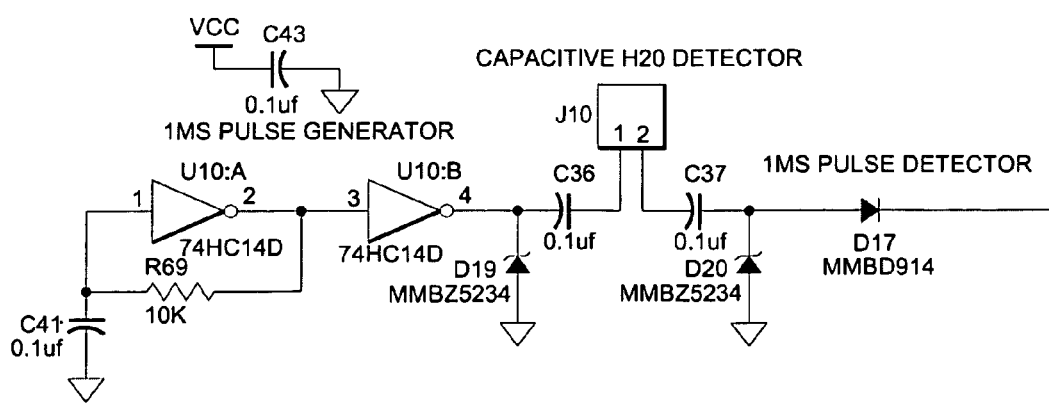

SYSTEM FOR MAINTAINING PH AND SANITIZING AGENT LEVELS OF WATER IN A WATER FEATURE

RELATED APPLICATIONS

The present invention is a divisional application of U.S. patent application Ser. No. 11/960,688 filed on Dec. 19, 2007, now abandoned which is a divisional application of U.S. patent application Ser. No. 10/997,796 filed on Nov. 24, 2004 (now U.S. Pat. No. 7,393,450 issued on Jul. 1, 2008), which claims the benefit of U.S. Provisional Application No. 60/525,584, filed on Nov. 26, 2003, all of which are incorporated by reference herein in their entireties.

BACKGROUND OF THE INVENTION

1. Field of the Invention

The present application relates generally to water maintenance systems for a water feature, and more specifically, to an automated water maintenance system.

2. Description of the Related Art

Balancing the water chemistry (e.g., pH levels and sanitizing agent levels) in water features (e.g., spas or swimming pools) can be a challenging and expensive operation. In particular, "balancing the water" in a spa can be much more challenging than in a pool due to the relatively small volume of water in spas. The number of people per unit volume of water is typically much higher in a spa than in a pool. For example, four people in a 300-gallon spa are comparable to 150 people in an average swimming pool. Because the water chemistry is affected by the frequency of use and the number of bathers, maintaining the water chemistry in spas can require more diligence to maintain than in pools.

Because of the relatively small volume of water in spas, users have significant difficulty in adjusting the pH level using highly concentrated pH-modifying materials, such as acidic materials (e.g., sodium bisulfate) or alkaline materials (e.g., sodium carbonate). In addition, the effects of the acidity or alkalinity of other chemicals, which are added in considerable volumes to sanitize the water, must be addressed in adjusting the pH level. For example, devices such as chlorine or bromine generators tend to increase the pH of the water as a byproduct of the chlorine or bromine generation. Excessive pH levels, either acidic or alkaline, will generally remain in the water until corrected. The persistence of low or high pH levels can cause or contribute to corrosion of metal components of the heater and to scaling of the heater. In addition, because sanitizing agents such as chlorine are less efficient at high pH levels, improper pH levels can lead to unsanitary conditions.

Control of the sanitizing agent (e.g., chlorine or bromine) to ensure that a spa is sanitary is similarly difficult and expensive. Existing systems require operator monitoring and intervention to deal with deviations or low levels of the sanitizing agent. For example, in spas and swimming pools, simple floating dispensers are often used. Such dispensers must be adjusted to a proper feed rate and require attention over a period of days. Variations of the frequency of use of the water feature by bathers or other system parameters can render such devices useless and can require supplemental addition of sanitizing agents to the water. There is a certain forgiveness with the addition of excess sanitizing agent, since excess levels will eventually dissipate or will otherwise be consumed. However, an overfeed condition in which too much sanitizing agent is used can result in corrosion of metal components of the water feature in general, and in the heater in particular.

Manual control of the pH level typically requires the user to test the water at regular intervals using a test kit or test strip and then to "adjust" the pH level by adding several ounces of an acidic material (e.g., sodium bisulfate for spas and muriatic acid for swimming pools). The user must then test again after several hours to ensure that the proper amount of acidic material has been added. If the pH level is still too high, the user must add additional acidic material and wait several hours once again. If the pH level is too low (sometimes the result of today's busy, impatient consumer adding too much acidic material), the user must add a pH-increasing chemical to the water. This repeated addition of chemicals to the water of the water feature in an attempt to control the pH level and the sanitizing agent level is sometimes referred to as "chemical warfare." Some frustrated consumers often end up draining their spas and starting over with fresh water rather than spending the time and effort to "balance the water." Other frustrated consumers simply ignore the pH level of the water altogether, which can result in unsanitary conditions due to the reduced efficacy of the sanitizing agent.

Some systems for control of pH levels and/or sanitizing agent levels utilize a peristaltic or diaphragm pump and an open tank. The pump forces a solution into the plumbing of the water feature, usually downstream of the water heater. Peristaltic pumps often require frequent tubing replacements (e.g., every three to six months, depending on usage). Other systems utilize cartridges which are connected via flexible tubing to both the suction and pressure plumbing of the water circulation system. Such systems have the disadvantage of feeding concentrated chlorine at a low pH level directly into the circulation system ahead of the heater, pump, and filter, potentially causing corrosion of these components. Such older systems have largely been replaced by inline feeders which introduce sanitizing agent directly into the plumbing through a pressure differential. These systems can be placed after the heater and other circulation system components.

Other systems for control of sanitizing agent levels utilize a venturi feed and an open tank. The venturi feed creates a vacuum which draws solution into a tee where the solution is mixed with the water being circulated. The feed can be controlled through the use of valves or by manually adjusting a valve on the vacuum side of the tee. Such systems are prone to clogging of the injector orifices.

Erosion feeders are most commonly used on residential and small commercial pools for control of sanitizing agent levels. For example, a feeder containing chlorine tablets can be installed in the return-line plumbing. The tablets are exposed to the flowing stream, and gradually dissolve. Such systems are typically manually adjusted.

Liquid feeders are most commonly used on residential pools. In certain such systems, an open tank feeder containing liquid chlorine is connected to the suction and pressure sides of the circulation system. Air is allowed into the feeder to replace the solution as the contents are depleted. A float valve in the feeder maintains the water level in the feeder. Such systems can not be installed below the water level of the water feature due to backflow. Concentrated chlorine enters the water pump and water heater in this arrangement and can damage various equipment of the water feature. Additionally, failure of the float system can cause loss of pool water.

Automatic control of the pH level of a water feature is further complicated by periodic recalibration of the pH controller. Typical pH electrodes have a reference potential defined by a reference gel or solution. This reference material is depleted through migration through the porous junction, resulting in changes of the reference potential. Typically, to calibrate an automatic pH control system, a user must prepare a standard buffer solution (e.g., a pH 7.0 buffer) as a standardizing calibrant, and put the pH controller in calibration mode. The user removes the pH sensor, places it in the container of buffer solution, and recalibrates the pH controller. This procedure can be quite difficult for a user. In addition, the location of the pH sensor can make it difficult to access. The recalibration process is typically performed monthly, or even weekly in some cases, and can require more effort than simply testing and adding chemicals.

SUMMARY OF THE INVENTION

In certain embodiments, a system automatically maintains at least one of a pH level and a sanitizing agent level of water in a water feature. The system is fluidly coupled to the water feature. The system comprises a sensor assembly fluidly coupled to the water feature. The sensor assembly is responsive to at least one of a pH level of the water and a sanitizing agent level of the water. The sensor assembly is responsive to the pH level by generating a pH signal corresponding to the pH level. The sensor assembly is responsive to the sanitizing agent level of the water by generating a sanitization signal corresponding to the sanitizing agent level. The system further comprises a controller operatively coupled to the sensor assembly. The controller generates control signals in response to at least one of the pH signal and the sanitization signal. The system further comprises at least one of a first source and a second source. The first source comprises a first valve assembly and a first container containing a sanitizing agent material. The first valve assembly is responsive to at least a portion of the control signals from the controller by selectively allowing the sanitizing agent material to flow from the first container to the water feature. The second source comprises a second valve assembly and a second container containing a pH-modifying material. The second valve assembly is responsive to at least a portion of the control signals from the controller by selectively allowing the pH-modifying material to flow from the second container to the water feature. The system further comprises a third source comprising a third valve assembly and a third container containing a liquid calibrant material. The third valve assembly is responsive to at least a portion of the control signals from the controller by selectively allowing the calibrant material to flow from the third container through the sensor assembly to the water feature.

In certain embodiments, a sanitization system automatically controls the pH level and sanitizing agent level of a water feature. The sanitization system comprises a water circulation system in fluid communication with the water feature. The sanitization system further comprises a sanitizing agent source in fluid communication with the water circulation system. The sanitizing agent source comprises a sanitizing agent material. The sanitization system further comprises a pH-modifying material source in fluid communication with the water circulation system. The pH-modifying material source comprises a pH-modifying material. The sanitization system further comprises a sanitizing agent sensor including a probe in fluid contact with water in the water circulation system. The sanitizing agent sensor generates a sanitizing agent output signal indicative of a sanitizing agent level in the water. The sanitization system further comprises a pH sensor including a probe in fluid contact with the water in the water circulation system. The pH sensor generates a pH output signal indicative of a pH level in the water. The sanitization system further comprises a calibrant material source in fluid communication with at least one of the sanitizing agent sensor and the pH sensor. The calibrant material source comprises a calibrant material having at least one of a predetermined pH level and a predetermined sanitizing agent level. The sanitization system further comprises a control system responsive to the sanitizing agent output signal by selectively switching the sanitizing agent source between an active state in which the sanitizing agent source adds sanitizing agent material to the water and an inactive state in which the sanitizing agent source does not add sanitizing agent material to the water so as to maintain the sanitizing agent level within a first preset range. The control system is further responsive to the pH output signal by selectively switching the pH-modifying material source between an active state in which the pH-modifying material source adds pH-modifying material to the water and an inactive state in which the pH-modifying material source does not add pH-modifying material to the water so as to maintain the pH level within a second preset range. The control system is further configured to recalibrate at least one of the sanitizing agent output signal and the pH output signal by selectively switching the calibrant material source between an active state in which the calibrant material source introduces calibrant material to at least one of the sanitizing agent sensor and the pH sensor and an inactive state in which the calibrant material source does not introduce calibrant material to at least one of the sanitizing agent sensor and the pH sensor.

In certain embodiments, a system measures a chemical level of water in a water feature. The system is fluidly coupled to the water feature. The system comprises a sensor assembly fluidly coupled to the water feature. The sensor assembly is responsive to the chemical level of the water by generating a signal corresponding to the chemical level. The system further comprises a controller operatively coupled to the sensor assembly. The controller uses a calibration function to calculate the chemical level in response to the signal generated by the sensor assembly. The controller generates a calibrant control signal. The system further comprises a calibrant source comprising a calibrant material. The calibrant source is responsive to the calibrant control signal from the controller by selectively allowing the calibrant material to flow from the calibrant source to the sensor assembly. The controller calculates the calibration function while the calibrant material flows from the calibrant source to the sensor assembly.

In certain embodiments, a source controllably adds a chemical material to a water circulation system of a water feature. The source comprises a container which comprises an inlet and an outlet. The container further comprises a vessel having a lower portion and an upper portion. The lower portion contains the chemical material and is removably coupled and fluidly coupled to the inlet. The upper portion of the vessel is removably coupled and fluidly coupled to the outlet. The source further comprises a first valve fluidly coupled to the water circulation system and to the inlet. The first valve is selectively opened to fluidly couple the water circulation system and the inlet. The source further comprises a second valve fluidly coupled to the water circulation system and to the outlet. The second valve is selectively opened to fluidly couple the water circulation system and the outlet. Upon opening the first valve and the second valve, water flows from the water circulation system through the inlet, into the lower portion of the vessel, mixes with the chemical material, flows out of the upper portion of the vessel, through the outlet to the water circulation system.

In certain embodiments, a source controllably adds a liquid chemical material to a water circulation system of a water feature. At least a portion of the circulation system comprises water having a first pressure. The source comprises a container comprising an inlet and an outlet. The container further comprises a vessel containing the liquid chemical material. The vessel is removably coupled and fluidly coupled to the inlet and to the outlet. The source further comprises a first valve fluidly coupled to a fluid at a second pressure and to the inlet. The first valve is selectively opened to expose the inlet to the second pressure. The second pressure is larger than the first pressure. The source further comprises a second valve fluidly coupled to the outlet and to the portion of the circulation system comprising water having the first pressure. The second valve is selectively opened to fluidly couple the outlet and the portion of the circulation system comprising water having the first pressure. Upon opening the first valve and the second valve, the liquid chemical material flows from the vessel through the outlet to the portion of the circulation system comprising water having the first pressure.

In certain embodiments, a sensor assembly senses a chemical level in water of a water feature. The sensor assembly comprises a pH sensor. The sensor assembly further comprises a sanitizing agent sensor. The pH sensor and the sanitizing agent sensor share a common reference electrode.

BRIEF DESCRIPTION OF THE DRAWINGS

FIGS. 6A and 6B schematically illustrate two states of an exemplary first valve assembly comprising a pinch valve compatible with embodiments described herein.

DETAILED DESCRIPTION OF A PREFERRED EMBODIMENT

System Overview

Figure 1:
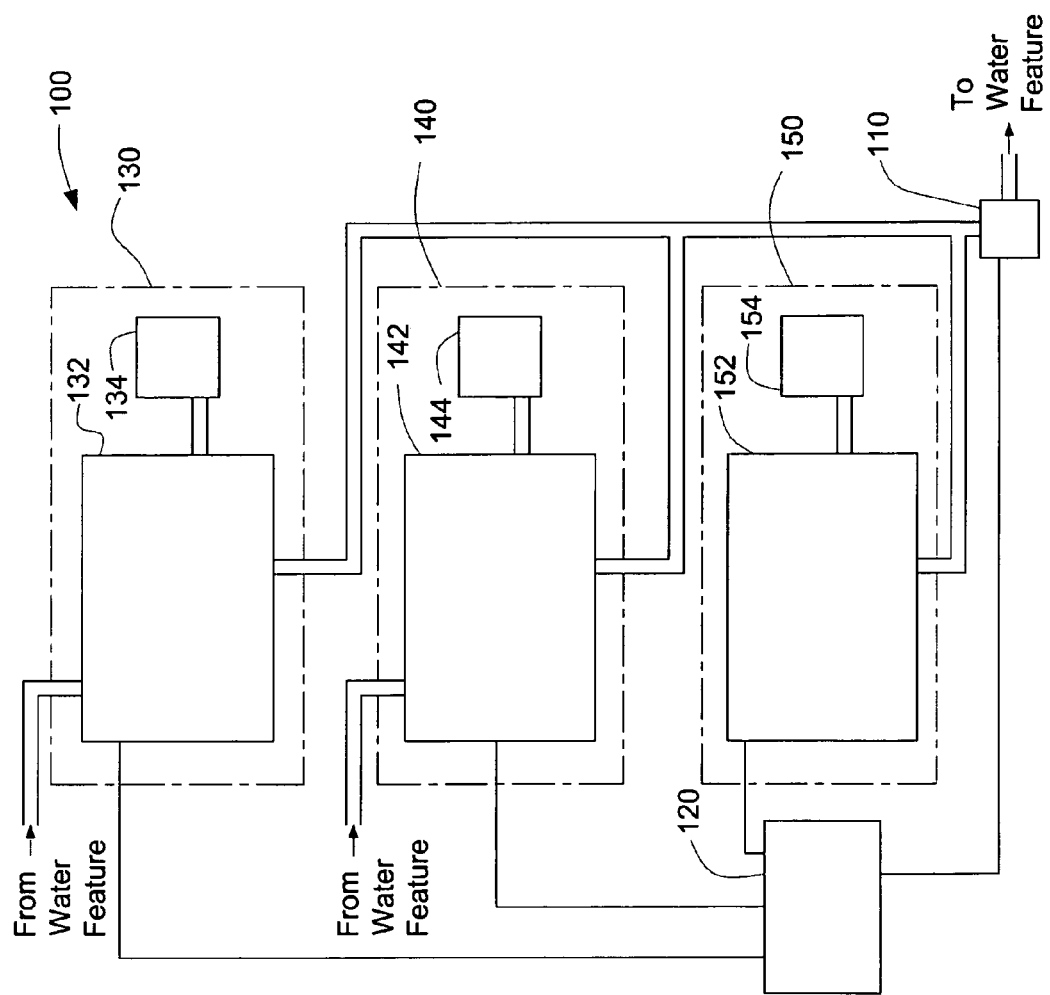
FIGS. 1-4 schematically illustrate various exemplary systems for automatically maintaining at least one of a pH level and a sanitizing agent level of water in the water feature.

FIG. 1 schematically illustrates an exemplary system 100 fluidly coupled to a water feature (e.g., spa, Jacuzzi, jetted tub, whirlpool bath, or swimming pool) for automatically maintaining at least one of a pH level and a sanitizing agent level of water in the water feature. As used herein, the term "fluidly coupled" describes configurations having a fluid pathway for direct fluid flow from a first component to a second component, and configurations having a fluid pathway for indirect fluid flow from one component to another (e.g., fluid flow through one or more additional components to flow from the first component to the second component).

The system 100 comprises a sensor assembly 110 fluidly coupled to the water feature. The sensor assembly 110 is responsive to at least one of a pH level of the water and a sanitizing agent level of the water. The sensor assembly 110 is responsive to the pH level by generating a pH signal corresponding to the pH level. The sensor assembly 110 is responsive to the sanitizing agent level of the water by generating a sanitization signal corresponding to the sanitizing agent level. The system 100 further comprises a controller 120 operatively coupled to the sensor assembly 110. The controller 120 generates control signals in response to at least one of the pH signal and the sanitization signal. The system 100 further comprises at least one of a first source 130 and a second source 140. The first source 130 comprises a first valve assembly 132 and a first container 134 containing a sanitizing agent. The first valve assembly 132 is responsive to at least a portion of the control signals from the controller 120 by selectively allowing the sanitizing agent to flow from the first container 134 to the water feature. The second source 140 comprises a second valve assembly 142 and a second container 144 containing a pH-modifying material. The second valve assembly 142 is responsive to at least a portion of the control signals from the controller 120 by selectively allowing the pH-modifying material to flow from the second container 144 to the water feature. The system 100 further comprises a third source 150 comprising a third valve assembly 152 and a third container 154 containing a liquid calibrant material. The third valve assembly 152 is responsive to at least a portion of the control signals from the controller 120 by selectively allowing the calibrant material to flow from the third container 154 through the sensor assembly 110 to the water feature.

Figure 2:
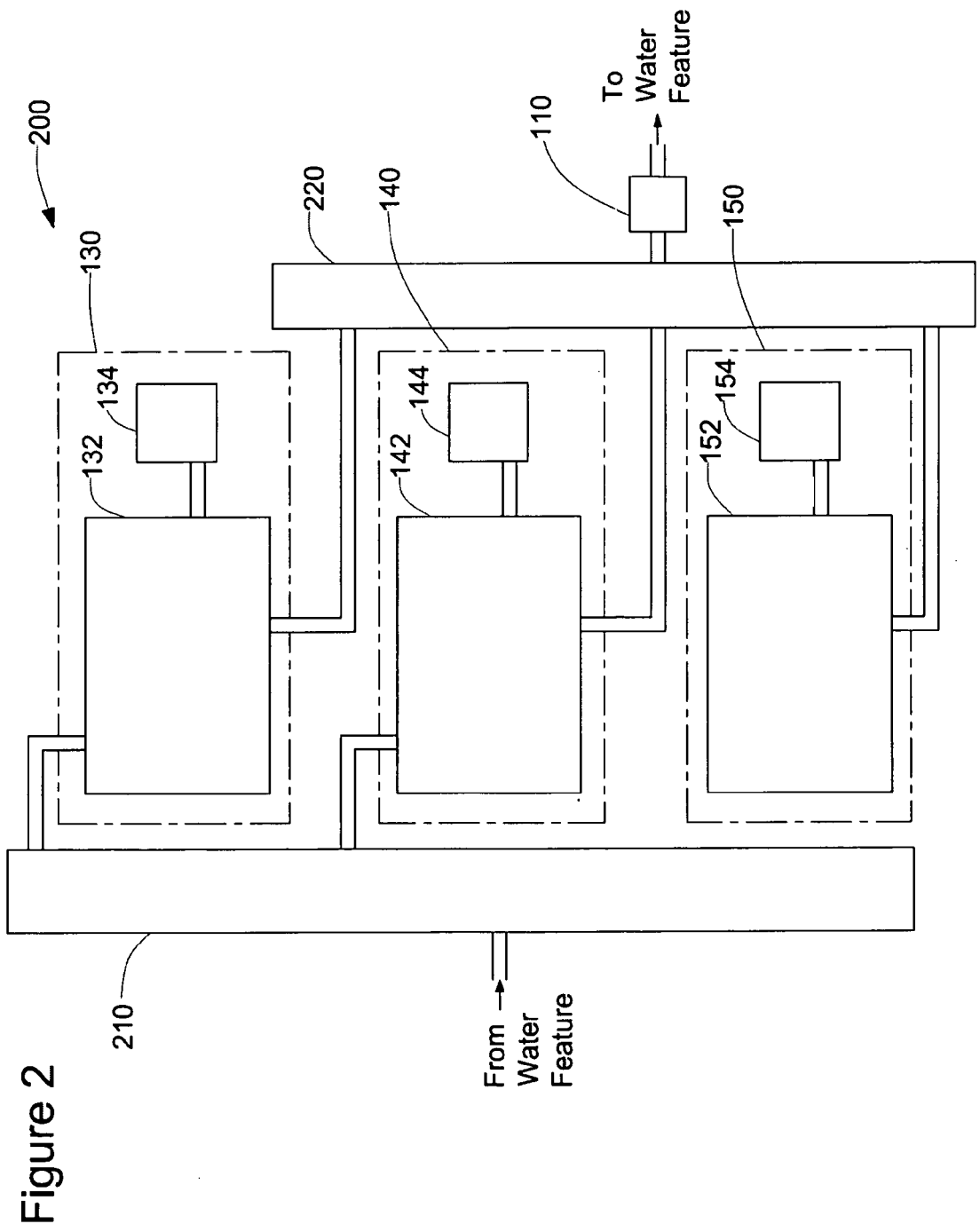

FIG. 2 schematically illustrates another exemplary system 200 fluidly coupled to a water feature for automatically maintaining at least one of a pH level and a sanitizing agent level of water in the water feature. The system 200 comprises the sensor assembly 110, controller (not shown in FIG. 2 for clarity), first source 130, first valve assembly 132, first container 134, second source 140, second valve assembly 142, second container 144, third source 150, third valve assembly 152, and third container 154 as schematically illustrated in FIG. 1.

The system 200 schematically illustrated by FIG. 2 further comprises a pressure manifold 210 fluidly coupled to the water feature, the first valve assembly 130, and the second valve assembly 140. The system 200 further comprises a vacuum manifold 220 fluidly coupled to the first valve assembly 130, the second valve assembly 140, the third valve assembly 150, and the sensor assembly 110. The vacuum manifold 220 is fluidly coupled to the water feature through the sensor assembly 110. The pressure manifold 210 provides ports for connecting tubing from the circulation system of the water feature to the first source 130, the second source 140, and the third source 150. The vacuum manifold 220 provides ports for connecting tubing from the first source 130, the second source 140, and the third source 150 to the sensor assembly 110, thereby allowing sterilizing agent and/or pH-modifying material, or calibrant material to flow through the sensor assembly 110. In certain embodiments, the pressure manifold 210 provides the motive force through the first container 134 and the second container 144 and augments the lower pressure from the vacuum manifold 220. In certain embodiments, the lower pressure of the vacuum manifold 220 is below atmospheric pressure.

Figure 3:
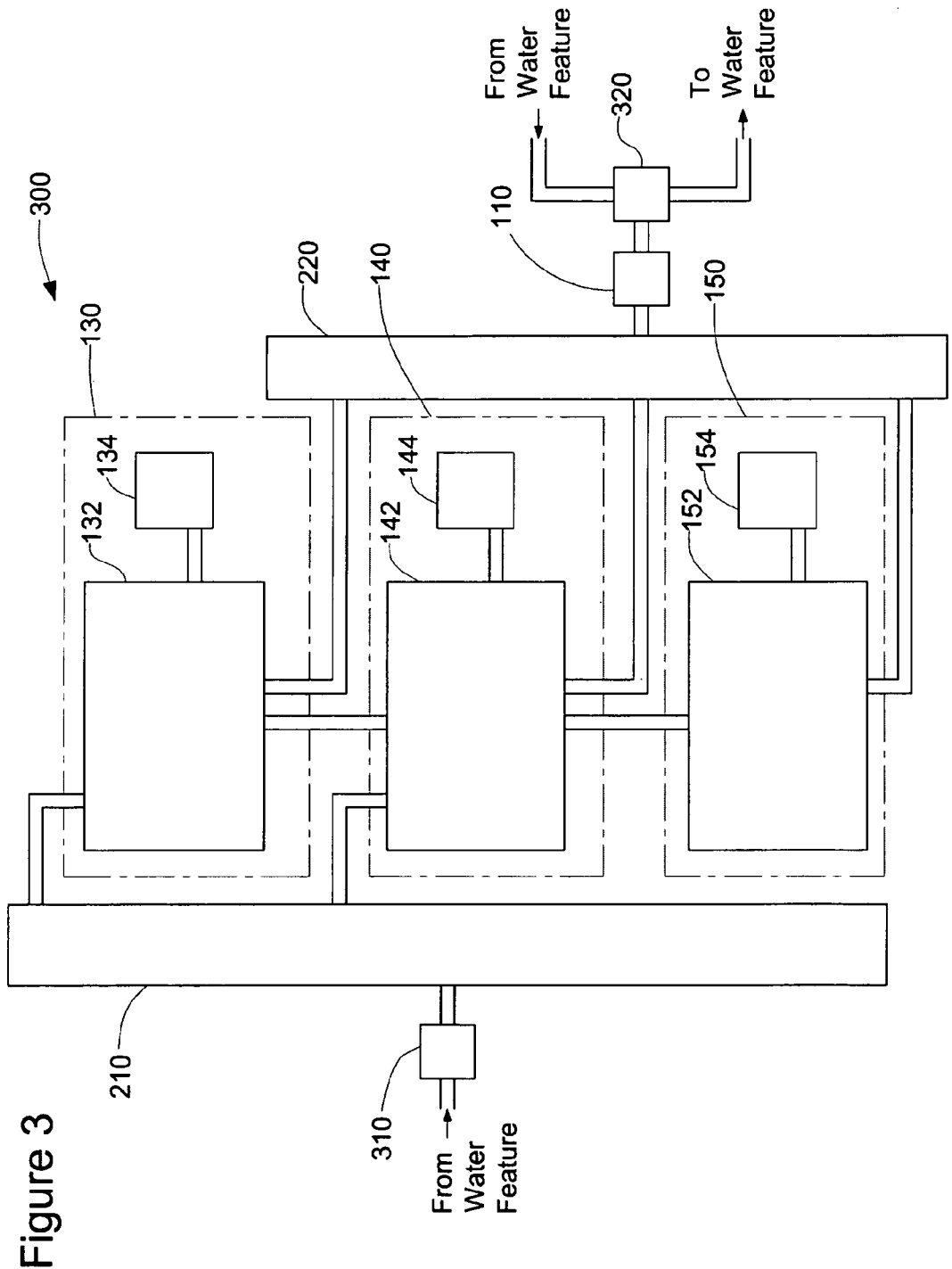

FIG. 3 schematically illustrates another exemplary system 300 fluidly coupled to a water feature for automatically maintaining at least one of a pH level and a sanitizing agent level of water in the water feature. The system 300 comprises the sensor assembly 110, controller (not shown in FIG. 3 for clarity), first source 130, first valve assembly 132, first container 134, second source 140, second valve assembly 142, second container 144, third source 150, third valve assembly 152, and third container 154 as schematically illustrated in FIG. 1. The system 300 further comprises the pressure manifold 210 and the vacuum manifold 220 as schematically illustrated in FIG. 2. In the system 300 schematically illustrated by FIG. 3, the first valve assembly 132 is fluidly coupled to the second valve assembly 142. Furthermore, the second valve assembly 140 is fluidly coupled to the third valve assembly 150. Each of the first valve assembly 132, the second valve assembly 142, and the third valve assembly 152 is responsive to at least a portion of the control signals from the controller (not shown) by allowing water to flow from the pressure manifold 210, through the first valve assembly 132, through the second valve assembly 142, through the third valve assembly 152, to the vacuum manifold 220.

The system 300 schematically illustrated by FIG. 3 further comprises a flow sensor 310 and a venturi tee 320. The flow sensor 310 is fluidly coupled to a circulation pump line of the water feature and is responsive to a flow rate through the circulation system by generating a flow signal indicative of the flow rate. The controller (not shown) is responsive to the flow signal from the flow sensor 310. In certain embodiments, the flow sensor 310 comprises a flow switch fluidly coupled to the pressure manifold 210, as schematically illustrated by FIG. 3. The flow switch indicates whether the water flow through the system 300 is above an adequate flow rate for operation of the system 300 (e.g., approximately 10 gallons per hour). In other embodiments, the flow sensor 310 comprises a paddle wheel flow sensor. In certain other embodiments, the flow sensor 310 comprises a differential pressure switch fluidly coupled to the venturi tee 320. The differential pressure switch responds to the pressure before and after the venturi tee 320, thereby measuring the pressure drop through the venturi tee 320 (e.g., approximately 2 pounds per square inch) which indicates whether adequate flow is present for operation of the system 300.

The venturi tee 320 schematically illustrated by FIG. 3 is fluidly coupled to a circulation pump line of the water feature such that water of the water feature flows through the venturi tee 320. In certain embodiments, the venturi tee 320 is a component of the system 300, while in other embodiments, the venturi tee 320 is a component of the circulation system of the water feature. The vacuum manifold 220 is fluidly coupled to the circulation system of the water feature through the sensor assembly 110 and through the venturi tee 320. The venturi tee 320 creates a pressure differential, the low-pressure side of which is tied to the outlet of the sensor assembly 110. In certain embodiments, the low-pressure side of the venturi tee 320 is below atmospheric pressure.

In each of the exemplary systems 100, 200, 300, water from the water feature enters the first source 130. Under certain configurations of the first valve assembly 132, the water flows from the first valve assembly 132 through the sensor assembly 110 back to the water feature. Under certain other configurations of the first valve assembly 132, sanitizing agent from the first container 134 flows from the first valve assembly 132 through the sensor assembly 110 to the water feature. As described more fully below, in certain embodiments, the first source 130 selectively allows both water and sanitizing agent from the first container 134 to flow from the first valve assembly 132 through the sensor assembly 110 to the water feature.

In each of the exemplary systems 100, 200, 300, water from the water feature enters the second source 140. Under certain configurations of the second valve assembly 142, the water flows from the second valve assembly 142 through the sensor assembly 110 back to the water feature. Under certain other configurations of the second valve assembly 142, pH-modifying material from the second container 144 flows from the second valve assembly 142 through the sensor assembly 110 to the water feature. As described more fully below, in certain embodiments, the second source 140 selectively allows both water and pH-modifying material from the second container 144 to flow from the second valve assembly 142 through the sensor assembly 110 to the water feature.

Under certain configurations of the third source 150, the third valve assembly 152 selectively allows calibrant material from the third container 154 to flow from the third container 154 through the sensor assembly 110 to the water feature. In certain such embodiments, the first valve assembly 132 and/or the second valve assembly 142 are configured to interrupt flow of the water from the water feature through the sensor assembly 110 back to the water feature.

Figure 4:
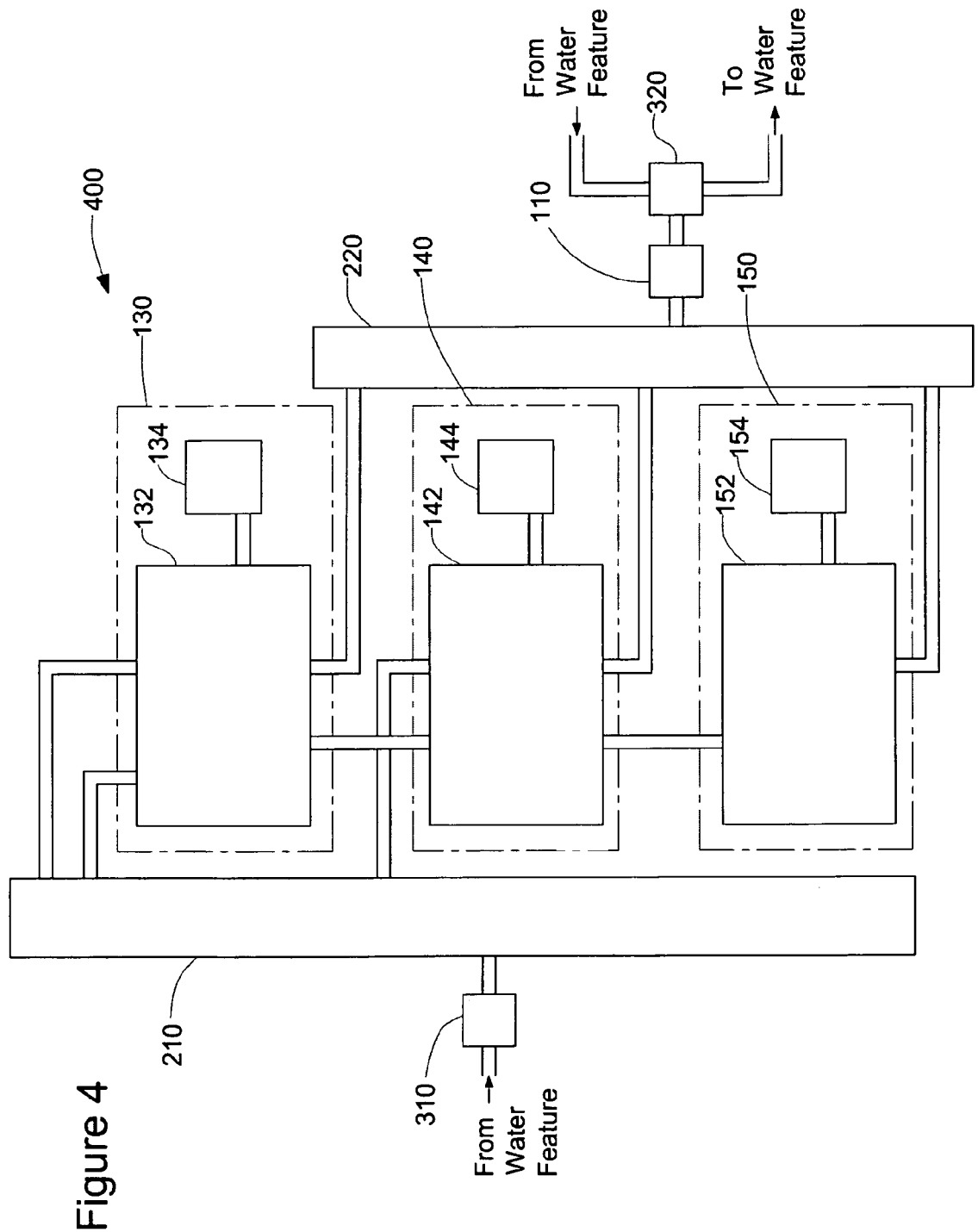

FIG. 4 schematically illustrates another exemplary system 400 fluidly coupled to a water feature for automatically maintaining at least one of a pH level and a sanitizing agent level of water in the water feature. The system 400 comprises the sensor assembly 110, controller (not shown in FIG. 4 for clarity), first source 130, first valve assembly 132, first container 134, second source 140, second valve assembly 142, second container 144, third source 150, third valve assembly 152, and third container 154 as schematically illustrated in FIG. 1. The system 400 further comprises the pressure manifold 210 and the vacuum manifold 220 as schematically illustrated in FIG. 2. The system 400 further comprises the flow sensor 310 and the venturi tee 320 as schematically illustrated in FIG. 3. While the exemplary system 400 schematically illustrated by FIG. 4 is referred to below when describing various system components, other configurations are also compatible with embodiments described herein.

Installation of the System

In certain embodiments, the system 400 is an integral portion of the circulation system of the water feature (e.g., installed as part of a new water feature). In certain other embodiments, the system 400 is installed or retrofitted in the circulation system of an existing water feature. For example, the system 400 can be installed by tapping into a circulation line of an existing water feature and installing a venturi injector and a pressure tee. Certain such embodiments use the pressure and vacuum created by the circulation system to motivate fluids from the first source 130, the second source 140, and the third source 150 through the system 100 and obviates the use of a chemical pump. When installed on an existing water feature, the system 400 can be placed in various positions (e.g., on the side or under the skirt of an existing spa).

In certain embodiments, the system 400 is installed to provide easy access by the user to the first container 134, the second container 144, the third container 154, and the sensor assembly 110 to facilitate replacement by the user, as described more fully below. The system 400 of certain embodiments is enclosed in a housing which is rain- and splash-resistant. The housing can comprise a hinged cover which allows access to the containers 134, 144, 154 and which improves the appearance of the system 400.

In certain embodiments, the system 400 is installed in a spa having a circulation pump (e.g., a 24-hour circulation pump) and having a wall-fitting ozone injector. The ozone injector of certain embodiments has an integral venturi tee or a separate venturi tee. The pressurized fluid stream from the circulation pump of certain embodiments through the ozone injector creates a vacuum on the venturi tee. The vacuum is used to feed liquid into the flowing stream. In certain embodiments, an additional tee is placed before the venturi tee to create back pressure and to provide an additional outlet for the pressure water feed used to replace fluid withdrawn through the vacuum line. In certain other embodiments, the system 400 is installed in a spa with an inline venturi injector rather than an ozone injector. In certain other embodiments, the system 400 is installed in a spa or a swimming pool having a two-speed circulation pump, a tee, and an ozone jet or venturi tee.

In certain embodiments, a user may desire to use ozone for oxidation in addition to the chemical feed system 400. In certain such embodiments, two venturi injectors are used in parallel, one for the ozone unit and one for the chemical feed system 400. In certain embodiments, an air trap is added to the circulation line. For example, a large diameter tee with a small side outlet which is oriented downward can be used to prevent entrained bubbles from entering the sensor assembly 110.

Valve Assembly

Figure 5A:
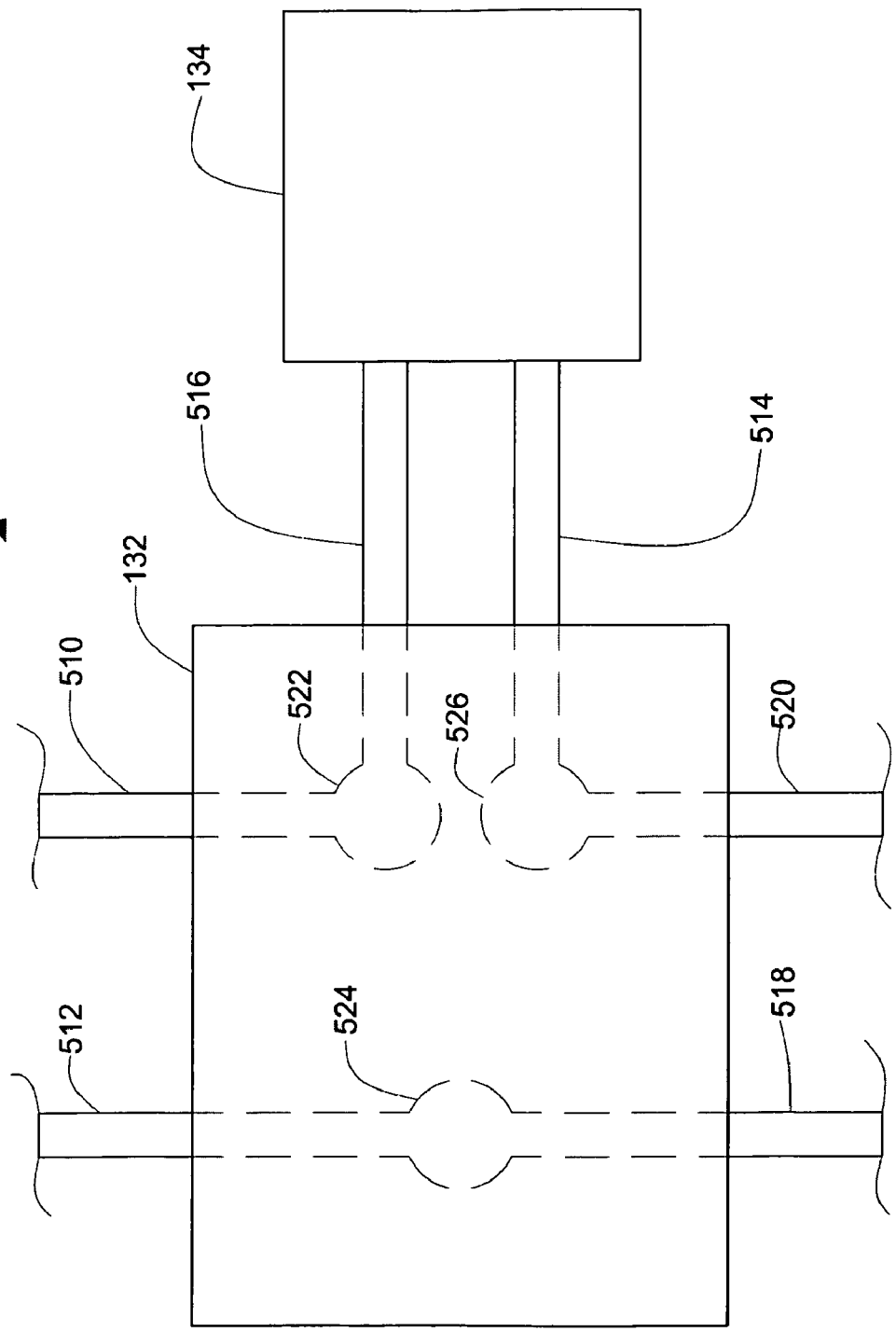
FIGS. 5A and 5B schematically illustrate two exemplary configurations of a first source compatible with embodiments described herein.

FIG. 5A schematically illustrates a first source 130 compatible with embodiments described herein. As schematically illustrated by FIG. 5A, the first valve assembly 132 comprises a first inlet 510, a second inlet 512, a third inlet 514, a first outlet 516, a second outlet 518, and a third outlet 520. The first inlet 510 and the first outlet 516 are fluidly coupled together by a first valve 522. The second inlet 512 and the second outlet 518 are fluidly coupled together by a second valve 524. The third inlet 514 and the third outlet 520 are fluidly coupled together by a third valve 526.

In certain embodiments in which the first container 134 comprises a dry chemical sterilizing agent, the first inlet 510 and the second inlet 512 each receives water flowing from the pressure manifold 210. Water received by the first inlet 510 is selectively allowed to flow through the first valve 522 to the first outlet 516 and into the first container 134 where the water mixes with the sterilizing agent. Water and sterilizing agent flowing from the first container 134 is received by the third inlet 514 and is selectively allowed to flow through the third valve 526 to the third outlet 520. Water and sterilizing agent exiting through the third outlet 520 flows to the vacuum manifold 220. Water received by the second inlet 512 is selectively allowed to flow through the second valve 524 to the second outlet 518. Water exiting through the second outlet 518 flows to the second valve assembly 142.

In certain embodiments in which the first container 134 comprises a liquid chemical sterilizing agent, the first inlet 510 receives a liquid (e.g., air or other gas) at approximately atmospheric pressure and the second inlet 512 receives water flowing from the pressure manifold 210. Air received by the first inlet 510 is selectively allowed to flow through the first valve 522 to the first outlet 516 and into the first container 134. Liquid sterilizing agent flowing from the first container 134 is received by the third inlet 514 and is selectively allowed to flow through the third valve 526 to the third outlet 520. Sterilizing agent exiting through the third outlet 520 flows to the vacuum manifold 220. Water received by the second inlet 512 is selectively allowed to flow through the second valve 524 to the second outlet 518. Water exiting through the second outlet 518 flows to the second valve assembly 142.

Figure 5B:
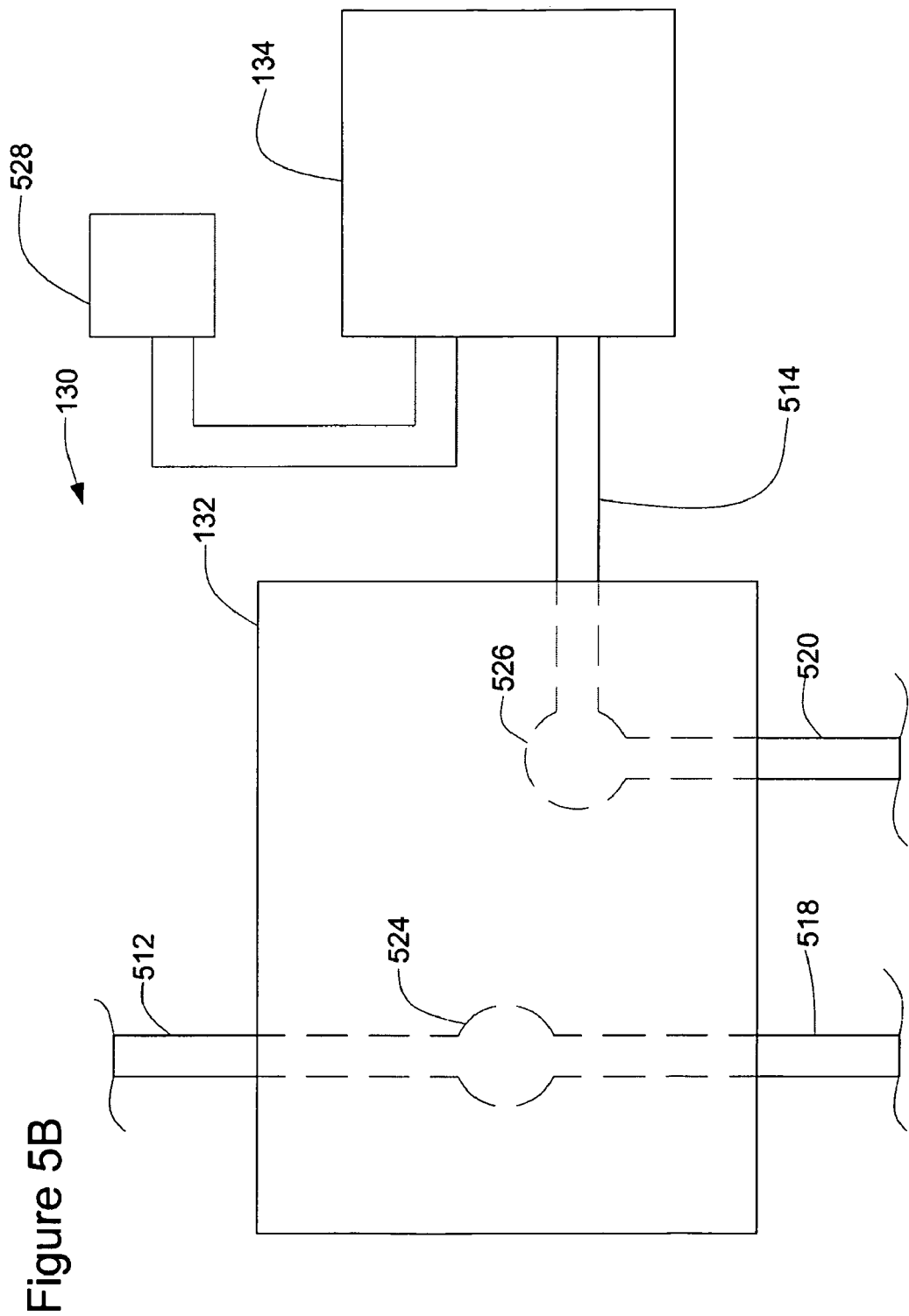

In certain embodiments in which the first container 134 comprises a liquid chemical sterilizing agent, the first container 134 receives air or other gas from the first valve 522 to provide pressure which allows liquid sterilizing agent to flow from the first container 134 into the third inlet 514 of the first valve assembly 132. In certain other embodiments, the first container 134 receives air or other gas from a vent 528 which is not directly connected to the first valve assembly 132. In such embodiments, the first valve assembly 132 comprises two inlets 512, 514, two outlets 518, 520, and two valves 524, 526, as schematically illustrated by FIG. 5B. Certain such embodiments advantageously allow liquid sterilizing agent to be withdrawn from the first container 134 without dilution of the liquid remaining in the first container 134 by water from the water feature.

Returning to the configuration schematically illustrated by FIG. 5A in which the first container 134 comprises a dry chemical sterilizing agent, in a first state of the first valve assembly 132, water is allowed to flow from the pressure manifold 210 into the first container 134 and out to the vacuum manifold 220. In this first state, the first valve 522 is open, the second valve 524 is closed, and the third valve 526 is open. In a second state of the first valve assembly 132, water is allowed to flow from the pressure manifold 210 to the second valve assembly 142. In this second state, the first valve 522 is closed, the second valve 524 is open, and the third valve 526 is closed. In certain embodiments, the first valve assembly 132 is responsive to at least a portion of the control signals from the controller (not shown) by switching between the first state and the second state. By selectively actuating the valves 522, 524, 526 of the first valve assembly 132, certain embodiments advantageously allow a portion of the sterilizing agent in the first container 134 to flow through the sensor assembly 110 into the water feature.

In certain embodiments, the first valve 522 and the third valve 526 are closed when not being energized, and the second valve 524 is open when not being energized. Such embodiments advantageously avoid unwanted flow of sterilizing agent into the water feature in the event of a power failure. In certain embodiments, the valves 522, 524, 526 are actuated substantially simultaneously by the controller, while in other embodiments, one or more of the valves 522, 524, 526 are individually actuated to allow or to inhibit flow through the individual valve.

FIGS. 6A and 6B schematically illustrate two states of an exemplary first valve assembly 132 comprising a pinch valve 530 compatible with embodiments described herein. The pinch valve 530 comprises a movable plunger 532, a pair of stationary walls 534, and sections of flexible tubing 536 positioned between the plunger 532 and one of the stationary walls 534. These sections of flexible tubing 536 correspond to the first valve 522, the second valve 524, and the third valve 526. When the pinch valve 530 is energized, as schematically illustrated by FIG. 6A, the plunger 532 is in a first position in which the tubings 536 corresponding to the first valve 522 and the third valve 526 are open and the tubing 536 corresponding to the second valve 524 is squeezed closed between the plunger 532 and one of the stationary walls 534. When the pinch valve 530 is not energized, as schematically illustrated by FIG. 6B, the plunger 532 is in a second position in which the tubings 536 corresponding to the first valve 522 and the third valve 526 are squeezed closed between the plunger 532 and one of the stationary walls 534, and the tubing 536 corresponding to the second valve 524 is open.

Figure 6C:
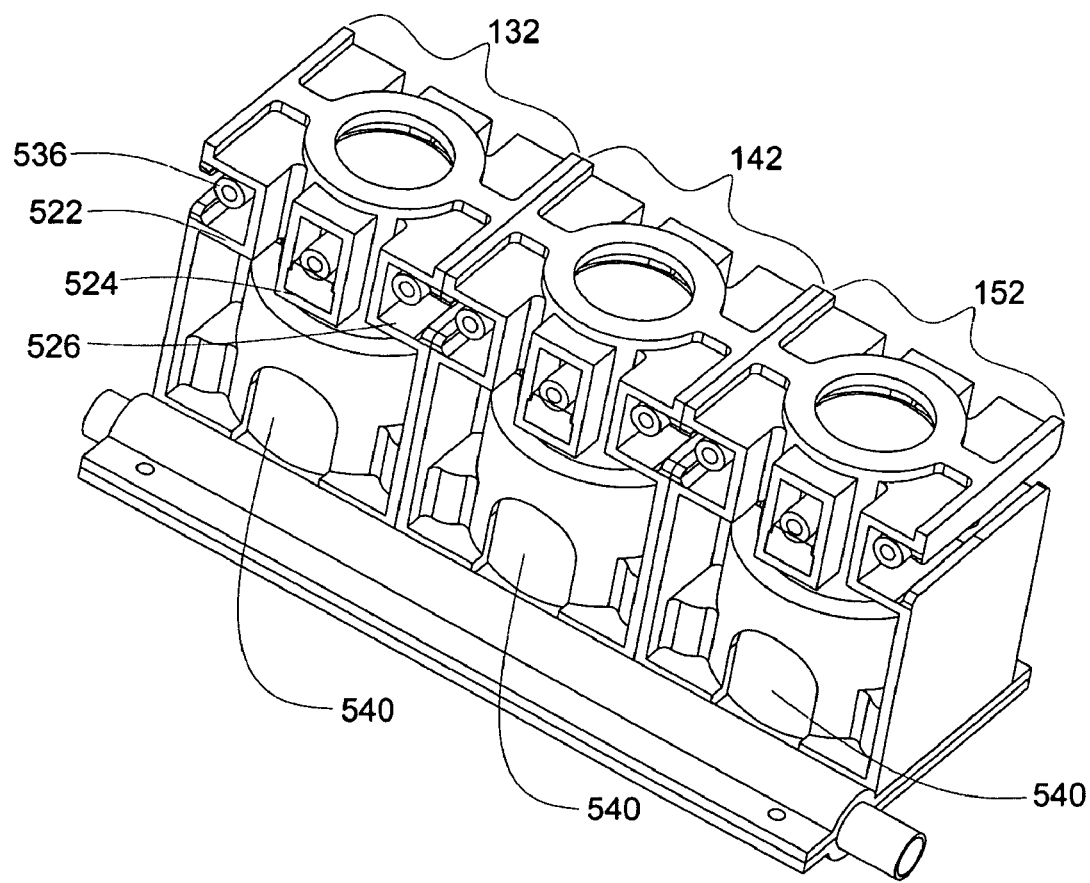
FIG. 6C illustrates an exemplary set of solenoid-actuated pinch valves.

Various actuation mechanisms for the pinch valve 530 are compatible with embodiments described herein. An exemplary set of solenoid-actuated pinch valves 530, corresponding to the first valve assembly 132, the second valve assembly 142, and the third valve assembly 152 is schematically illustrated by FIG. 6C. Each solenoid-actuated pinch valve 530 comprises an electromagnet 540 and springs (not shown) which are coupled to the plunger 532 (not shown in FIG. 6C). Focusing on the first valve assembly 132, when the pinch valve 530 is energized, the electromagnet 540 moves the plunger 532 against the force of the springs into the first position in which the tubings 536 of the first valve 522 and the third valve 526 are open and the tubing 536 of the second valve 524 is pinched closed. When the pinch valve 530 is not energized, the springs force the plunger 532 into the second position in which the tubings 536 of the first valve 522 and the third valve 526 are pinched closed and the tubing 536 of the second valve 524 is open. Actuation of the electromagnet 540 therefore moves the plunger 532 between the first position of FIG. 6A and the second position of FIG. 6B to actuate the pinch valve 530. Exemplary electromagnets 540 compatible with embodiments described herein include, but are not limited to, a tubular E-09-150 electromagnet available from Magnetic Sensor Systems of Van Nuys, Calif.

Tubing 536 compatible with embodiments described herein includes, but is not limited to, C-Flex® tubing available from Cole-Parmer Instrument Company of Vernon Hills, Ill., and Norprene® tubing available from Saint-Gobain Performance Plastics of Akron, Ohio. Various dimensions of tubing may be used. For example, tubing with an inner diameter of ⅛" and an outer diameter of ¼" advantageously minimizes clogging of tubes and orifices. The tubing 536 preferably does not have a high compression set and has a low hardness so as to conserve power and to allow the use of smaller solenoids or electromagnets.

In certain embodiments, heat generated by the solenoid or electromagnet 540 is transferred to the water and from the water to a housing comprising the system 400. A heat sink is used in certain embodiments to transfer the heat from the electromagnet 540 to the water. The heat sink of certain embodiments comprises stainless-steel tubing thermally coupled to the electromagnet 540 and through which water from the water feature flows. In certain such embodiments in which the water feature is used outdoors, the heat sink advantageously warms the housing to prevent tubing within the housing from freezing.

In certain embodiments, use of one or more pinch valves in at least one of the valve assemblies 132, 142, 152 advantageously prevents corrosion or clogging of valves or components since the pinch valve mechanism has no direct contact with the corrosive fluids which are used as the sanitizing agent or the pH-modifying material. In certain other embodiments in which the pinch valves are closed when not energized, use of one or more pinch valves in at least one of the valve assemblies 132, 142, 152 advantageously provides "fail-safe" operation in which the contents of the corresponding containers 134, 144, 154 are prevented from entering the water feature upon a power failure.

In certain other embodiments, use of one or more pinch valves in at least one of the valve assemblies 132, 142, 152 advantageously protects the system from pressure buildup. For example, spa use can be infrequent such that chemical feed is not needed for a period of days or weeks. During these extended periods of inactivity, the sealed containers are pressurized and can develop very high pressures, particularly if the temperature rises significantly. Pinch valves typically have a pressure limit beyond which the pinch valve does not completely close (e.g., approximately 20 pounds per square inch), so they have an inherent pressure relief mechanism. For example, if the pressure in a container exceeds the pressure limit of the corresponding pinch valve, the pinch valve "leaks" and the excess pressure is vented through the pinch valve so as to equalize the pressure within the container to below the pressure limit.

Figure 7A:
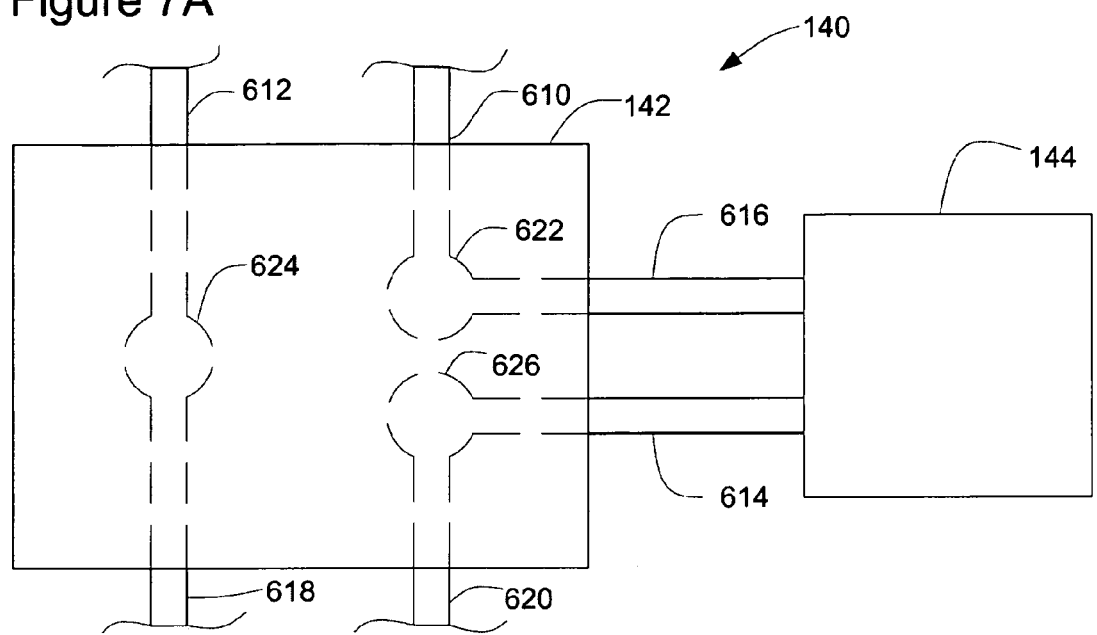
FIGS. 7A and 7B schematically illustrate two exemplary configurations of a second source comprising a second valve assembly and a second container.

FIG. 7A schematically illustrates an exemplary second source 140 comprising a second valve assembly 142 and a second container 144 comprising a dry chemical pH-modifying material. Similar to the first valve assembly 132 of FIG. 5A, the second valve assembly 142 of FIG. 7A comprises a first inlet 610, a second inlet 612, a third inlet 614, a first outlet 616, a second outlet 618, and a third outlet 620. The first inlet 610 and the first outlet 616 are fluidly coupled together by a first valve 622. The second inlet 612 and the second outlet 618 are fluidly coupled together by a second valve 624. The third inlet 614 and the third outlet 620 are fluidly coupled together by a third valve 626.

In certain embodiments in which the second container 144 comprises a dry pH-modifying material, the first inlet 610 receives water flowing from the pressure manifold 210. The second inlet 612 receives water flowing from the first valve assembly 132 (e.g., from the second outlet 518 of the first valve assembly 132). Water received by the first inlet 610 is selectively allowed to flow through the first valve 622 to the first outlet 616 and into the second container 144 where the water mixes with the dry chemical pH-modifying material. Water and the pH-modifying material flowing from the second container 144 is received by the third inlet 614 and is selectively allowed to flow through the third valve 626 to the third outlet 620. Water and the pH-modifying material exiting through the third outlet 620 flows to the vacuum manifold 220. Water received by the second inlet 612 is selectively allowed to flow through the second valve 624 to the second outlet 618. Water exiting through the second outlet 618 flows to the third valve assembly 152.

In certain embodiments in which the second container 144 comprises a liquid chemical pH-modifying material, the first inlet 610 receives a liquid (e.g., air or other gas) at approximately atmospheric pressure and the second inlet 612 receives water flowing from the pressure manifold 210. Air received by the first inlet 610 is selectively allowed to flow through the first valve 622 to the first outlet 616 and into the second container 144. Liquid pH-modifying material flowing from the second container 144 is received by the third inlet 614 and is selectively allowed to flow through the third valve 626 to the third outlet 620. The pH-modifying material exiting through the third outlet 620 flows to the vacuum manifold 220. Water received by the second inlet 612 is selectively allowed to flow through the second valve 624 to the second outlet 618. Water exiting through the second outlet 618 flows to the third valve assembly 152.

In certain embodiments, the first valve 622 and the third valve 626 are closed when not being energized, and the second valve 624 is open when not being energized. Such embodiments advantageously avoid unwanted flow of the pH-modifying material into the water feature in the event of a power failure. In certain embodiments, the valves 622, 624, 626 are actuated simultaneously by the controller, while in other embodiments, one or more of the valves 622, 624, 626 are individually actuated to allow or to inhibit flow through the individual valve. In certain embodiments, one or more of the valves 622, 624, 626 comprise a pinch valve, as described more fully above in relation to FIGS. 6A-6C.

Figure 7B:
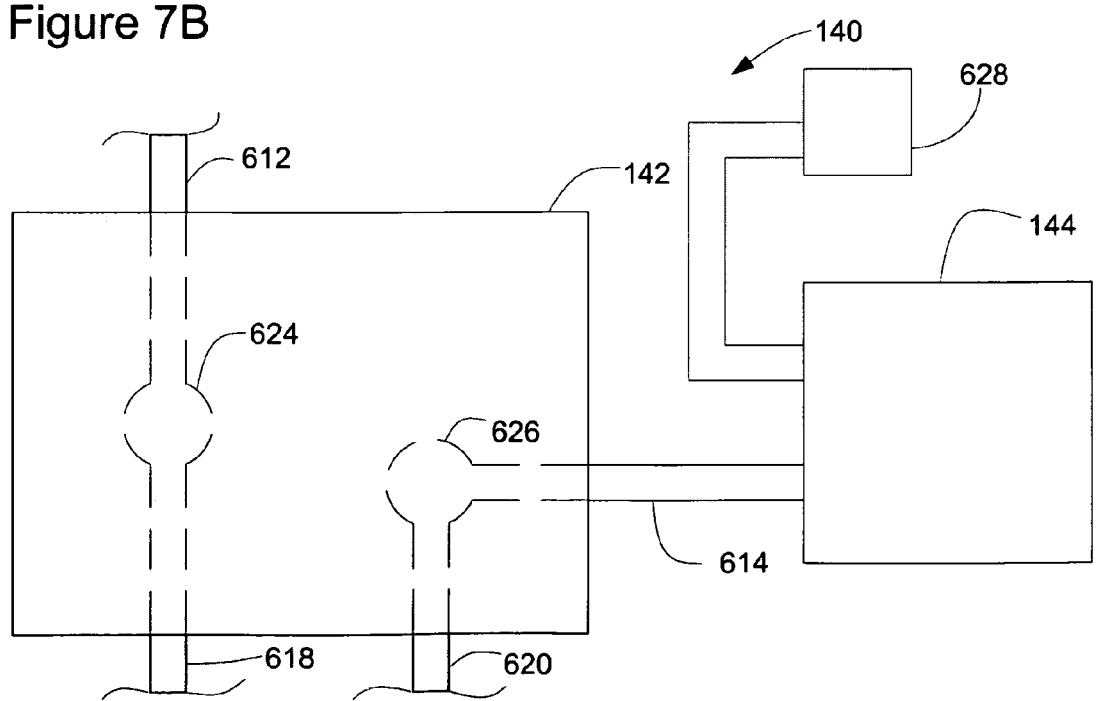

In certain embodiments in which the second container 144 comprises a liquid chemical pH-modifying material, the second container 144 receives air or other gas from the first valve 622 to provide pressure which allows liquid pH-modifying material to flow from the second container 144 into the third inlet 614 of the second valve assembly 142. In certain other embodiments, the second container 144 receives air or other gas from a vent 628 which is not directly connected to the second valve assembly 142. In such embodiments, the second valve assembly 142 comprises two inlets 612, 614, two outlets 618, 620, and two valves 624, 626, as schematically illustrated by FIG. 7B. Certain such embodiments advantageously allow liquid pH-modifying material to be withdrawn from the second container 144 without dilution of the liquid remaining in the second container 144 by water from the water feature.

Returning to the configuration schematically illustrated by FIG. 7A in which the second container 144 comprises a dry chemical pH-modifying material, in a first state of the second valve assembly 142, water is allowed to flow from the pressure manifold 210 into the second container 144 and out to the vacuum manifold 220. In this first state, the first valve 622 is open, the second valve 624 is closed, and the third valve 626 is open. In a second state of the second valve assembly 142, water is allowed to flow from the first valve assembly 132 to the third valve assembly 152. In this second state, the first valve 622 is closed, the second valve 624 is open, and the third valve 626 is closed. In certain embodiments, the second valve assembly 142 is responsive to at least a portion of the control signals from the controller (not shown) by switching between the first state and the second state. By selectively actuating the valves 622, 624, 626 of the second valve assembly 142, certain embodiments advantageously allow a portion of the pH-modifying material in the second container 144 to flow through the sensor assembly 110 into the water feature.

Figure 8A:
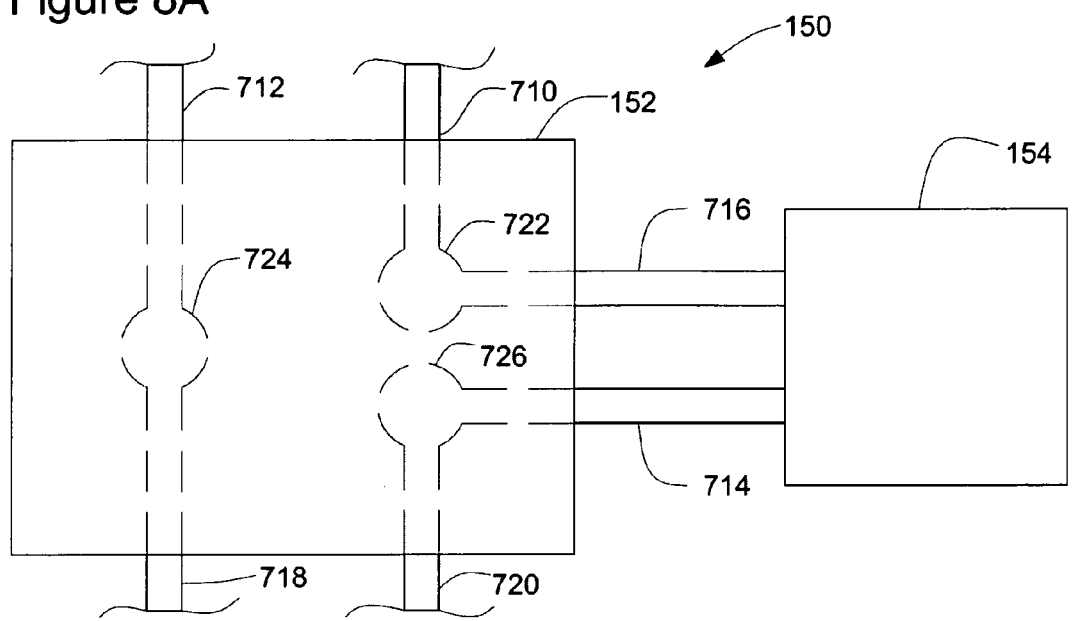
FIGS. 8A and 8B schematically illustrate two exemplary configurations of a third source comprising a third valve assembly and a third container.

FIG. 8A schematically illustrates a third source 150 comprising a third valve assembly 152 and a third container 154 comprising a liquid calibrant material. Similar to the first valve assembly 132 of FIG. 5A, the third valve assembly 152 of FIG. 8A comprises a first inlet 710, a second inlet 712, a third inlet 714, a first outlet 716, a second outlet 718, and a third outlet 720. The first inlet 710 and the first outlet 716 are fluidly coupled together by a first valve 722. The second inlet 712 and the second outlet 718 are fluidly coupled together by a second valve 724. The third inlet 714 and the third outlet 720 are fluidly coupled together by a third valve 726.

In certain embodiments, the first inlet 710 receives a liquid (e.g., air or other gas) at approximately atmospheric pressure and the second inlet 712 receives water flowing from the second outlet 618 of the second valve assembly 142. Air received by the first inlet 710 is selectively allowed to flow through the first valve 722 to the first outlet 716 and into the third container 154. Liquid calibrant material flowing from the third container 154 is received by the third inlet 714 and is selectively allowed to flow through the third valve 726 to the third outlet 720. Calibrant material exiting through the third outlet 720 flows to the vacuum manifold 220. Water received by the second inlet 712 is selectively allowed to flow through the second valve 724 to the second outlet 718. Water exiting through the second outlet 718 flows to the vacuum manifold 220.

In certain embodiments, the first valve 722 and the third valve 726 are closed when not being energized, and the second valve 724 is open when not being energized. Such embodiments advantageously avoid unwanted flow of the calibrant material into the water feature in the event of a power failure. In certain embodiments, the valves 722, 724, 726 are actuated simultaneously by the controller, while in other embodiments, one or more of the valves 722, 724, 726 are individually actuated to allow or to inhibit flow through the individual valve. In certain embodiments, one or more of the valves 722, 724, 726 comprise a pinch valve, as described more fully above in relation to FIGS. 6A-6C.

Figure 8B:
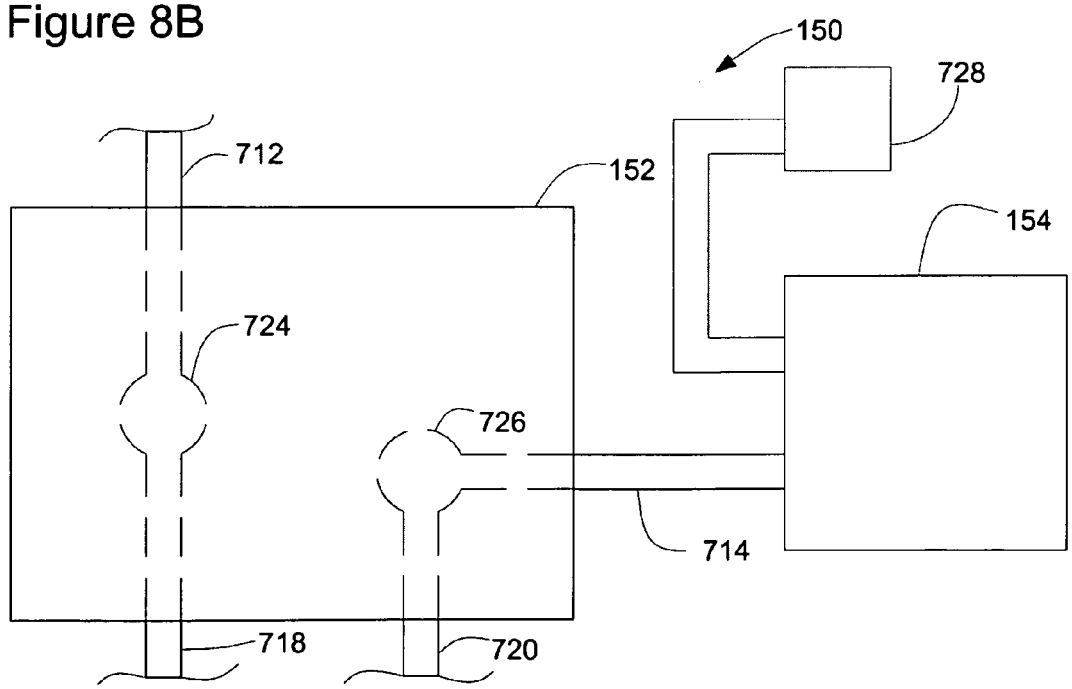

In certain embodiments, the third container 154 receives air or other gas from the first valve 722 to provide pressure which allows the calibrant material to flow from the third container 154 into the third inlet 714 of the third valve assembly 152. In certain other embodiments, the third container 154 receives air or other gas from a vent 728 which is not directly connected to the third valve assembly 152. In such embodiments, the third valve assembly 152 comprises two inlets 712, 714, two outlets 718, 720, and two valves 724, 726, as schematically illustrated by FIG. 8B. Certain such embodiments advantageously allow liquid calibrant material to be withdrawn from the third container 154 without dilution of the liquid remaining in the third container 154 by water from the water feature.

Returning to the configuration schematically illustrated by FIG. 8A, in a first state of the third valve assembly 152, air is allowed to flow into the third container 154 and calibrant material is allowed to flow out of the third container 154 to the vacuum manifold 220. Furthermore, in this first state, water is not allowed to flow from the second valve assembly 142 to the vacuum manifold 220. In this first state, the first valve 722 is open, the second valve 724 is closed, and the third valve 726 is open. In a second state of the third valve assembly 152, water is allowed to flow from the second valve assembly 142 to the vacuum manifold 220 and calibrant material is not allowed to flow from the third container 154 to the vacuum manifold 220. In this second state, the first valve 722 is closed, the second valve 724 is open, and the third valve 726 is closed. In certain embodiments, the third valve assembly 152 is responsive to at least a portion of the control signals from the controller (not shown) by switching between the first state and the second state. By selectively actuating the valves 722, 724, 726 of the third valve assembly 152, certain embodiments advantageously allow a portion of the calibrant material in the third container 154 to flow through the sensor assembly 110 into the water feature.

Container

Figure 9:
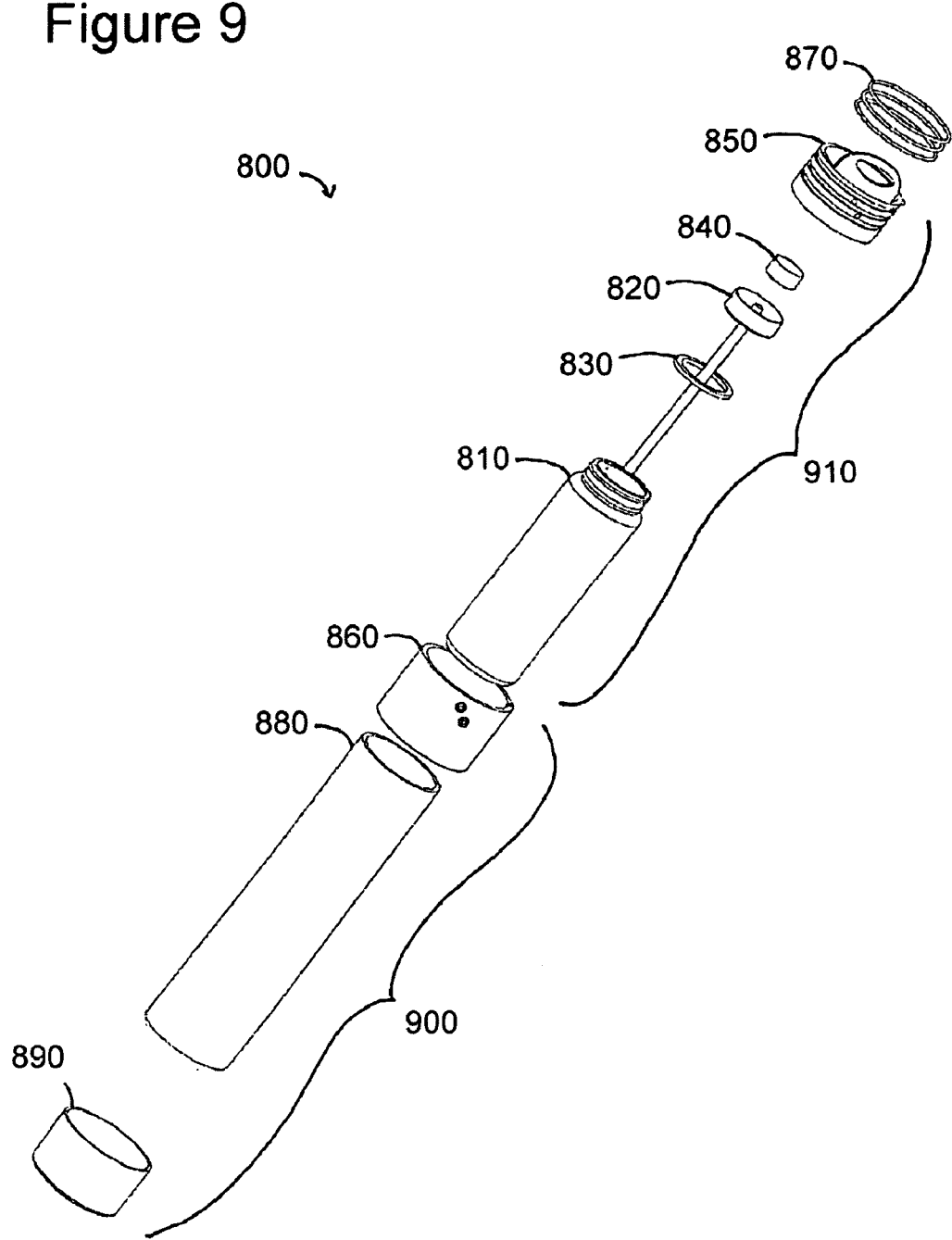
FIG. 9 is a perspective exploded view of an exemplary container compatible for use as a first container or as a second container in accordance with embodiments described herein.

FIG. 9 is a perspective exploded view of an exemplary container 800 which is compatible for use as a first container 134 or as a second container 144 in accordance with embodiments described herein. The container 800 comprises a cartridge 810, an insert 820, a gasket 830, an insert cover 840, a cartridge top 850, a first housing portion 860, a plurality of O-rings 870 (e.g., three O-rings 870), a second housing portion 880, and an end portion 890. As described more fully below, when assembled, the first housing portion 860, the second housing portion 880, and the end portion 890 form a housing 900. In addition, when assembled, the cartridge 810, the insert 820, the gasket 830, the insert cover 840, and the cartridge top 850 form a cartridge assembly 910. While the discussion below addresses particular configurations of the container 800, other configurations are also compatible with embodiments described herein.

The cartridge 810 contains a chemical material to be introduced into the water feature (e.g., sterilizing agent material or pH-modifying material). An exemplary cartridge 810 of the first container 134 holds approximately 1.5 pounds of dry sterilizing agent material. An exemplary cartridge 810 of the second container 144 holds approximately 2 pounds of dry pH-modifying material. Other sizes of cartridges 810 are compatible with embodiments described herein.

In certain embodiments, the cartridge 810 is replaceable such that when the chemical material in the cartridge 810 is depleted, the cartridge 810 can be removed and a new cartridge 810 installed in its place. In other embodiments, the cartridge 810 is refillable such that when the chemical material in the cartridge 810 is depleted, the cartridge 810 can be removed, additional chemical material is placed in the cartridge 810, and the cartridge 810 is replaced. In certain embodiments, the cartridges 810 of the first container 134 and the second container 144 have unique shapes or sizes to avoid the possibility of inadvertent switching of sterilizing agent material with pH-modifying material, or vice versa. Other methods of avoiding inadvertent switching are compatible with embodiments described herein.

Figure 10:
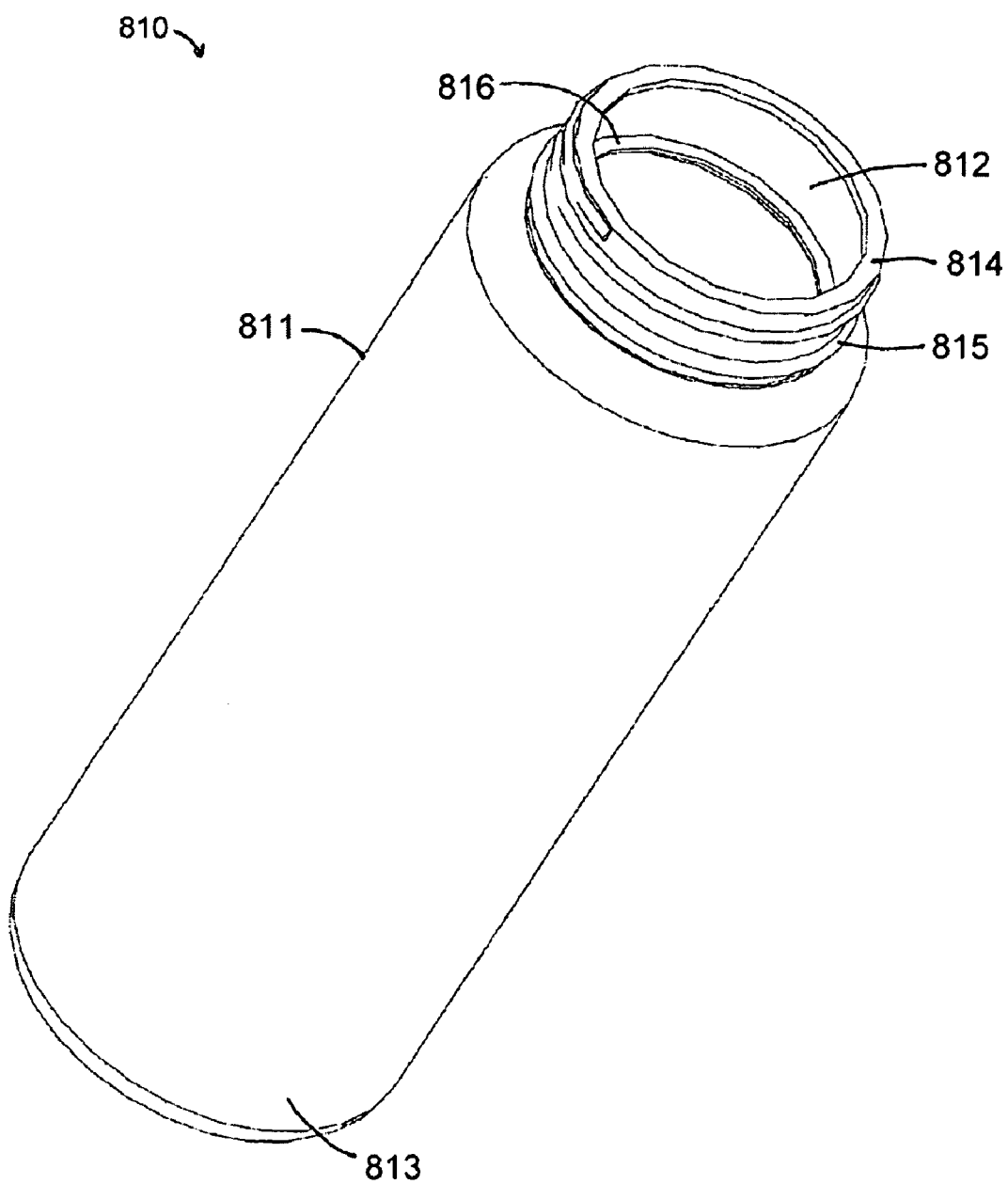
FIG. 10 is a perspective view of an exemplary cartridge compatible with embodiments described herein.

In certain embodiments, as schematically illustrated in perspective view by FIG. 10, the cartridge 810 comprises a vessel 811 (e.g., a bottle) with a generally cylindrical shape with an upper portion 812 and a lower portion 813. The upper portion 812 comprises an edge surface 814 which is configured to be coupled to the gasket 830. The upper portion 812 further comprises a screw thread 815 which is reversibly connected to a cap (not shown) during transportation and storage of the vessel 811. In certain embodiments, the cap is child-proof to prevent the vessel 811 from accidental opening and leakage of the chemical material during transportation and storage. The screw thread 815 is also reversibly connected to the cartridge top 850 during use. The upper portion 812 of the vessel 811 further comprises an inner surface 816 which is configured to support the insert 820 when placed in the container 810. In certain embodiments, the vessel 811 can hold approximately one pound of dry chemical material, while in other embodiments, other amounts of the chemical material can be accommodated within the vessel 811. Other shapes and configurations of the vessel 811 are also compatible with embodiments described herein.

Figure 11:
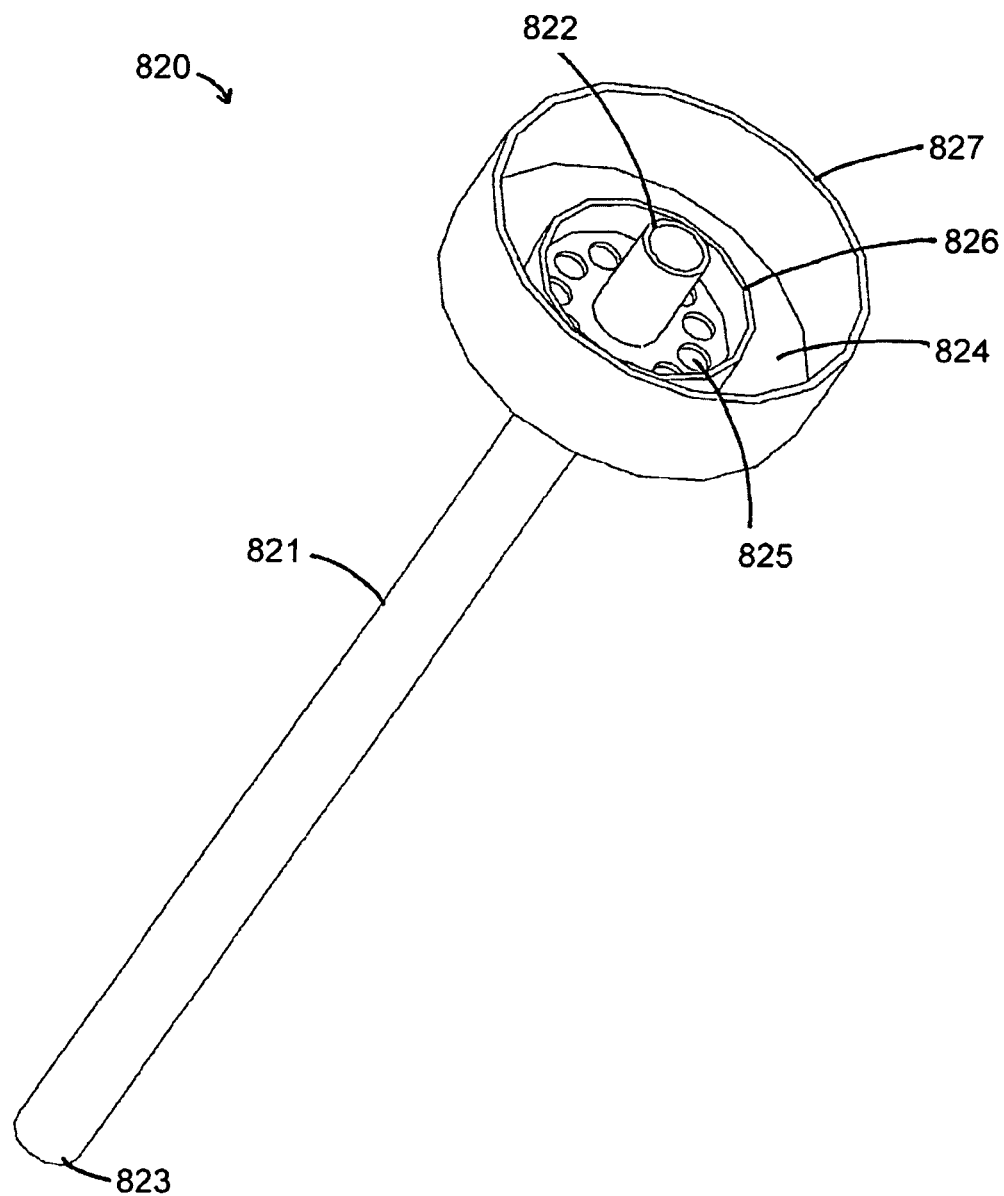
FIG. 11 is a perspective view of an exemplary insert compatible with embodiments described herein.

As schematically illustrated in perspective view by FIG. 11, in certain embodiments, the insert 820 comprises a tubular conduit 821 having an upper portion 822 and a lower portion 823. The insert 820 further comprises a generally circular plate 824 with a plurality of holes 825, an inner annular ring 826 around the upper portion 822 of the tubular conduit 821, and an outer annular ring 827. When installed in the vessel 811, the plate 824 and the outer annular ring 827 fit in the upper portion 812 of the vessel 811 with the lower portion 823 of the tubular conduit 821 extending into the lower portion 813 of the vessel 811. The plate 824 fits onto the inner surface 816 of the vessel 811. In certain embodiments, the plate 824 is directly in contact with the inner surface 816, while in other embodiments, a gasket is positioned between the plate 824 and the inner surface 816.

The tubular conduit 821 provides a first pathway for water flow from the upper portion 812 of the vessel 811 to the chemical material held in the lower portion 813 of the vessel 811. The holes 825 in the plate 824 provide a second pathway for fluid flow from the lower portion 813 of the vessel 811 to the upper portion 812 of the vessel 811. The fluid flowing from the lower portion 813 to the upper portion 812 comprises water and a portion of the chemical material. In certain embodiments, the insert 820 introduces water to the lower portion 813 of the vessel 811 so that the fluid flowing out of the vessel 811 is a more concentrated solution. For example, when the insert 820 is part of the second container 144 containing an acidic material, the fluid from the second container 144 has a higher concentration of acid, so it lowers the pH level of the water feature faster. Other configurations of the insert 820 are also compatible with embodiments described herein.

Figure 12:
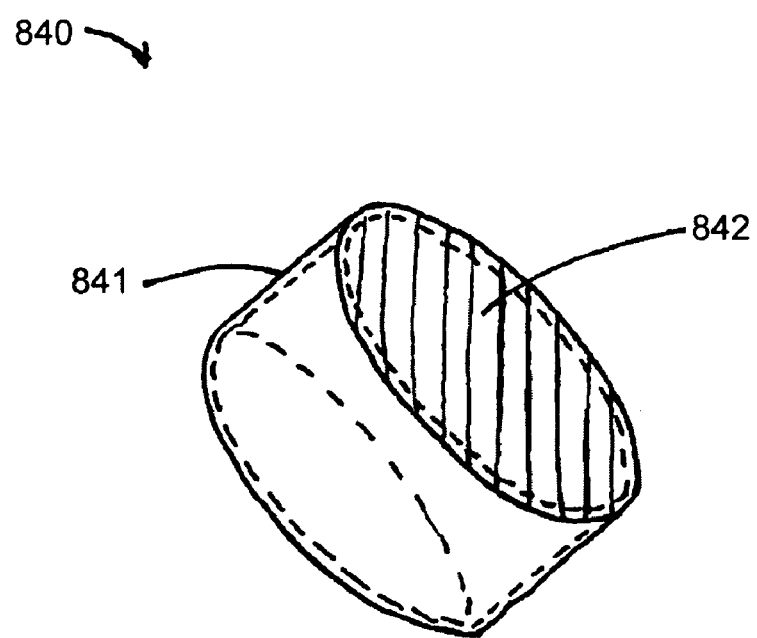
FIG. 12 is a perspective view of an exemplary insert cover compatible with embodiments described herein.

As schematically illustrated in perspective view by FIG. 12, the insert cover 840 comprises a generally rigid cylindrical portion 841 open at one end and configured to fit onto the inner annular ring 826 of the insert 820. The insert cover 840 further comprises a thin membrane 842 across a second end of the insert cover 840 and which covers the upper portion 822 of the tubular conduit 821 and the holes 825 when the insert cover 840 is fit onto the insert 820. In this way, the insert cover 840 generally seals the chemical material within the vessel 811 and protects the user from exposure to the chemical material before the container 810 is installed in the system. In certain embodiments, the insert cover 840 is bonded or welded onto the insert 820 such that the insert cover 840 is not reversibly removable from the insert 820. In other embodiments, the insert cover 840 is friction fitted onto the insert 820. Other configurations of the insert cover 840 are also compatible with embodiments described herein.

Figure 13A:
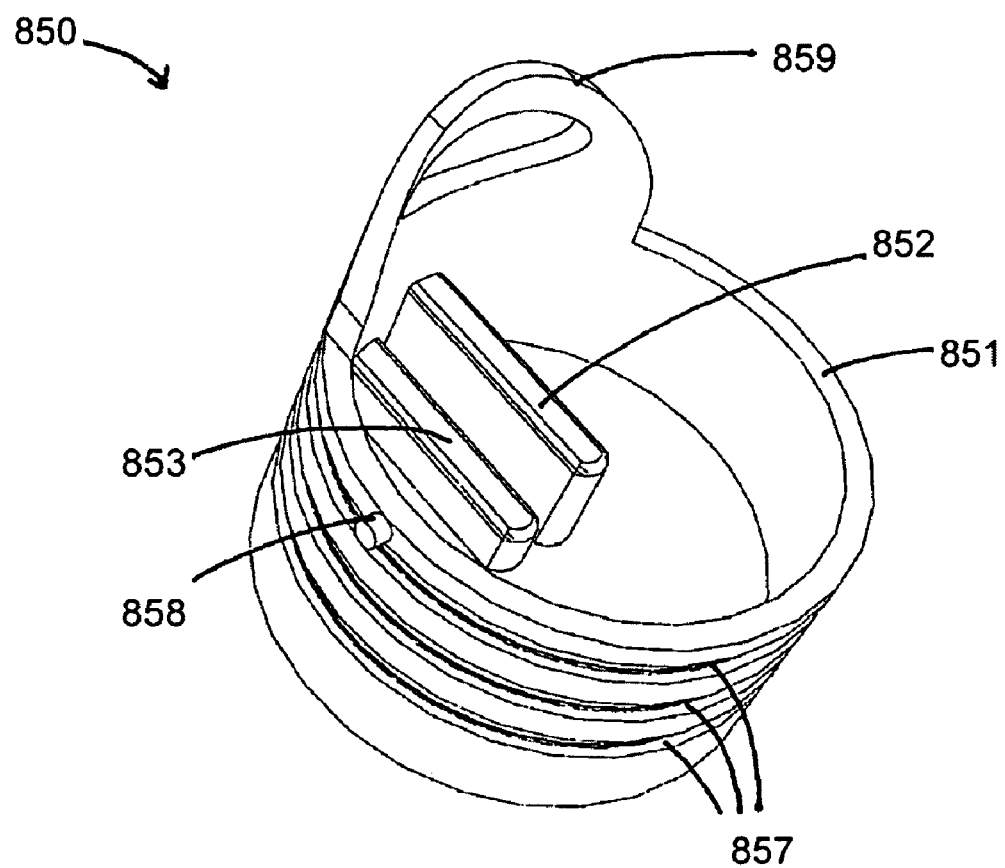
FIGS. 13A and 13B are two perspective views of an exemplary cartridge, top compatible with embodiments described herein.
Figure 13B:
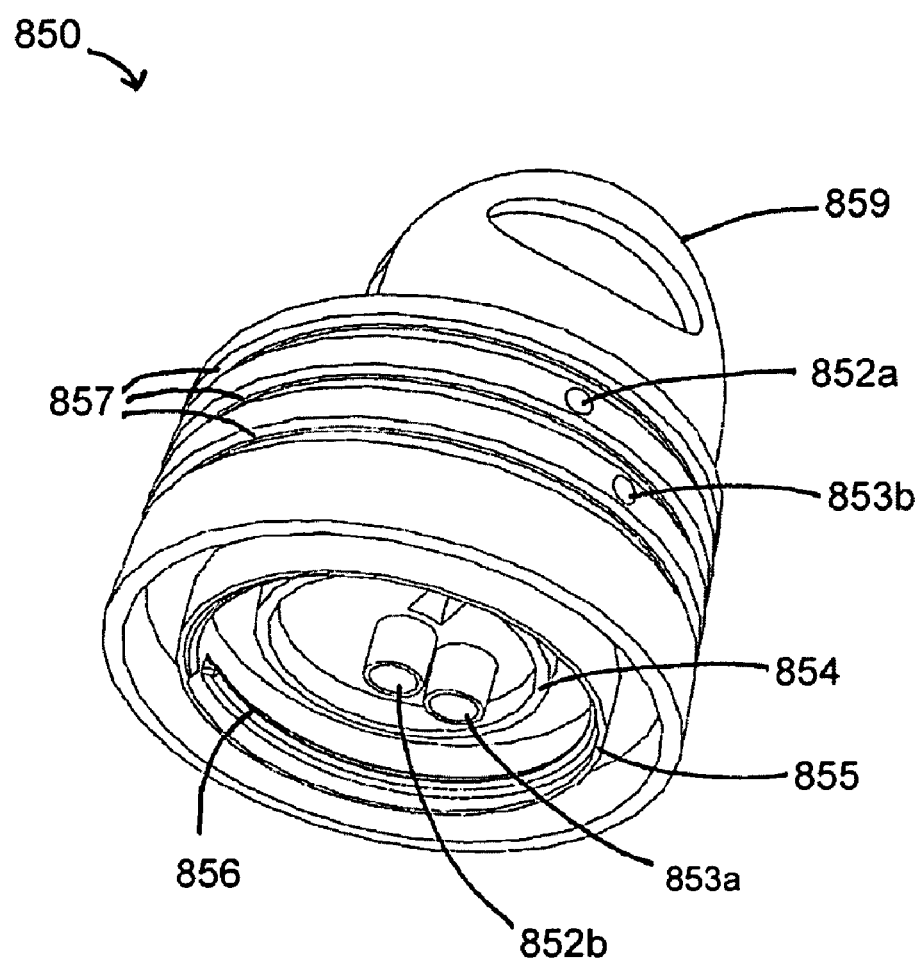

As schematically illustrated in two perspective views by FIGS. 13A and 13B, in certain embodiments, the cartridge top 850 comprises a generally cylindrical body 851, a first fluid conduit 852 having a first inlet 852a and a first outlet 852b, a second fluid conduit 853 having a second inlet 853a and a second outlet 853b, an inner annular ring 854, an outer annular ring 855 having a screw thread 856, a plurality of O-ring recesses 857 (e.g., three O-ring recesses 857), a key 858, and a handle 859. The first inlet 852a is positioned between a first pair of the O-ring recesses 857, and the second outlet 853b is positioned between a second pair of the O-ring recesses 857. In certain embodiments, the first pair of O-ring recesses 857 and the second pair of O-ring recesses 857 each comprises a common O-ring recess 857, as schematically illustrated by FIG. 13B. In other embodiments, the first pair and the second pair of O-ring recesses 857 do not have an O-ring recess 857 common to both pairs. In certain embodiments, the first fluid conduit 852 is an inlet of the cartridge 810 and the second fluid conduit 853 is an outlet of the cartridge 810. Other configurations of the cartridge top 850 are also compatible with embodiments described herein.

When installed on the vessel 811, the screw thread 856 mates with the screw thread 815 of the vessel 811, and the gasket 830 is compressed between a surface of the cartridge top 850 and the edge surface 814 of the vessel 811. In this way, certain embodiments inhibit leakage between the vessel 811 and the cartridge top 850. In certain embodiments, each cartridge/cartridge top pair has a unique set of screw threads 815, 856. Such embodiments advantageously prevent swapping or installation of chemical materials into the wrong container. For example, by using unique screw threads 815, 856 for the first container 134 and the second container 144, a cartridge 810 containing sanitizing agent can not be installed in the second container 144 and a cartridge 810 containing pH-modifying material can not be installed in the first container 134.

In addition, the first outlet 852b and the second inlet 853a press through the membrane 842 covering the upper portion 822 of the tubular conduit 821 and the holes 825 of the insert 820, with the first outlet 852a mating with the upper portion 822 of the tubular conduit 821. In this way, the assembly of the cartridge 810, the insert 820, and the cartridge top 850 provide a pathway for water flow through the first fluid conduit 852 of the cartridge top 850, through the tubular conduit 821 of the insert 820 into the lower portion of the vessel 811 of the container 810. In addition, the assembly of the cartridge 810, the insert 820, and the cartridge top 850 provide a pathway for fluid flow from the lower portion of the vessel 811, through the holes 825 of the insert 820, and through the second fluid conduit 853 of the cartridge top 850.

In certain embodiments, the handle 859 of the cartridge top 850 is used when either removing the cartridge top 850 from the housing 900 or installing the cartridge top 850 into the housing 900. In certain embodiments, the handle 859 is an integral portion of the cartridge top 850, while in other embodiments, the handle 859 is removable from the rest of the cartridge top 850.

Figure 14:
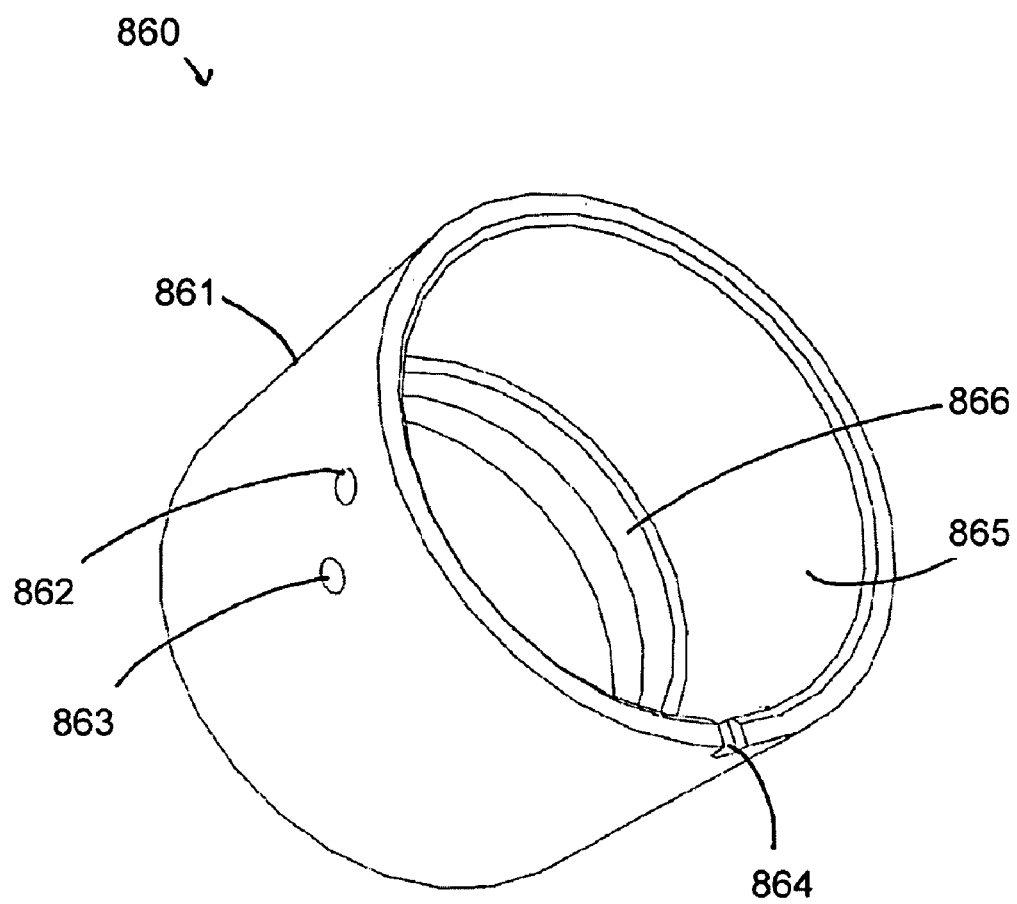
FIG. 14 schematically illustrates in perspective view an exemplary first housing portion compatible with embodiments described herein.

FIG. 14 schematically illustrates in perspective view an exemplary first housing portion 860 compatible with embodiments described herein. The first housing portion 860 comprises a generally cylindrical body 861 open at both ends, a first fluid conduit 862, a second fluid conduit 863, a key notch 864, an inner surface 865, and a ridge 866.

Figure 15A:
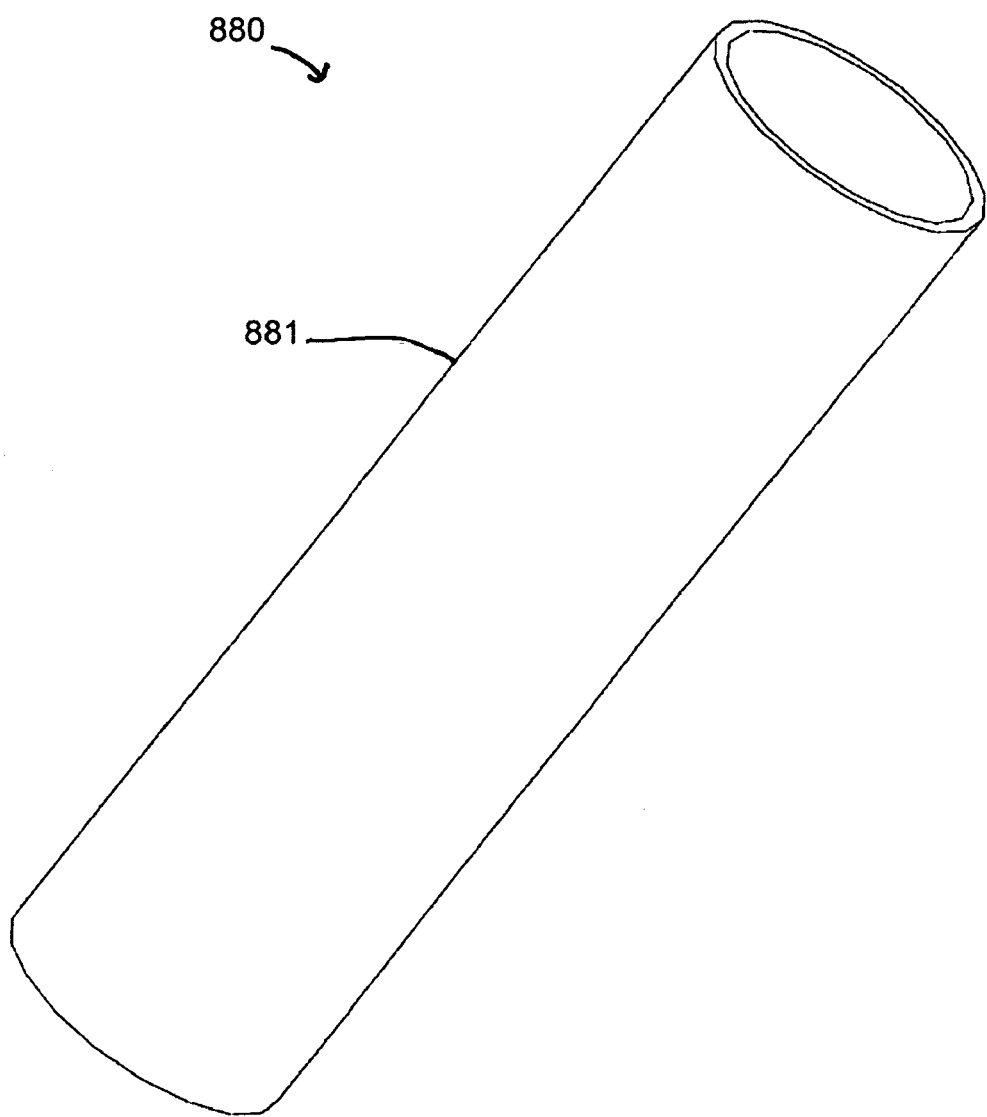
FIG. 15A is a perspective view of an exemplary second housing portion compatible with embodiments described herein.
Figure 15B:
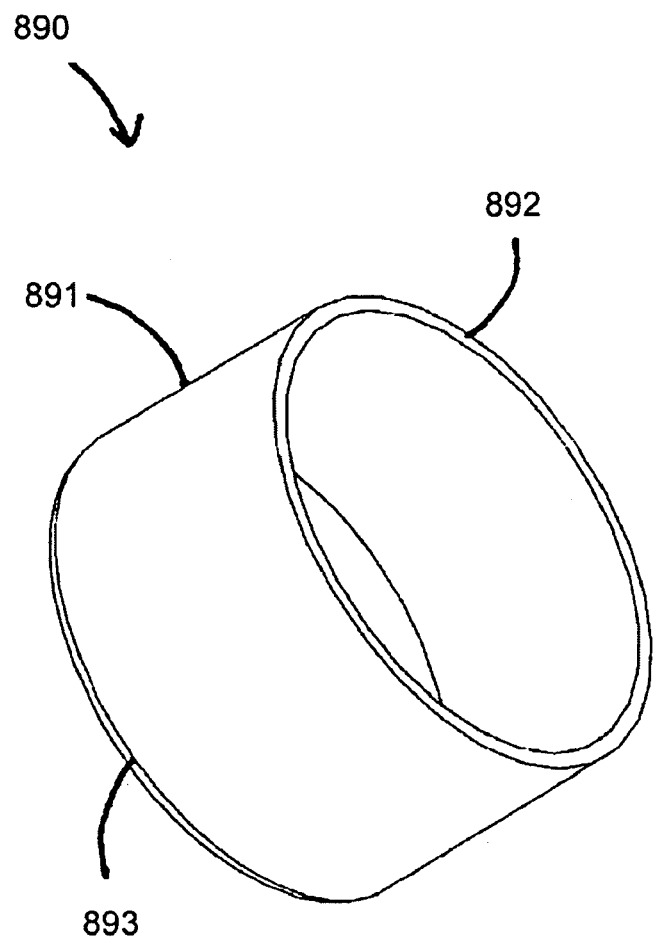
FIG. 15B is a perspective view of an exemplary end portion compatible with embodiments described herein.

In certain embodiments, the second housing portion 880 comprises a generally cylindrical body 881 open at both ends, as schematically illustrated by FIG. 15A. The generally cylindrical body 881 fits with the first housing portion 860 and contacts the ridge 866 of the first housing portion 860. In certain embodiments, the end portion 890 comprises a generally cylindrical body 891 open at one end 892 and closed at the other end 893, as schematically illustrated by FIG. 15B. The end portion 890 fits onto the second housing portion 880. Once assembled in certain embodiments, the first housing portion 860, the second housing portion 880, and the end portion 890 form the housing 900 into which the cartridge 810 is installed. Other configurations of the first housing portion 860, the second housing portion 880, the end portion 890, and the housing 900 are also compatible with embodiments described herein.

In certain embodiments, the first housing portion 860, the second housing portion 880, and the end portion 890 each comprise a plastic material (e.g., polyvinyl chloride or PVC). The outer diameter of the second housing portion 880 in certain embodiments is approximately 2.5 inches. Both the first housing portion 860 and the end portion 890 are sealed onto the second housing portion 880 using an adhesive (e.g., solvent cement).

In certain embodiments, the housing 900 formed by the first housing portion 860, second housing portion 880, and end portion 890 advantageously provides secondary containment to prevent chemical material from leaking out of the cartridge and out of the container. Certain such embodiments advantageously isolate other equipment of the water feature from any chemical materials leaking from the cartridge 810, thereby preventing corrosion. In certain embodiments, the housing 900 is mountable to a bracket or flange in proximity to the water feature for easy access.

In certain embodiments, when the cartridge top 850 is installed in the first housing portion 860, a lower portion of the cartridge top 850 contacts the ridge 866 to facilitate correct positioning of the cartridge top 850 in the first housing portion 860. The cartridge top 850 is configured to fit in the first housing portion 860 with the plurality of O-rings 870 positioned in the plurality of O-ring recesses 857. The O-rings 870 are compressed by the inner surface 865 of the first housing portion 860, thereby providing generally sealed annular regions between the O-rings 870. For example, for three O-rings 870 in the three O-ring recesses 857 shown in FIGS. 13A and 13B, two generally sealed annular regions are formed with the first inlet 852a is in one of the generally sealed annular regions and the second outlet 853b in a different generally sealed annular region. In this way, the O-rings 870 fluidly isolate the first inlet 852a and the second outlet 853b from one another. In addition, the O-rings 870 fluidly isolates the outside of the housing 900 from the secondary containment area formed by the first housing portion 860, the second housing portion 880, and the end portion 890, thereby inhibiting fluid leakage.

The key 858 of the cartridge top 850 fits into the key notch 864 of the first housing portion 860, thereby fixing a relative orientation of the cartridge top 850 with respect to the first housing portion 860. In this orientation, the first fluid conduit 862 of the first housing portion 860 is fluidly coupled with the first inlet 852*a* of the cartridge top 850, and the second fluid conduit 863 of the first housing portion 860 is fluidly coupled with the second output 853*b* of the cartridge top 850. In certain embodiments, the first fluid conduit 862 and the second fluid conduit 863 each comprises a tubing fitting configured to be coupled to tubing of the system. In this way, by assembling the cartridge 810, the insert 820, the cartridge top 850, and the first housing portion 860, a fluid pathway is formed through the first fluid conduit 862 of the first housing portion 860, through the first fluid conduit 852 of the cartridge top 850, through the tubular conduit 821 of the insert 820, to the lower portion 813 of the vessel 811. In addition, the assembly of the cartridge 810, the insert 820, the cartridge top 850, and the first housing portion 860 forms a fluid pathway from the lower portion 813 of the vessel 811, through the holes 825 of the insert 820, through the second fluid conduit 853 of the cartridge top 850, to the second fluid conduit 863 of the first housing portion 860.

In certain embodiments, each container 800 has a unique key/key notch pair. Such embodiments advantageously prevent swapping or installation of chemical materials into the wrong container. For example, by using unique keys 858 and key notches 864 for the first container 134 and the second container 144, a cartridge 810 containing sanitizing agent can not be installed in the second container 144 and a cartridge 810 containing pH-modifying material can not be installed in the first container 134.

In certain embodiments, to replace an old cartridge 810, the user pulls the handle 859 upward until the cartridge assembly 910 is removed from the housing 900. The old cartridge 810 is unscrewed from the cartridge top 850 and the water remaining in the old cartridge 810 is emptied into the water feature. In certain embodiments, to install a new cartridge 810, a cap on the new cartridge 810 is removed and the cartridge top 850 is screwed onto the cartridge 810 in its place. The protrusions of the first outlet 852*b* and the second inlet 853*a* puncture the membrane 842 of the cartridge 810, allowing fluid communication with the chemical material within the cartridge 810. Such embodiments advantageously prevent exposure of the user to the chemical material within the cartridge 810. In certain embodiments in which a cartridge 810 is refilled rather than replaced by a new cartridge 810, the water within the cartridge 810 is removed from the cartridge 810 before introducing additional dry chemical material into the cartridge 810, thereby avoiding overflow of water displaced from the cartridge 810 by the dry chemical material.

In certain embodiments in which the container 800 contains dry chemical material, the incoming water which mixes with the dry chemical material is advantageously introduced into the bottom of the container 800 and is withdrawn through the top of the container 800. Such flow pathways advantageously allow dispersion of the dry chemical material and the solution within the container 800 remains saturated by virtue of the excess dry chemical material at the bottom of the container 800. As the dry chemical material is consumed, it continues to dissolve until the solution within the container 800 has a concentration substantially the same as the concentration in the water feature.

In certain embodiments, the third container 154 comprises a sensor (e.g., conductivity sensor, level switch) which detects the liquid level in the vessel 811 of the third container 154 and generates a signal indicative of the liquid level. In certain embodiments, the controller 120 is responsive to the signal to generate a warning to the user when the liquid level is decreased below a predetermined level so that the user can replace or replenish the third container 154. In certain embodiments, the sensor comprises an electrolytic cell positioned approximately one inch above the lower portion 823 of the tubular conduit 821, which extends to the lower portion 813 of the vessel 811. Such embodiments provide sufficient safety margin in avoiding calibrant depletion.

In certain embodiments, the third container 154 which contains the liquid calibrant material is similar to the container 800 described above, but without the cartridge 810 and the gasket 830. In certain such embodiments, the liquid calibrant material is poured directly into the housing 900. Because the calibrant material is not corrosive, secondary containment is not warranted. An exemplary housing 900 compatible with embodiments described herein holds approximately 0.7 liters, which is approximately equal to the amount of calibrant material used over the course of three months with approximately 4 weeks between calibrations.

Figure 16:
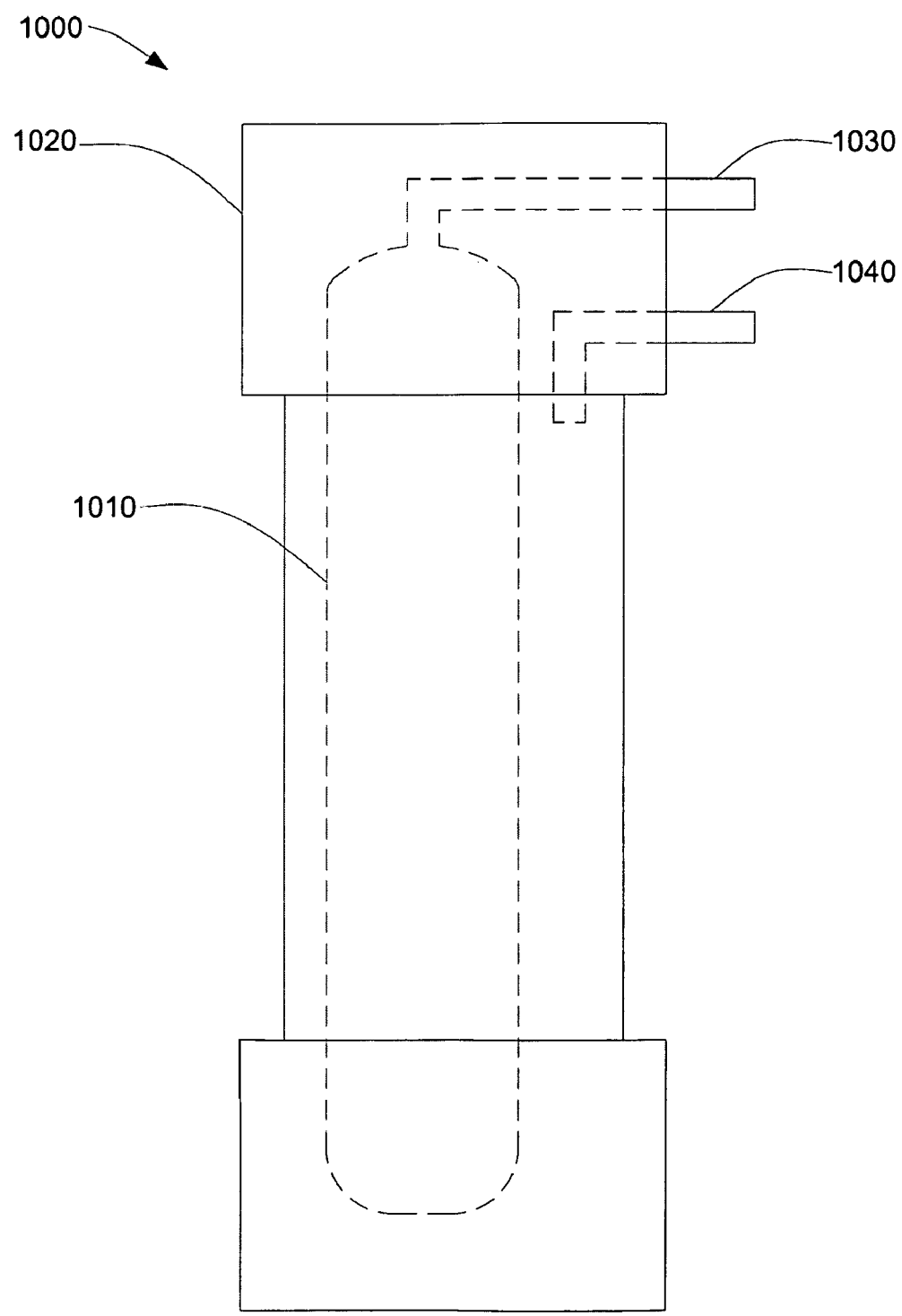
FIG. 16 schematically illustrates an exemplary container compatible with embodiments in which the chemical material within the container is in liquid form.

FIG. 16 schematically illustrates an exemplary container 1000 compatible with embodiments in which the chemical material within the container 1000 is in liquid form. The container 1000 comprises a collapsible vessel 1010 (e.g., a compressible bag) which contains the liquid chemical material (e.g., sterilizing agent material, pH-modifying material, calibrant material) to be introduced into the water feature. The container 1000 further comprises a housing 1020, a first fluid conduit 1030, and a second fluid conduit 1040. The collapsible vessel 1010 is within the housing 1020. The first fluid conduit 1030 is fluidly coupled to the inside of the collapsible vessel 1010, and the second fluid conduit 1040 is fluidly coupled to the volume defined by the outside of the collapsible vessel 1010 and the inside of the housing 1020.

In certain embodiments, the collapsible vessel 1010 is replaceable such that when the chemical material in the vessel 1010 is depleted, the vessel 1010 can be removed and a new vessel 1010 installed in its place. In other embodiments, the vessel 1010 is refillable such that when the chemical material in the vessel 1010 is depleted, the vessel 1010 can be removed, additional chemical material is placed in the vessel 1010, and the vessel 1010 is replaced. In still other embodiments, the vessel 1010 is refillable without removing the vessel 1010 from the container 1000 by introducing replacement chemical material into the vessel 1010 through the first fluid conduit 1030.

In certain embodiments, the housing 1020 provides a generally airtight enclosure in which the vessel 1010 is installed. The first fluid conduit 1030 provides a pathway for the chemical material to be removed from the vessel 1010. The second fluid conduit 1040 provides a pathway for air or other gas or liquid to enter the housing 1020 surrounding the vessel 1010. In certain embodiments, sufficient pressure is provided to the air through the second fluid conduit 1040 to allow the chemical material to be withdrawn from the vessel 1010 through the first fluid conduit 1030 (e.g., by suction on the first fluid conduit 1030 or by sufficient air pressure on the second fluid conduit 1040 to force the chemical material out of the vessel 1010).

Containers compatible with embodiments described herein (e.g., dry/liquid chemical container 800 or liquid chemical container 1000) store the chemical materials used as sterilizing agents or as acidic material or alkaline material for pH control while advantageously preventing corrosive fumes from escaping the container. The mixture of these corrosive fumes with the high temperature, high humidity, and poor ventilation conditions often found in proximity to water features (e.g., under the skirt of a spa) would rapidly corrode all exposed metal components.

Sensor Assembly

In certain embodiments, the sensor assembly 110 comprises a pH level sensor and a sterilizing agent sensor. Exemplary pH sensors compatible with embodiments described herein include, but are not limited to, pH sensors with separate reference and pH-sensing electrodes and pH sensors with a combined reference and pH-sensing electrode. Exemplary sterilizing agent sensors compatible with embodiments described herein include, but are not limited to, amperometric sensors, oxidation reduction potential (ORP) sensors, and colorimetry sensors. Exemplary amperometric sensors compatible with embodiments described herein are described by U.S. Pat. Nos. 6,270,680 and 6,238,555, each of which is incorporated in its entirety by reference herein. Such amperometric sensors can be used to measure the chlorine or bromine concentration in the water. In certain embodiments, the sensor assembly 110 further comprises a temperature sensor, examples of which include, but are not limited to, thermocouples and thermistors. In certain embodiments, the amperometric sensor can be used as both a sanitizing agent sensor and as a total-dissolved-solid (TDS) sensor.

Figure 17:
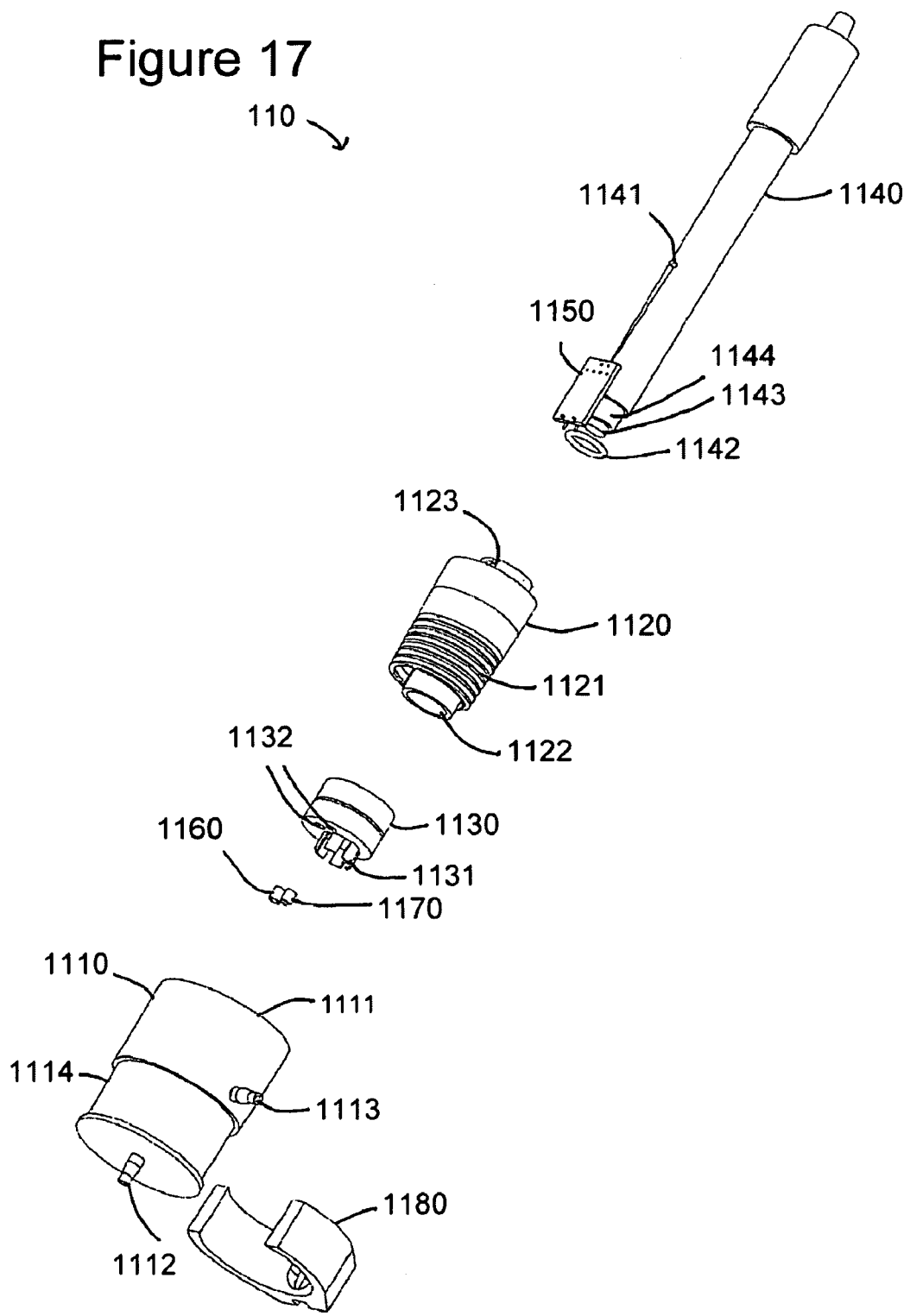
FIG. 17 schematically illustrates an exemplary sensor assembly compatible with embodiments described herein.

FIG. 17 schematically illustrates an exploded view of an exemplary configuration of a sensor assembly 110 compatible with embodiments described herein. In the configuration of FIG. 17, the sensor assembly 110 comprises a tee 1110, a first body portion 1120, a second body portion 1130, a pH sensor 1140, a printed circuit board 1150, an amperometric working electrode 1160, and an amperometric auxiliary electrode 1170.

The tee 1110 of certain embodiments comprises a sensor end 1111 which is configured to receive the first body portion 1120, an outlet 1112, an inlet 1113, and a counterbore 1114. The inlet 1113 is configured to receive water into the sensor assembly 110 and the outlet 1112 is configured to output water from the sensor assembly 110. In certain embodiments, the tee 1110 and the first body portion 1120 comprise a plastic or polymer material which is generally resistant to the chemical materials added to the water of the water feature. Exemplary materials for the tee 1110 and the first body portion 1120 include, but are not limited to, polyvinyl chloride (PVC) and acrylonitrile-butadiene-styrene (ABS).

In certain embodiments, the sensor assembly 110 is operated in an inverted orientation in which the outlet 1112 of the tee 1110 is generally vertical and the inlet 1113 is generally horizontal. In such an orientation, fluid enters the tee 1110 through the inlet 1113, flows across the surfaces of the electrodes 1143, 1144, 1160, 1170, and exits the tee 1110 through the outlet 1113. The inverted orientation of the sensor assembly 110 advantageously minimizes the effect of bubbles on the pH level measurements and/or the sanitizing agent measurements. In certain embodiments, the higher flow velocity across the surfaces of the electrodes 1143, 1144, 1160, 1170 compensates for a reduced flow rate of water through the tee 1110, thereby enabling operation at flow rates between approximately 5 gallons/hour and approximately 10 gallons/hour.

In certain embodiments, the tee 1110 is removably coupled to a mounting clip 1180 fixedly coupled to an enclosure (not shown). The mounting clip 1180 fits around the counterbore 1114 of the tee 1110 so that the tee 1110 can be snapped into place in the enclosure.

The first body portion 1120 of FIG. 17 comprises a screw thread 1121 configured to reversibly couple to a corresponding screw thread of the tee 1110, and a fixture 1122 configured to reversibly couple to the pH sensor 1140. In certain embodiments, the first body portion 1120 is configured to screw into the sensor end 1111 of the tee 1110, forming a waterproof seal. In certain such embodiments, an O-ring (not shown) is compressed between a surface of the sensor end 1111 and a surface of the tee 1110 to form the waterproof seal.

In certain embodiments, the first body portion 1120 is configured to receive the printed-circuit board 1150 and to provide electrical contacts between the printed-circuit board 1150 and the working electrode 1160 and the auxiliary electrode 1170. In certain embodiments, the first body portion 1120 has epoxy potting material which is used to protect the printed-circuit board 1150 from moisture. In certain embodiments, the first body portion 1120 is further configured to receive a housing cover (not shown), which fits over the first body portion 1120 to advantageously provide protection to the pH sensor 1140 and the printed-circuit board 1150. In certain embodiments, the housing cover is advantageously removable from the first body portion 1120 to permit removal of the pH sensor 1140 when it is no longer operational, and to permit replacement by a new pH sensor 1140.

The second body portion 1130 of FIG. 17 comprises a sensor tip guard ring 1131 and a pair of electrode cavities 1132 configured to receive the amperometric working electrode 1160 and the amperometric auxiliary electrode 1170. The sensor tip guard ring 1131 protects the glass end of the pH sensor 1140 from breakage during handling. In certain embodiments, the second body portion 1130 comprises a generally hydrophobic material, examples of which include, but are not limited to, polyetheretherketone (PEEK), polychlorotrifluorethyene (PCTFE or KEL-F®), and ultra-high molecular weight polyethylene. In certain embodiments, the second body portion 1130 is bonded to the first body portion 1120 by an adhesive (e.g., epoxy, solvent cement).

In certain embodiments, the pH sensor 1140 comprises a combination pH sensor having a pH-sensitive electrode 1143 and a reference junction 1144, each of which extends into the water to be measured. In certain embodiments, the pH-sensitive electrode 1143 comprises a glass tube having a hydrogen-sensitive end, a pH measuring material (e.g., potassium chloride and silver chloride having a pH of approximately 7.0) within the glass tube, and a silver wire treated with silver chloride sealed immersed in the pH measuring material. Hydrogen ions in the water to be measured develop an electrical potential across the pH-sensitive glass, thereby varying the signal (e.g., in millivolts) from the pH-sensitive electrode. In certain embodiments, the reference junction 1144 comprises a porous wick material (e.g., Teflon®, porous ceramic, pellon paper) which electrically couples the water to be measured with a reference electrode (not shown) of the pH sensor 1140. The reference electrode comprises a silver wire treated with silver chloride sealed inside an inert glass housing and immersed in potassium chloride saturated with silver chloride. The inert glass housing prevents hydrogen ion activity from the water to be measured from influencing the constant signal (e.g. in millivolts) of the reference electrode.

In certain other embodiments, the pH sensor 1140 has a double-junction reference electrode with two chambers with a gel material in at least one chamber. In certain embodiments the reference electrode of the pH sensor 1140 also serves as a reference electrode for an amperometric sensor comprising the working electrode 1160 and the auxiliary electrode 1170.

In certain embodiments, the pH sensor 1140 is fixedly sealed in the first body portion 1120 forming a waterproof seal using an adhesive, examples of which include, but are not limited to, glue, epoxy, or solvent cement. In certain other embodiments, the pH sensor 1140 is removably sealed in the first body portion 1120 to advantageously allow easy replacement of the pH sensor 1140 once it has reached the end of its usefulness (e.g., due to depletion of the gelled reference). In certain such embodiments, an O-ring 1142 is positioned between a surface of the pH sensor 1140 and a surface of the first body portion 1120 to form a waterproof seal, and the pH sensor 1140 is held in the first body portion 1120 by a reversible mechanism. For example, as schematically illustrated by FIG. 17, the pH sensor 1140 comprises a pin 1141 which fits into a corresponding cam lock 1123 of the first body portion 1120 by twisting the body of the pH sensor 1140 in the fixture 1122. In certain embodiments, the pin 1141 and cam lock 1123 advantageously align the reference junction 1144 between the working electrode 1160 and the auxiliary electrode 1170. Other configurations of the pH sensor 1140 are compatible with embodiments described herein.

In certain embodiments, the amperometric working electrode 1160 and the amperometric auxiliary electrode 1170 are both electrically conductive and extend into the water to be measured. In certain embodiments, the working electrode 1160 and the auxiliary electrode 1170 are each resistant to the chemical materials (e.g., chlorine, bromine, acidic material, alkaline material) introduced into the water feature. Exemplary materials for the electrodes 1160, 1170 include, but are not limited to, graphite, glassy carbon, and titanium coated or plated with a conductive material (e.g., platinum) resistant to the chemical materials introduced into the water feature. In certain embodiments, the working electrode 1160 comprises graphite and the auxiliary electrode 1170 comprises a titanium substrate having a platinum plating.

In certain embodiments the working electrode 1160 and the auxiliary electrode 1170 are pressed into corresponding recesses 1132 of the second body portion 1130 to form an interference fit with a chamfer of the second body portion 1130 to form a waterproof seal in the recesses 1132. In certain other embodiments, at least one of the working electrode 1160 and the auxiliary electrode 1170 are fixedly sealed in the second body portion 1130 using an adhesive (e.g., glue, epoxy, solvent cement) to form a waterproof seal. In other embodiments, the working electrode 1160 and the auxiliary electrode 1170 are insert injection molded to partially encapsulate the electrodes 1160, 1170 into recesses 1132 of the second body portion 1130. Other configurations of the working electrode 1160 and the auxiliary electrode 1170 are compatible with embodiments described herein.

In certain embodiments, the printed-circuit board 1150 fits into the first body portion 1120 and is electrically coupled to the working electrode 1160 and the auxiliary electrode 1170 by conductive elements such as jumpers, wires, and conductive epoxy. In certain embodiments, the printed-circuit board 1150 comprises a memory device (e.g., an electrically erasable programmable read-only memory or EEPROM device) which stores information regarding at least one of the pH sensor 1140 and the amperometric sensor formed by the printed-circuit board 1150 and the electrodes 1160, 1170 (e.g., characteristics, calibration information, and/or encryption information). In certain embodiments, the printed-circuit board 1150 further comprises a temperature sensor coupled to the circuitry of the printed-circuit board 1150 by an interface (e.g., an $I^2C$ serial interface or an SPI communications interface). Other configurations of the printed-circuit board 1150 are compatible with embodiments described herein.

Certain embodiments of the sensor assembly 110 utilize a shielded 6-conductor cable to connect the printed-circuit board 1150 to the controller 120 and a separate shielded cable to connect the pH sensor 1140 to the controller 120. Such embodiments which use separate cables advantageously allows replacement of the pH sensor 1140 while leaving the connection between the controller 120 and the amperometric sensor and the temperature sensor undisturbed.

Chemical Materials

In certain embodiments, the chemical material added to the water (e.g., the pH-modifying material or the sanitizing agent material) is in a dry form or is in a liquid form. Examples of dry forms compatible with certain embodiments described herein include, but are not limited to, water-soluble materials, granular materials, and erodible solid materials. In certain embodiments utilizing granular materials, at least a portion of the dry chemical material remains in an undissolved state when saturated by water.

In certain embodiments, the sterilizing agent material contained in the first container 134 comprises chlorine or bromine, in either dry or liquid form. Exemplary sterilizing agent materials compatible with embodiments described herein include, but are not limited to, the substances listed in Table 1 below, along with some comments on these exemplary substances.

TABLE 1

| | |
|---|---|
| Sodium dichloroisocyanurate ("Dichlor") | Granular; commonly used to sanitize spas; readily available; easy to handle; pH of approximately 6.5. |
| Lithium hypochlorite | Not as readily available as dichlor. |
| Calcium hypochlorite | Not recommended for spas; widely used and suitable for use in swimming pools. |
| Sodium hypochlorite | Not recommended for spas; suitable for use in swimming pools. |
| Trichlor tablets | Usable with spas or pools; pH of approximately 4, so a pH-increasing chemical material is advantageously used with it. |
| Bromine tablets ("BCDMH") | Usable with spas or pools; pH-increasing chemical material may be used instead of acidic material in embodiments in which the spa is used heavily. |

In certain embodiments, the pH-modifying material contained in the second container 144 is acidic, while in other certain embodiments, the pH-modifying material contained in the second container 144 is alkaline. Exemplary alkaline pH-modifying materials compatible with certain embodiments described herein include, but are not limited to, sodium carbonate, sodium hydroxide, and sodium bicarbonate. Exemplary acidic pH-modifying materials compatible with certain embodiments described herein include, but are not limited to, the substances listed in Table 2 below, along with some comments on these exemplary substances.

TABLE 2

| | |
|---|---|
| Sodium bisulfate | |
| Muriatic acid (hydrochloric acid) | Usable in swimming pools but not recommended for spas. |
| Sodium carbonate or sodium bicarbonate | Usable for increasing the pH if an acidic sanitizing agent material is used. |

Integrating automatic calibration into a control design includes a number of challenges with regard to the calibrant material. Calibrant materials typically used are excellent breeding grounds for bacteria under the warm environment of a spa or heated pool. The bacteria can change the pH level of the calibrant material or can cause various system components to clog with biofilms. In addition, the calibrant material preferably does not interfere with the water chemistry of the water feature. Phosphates commonly used for calibrant materials with a pH of 7.0 can be a food source for algae or bacteria, as well as cause severe scaling in the water feature, even at very low levels.

In certain embodiments, cyanuric acid (CYA) is advantageously used as the calibrant material. CYA exhibits a pKa value of approximately 6.8, making it an excellent choice for a 7.0 pH calibrant material. In addition, CYA is commonly used and found in spas using stabilized chlorine such as dichlor, and does not adversely affect the water chemistry of the water feature. In certain embodiments, the calibrant material comprises an aqueous solution of cyanuric acid having a pH level in a range between approximately 6.0 and approximately 7.5.

Because CYA is an organic compound, bacteria growth can still be a problem. In certain embodiments, the calibrant material is initially superchlorinated (e.g., at a level of approximately 100 ppm) to kill any microorganisms that may be present. After a period of time (e.g., one hour), sodium thiosulfate or $H_2O_2$ is added to the calibrant material in excess of the stoichiometry needed to neutralize the chlorine in solution in the calibrant material. The calibrant material is then packaged in an opaque, sealed container. In certain other embodiments, the CYA calibrant material is charged with a high level of chlorine to prevent biofilms from forming. Since CYA is a chlorine stabilizer, 50 parts-per-million of chlorine will remain in solution for months, if the solution is protected from light.

In certain other embodiments, biofilms are advantageously prevented by adding a small amount of sodium chloride (NaCl) to the calibrant material and operating a small electrolytic cell placed within the third container 154. The chlorine generated in this manner can keep the calibrant material free of biofilms for a period of a year or more. In certain embodiments, electrodes typically used for oxygen electrolysis are used in the electrolytic cell. The chloride level of certain embodiments is in a range between approximately 5 milligrams/liter to approximately 500 milligrams/liter. Other embodiments utilize higher concentrations of chloride. In certain embodiments, the calibrant material contains between approximately 5 parts-per-million of NaCl and approximately 10 parts-per-million of NaCl. The chlorine level of such a calibrant material does not exceed these concentrations, such that the calibrant material advantageously provides a known chlorine level for calibration of the sanitizing agent sensor. In certain embodiments, the known chlorine level provides a predetermined sanitizing agent level for calibration. In certain embodiments, the predetermined sanitizing agent level is approximately equal to zero.

Power to the electrolytic cell is applied on a periodic basis to electrolyze the chloride to chlorine. For example, the electrolytic cell can be powered daily, every few hours, or every few minutes. In an exemplary embodiment, the electrolytic cell is operated twice a day for a period of 20 minutes each operation. Chlorine generation preferably does not occur more often so as to prevent formation of hydroxide during operation of the electrolytic cell, which would cause the pH level of the calibrant material to rise.

An exemplary calibrant material compatible with embodiments described herein is a 0.030 mol/liter, pH 7.30 CYA-containing calibrant material. Such a calibrant material is prepared in certain embodiments by adding approximately 0.868 grams of NaOH to approximately 3.951 grams of CYA, and dissolving both compounds in approximately 1 liter of deionized water. In certain embodiments, 5 milligrams/liter of NaCl are added to the calibrant material. The CYA (98%, Catalog No. 18,580-9) and the NaOH (99.99%-semiconductor grade, Catalog No. 30,657-6) are available from Sigma-Aldrich Corp. of Saint Louis, Mo.

In certain embodiments, the electrolytic cell is advantageously used to detect depletion of the calibrant material in the third container 134. Current flowing through the electrolytic cell is measured via a voltage drop across a serial resistor. When the controller 120 detects that the current level has decreased below a nominal value (e.g., less than approximately 0.05 amps), the controller 120 responds by generating a signal indicating that the calibrant material should be replenished. The controller 120 also does not perform any automatic calibration cycles until the condition has been corrected. By not performing automatic calibration cycles with insufficient amounts of calibrant material, certain such embodiments advantageously avoid erroneous calibrations which would otherwise cause erroneous measurements of the pH or sterilizing agent levels.

Controller

Figures 2, 18A:
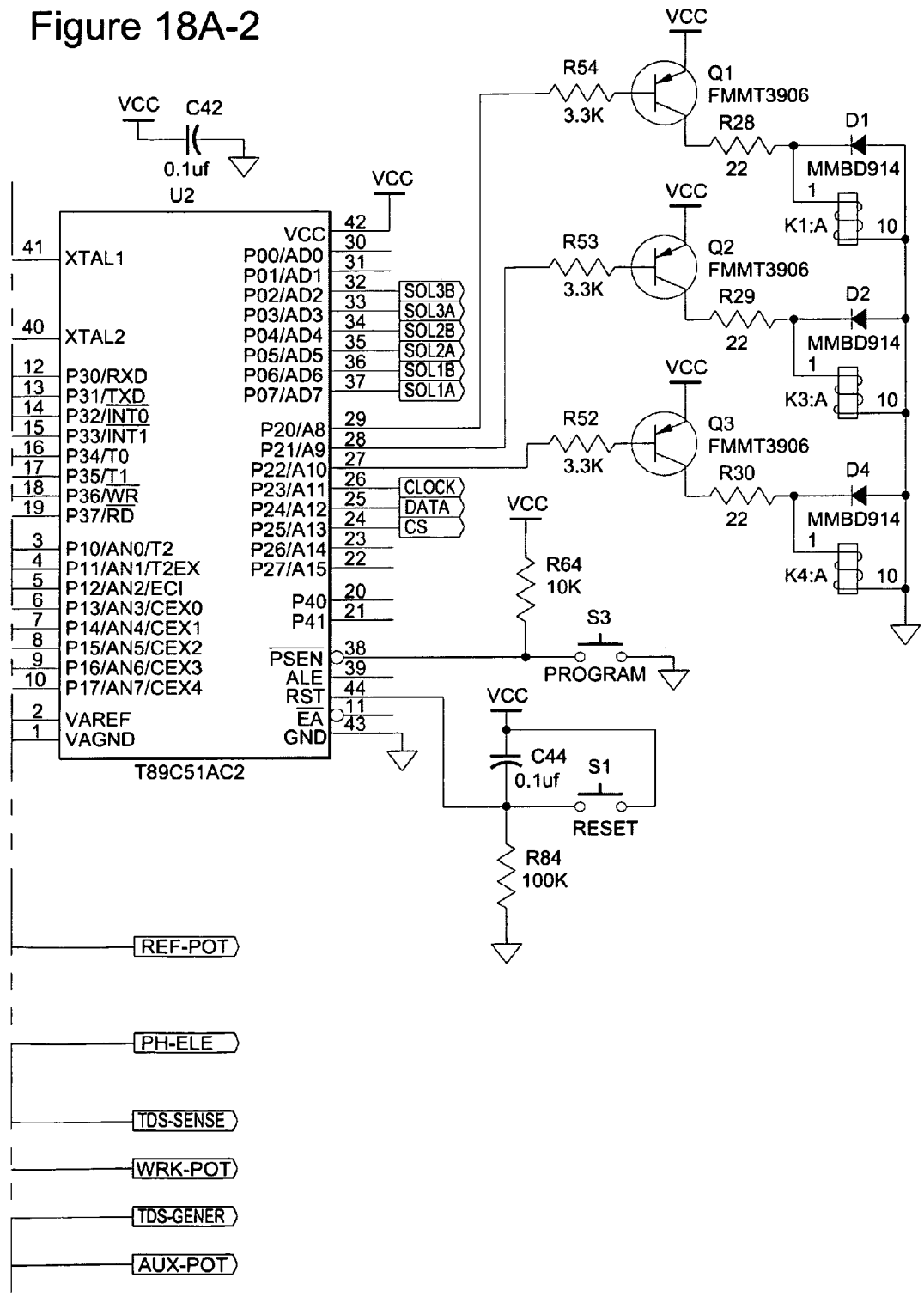
FIG. 18A schematically illustrates an exemplary microprocessor and other exemplary control circuitry for the system.
Figure 18B:
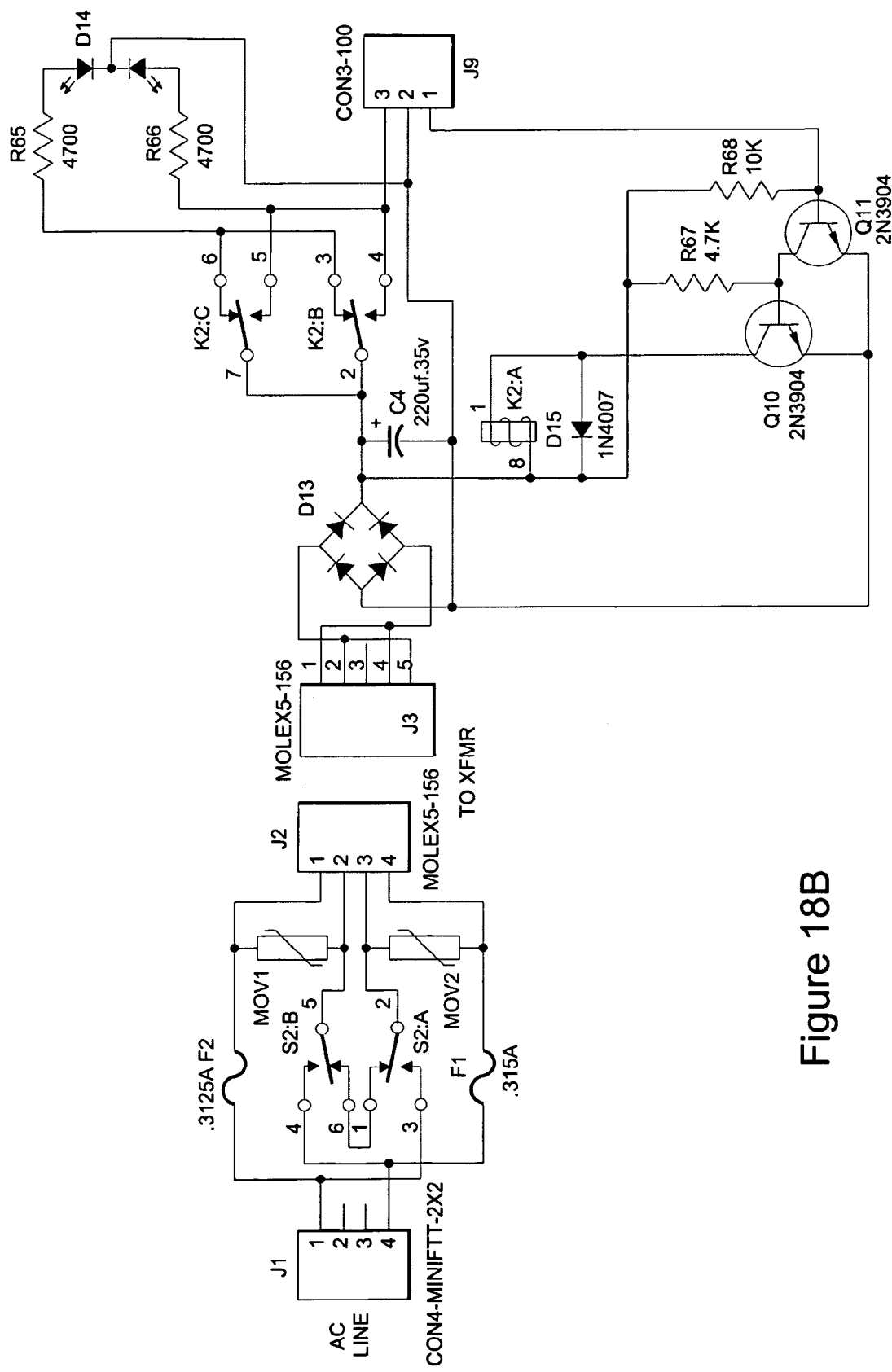
FIG. 18B schematically illustrates an exemplary circuit of a power supply for the system.
Figures 2, 18C:
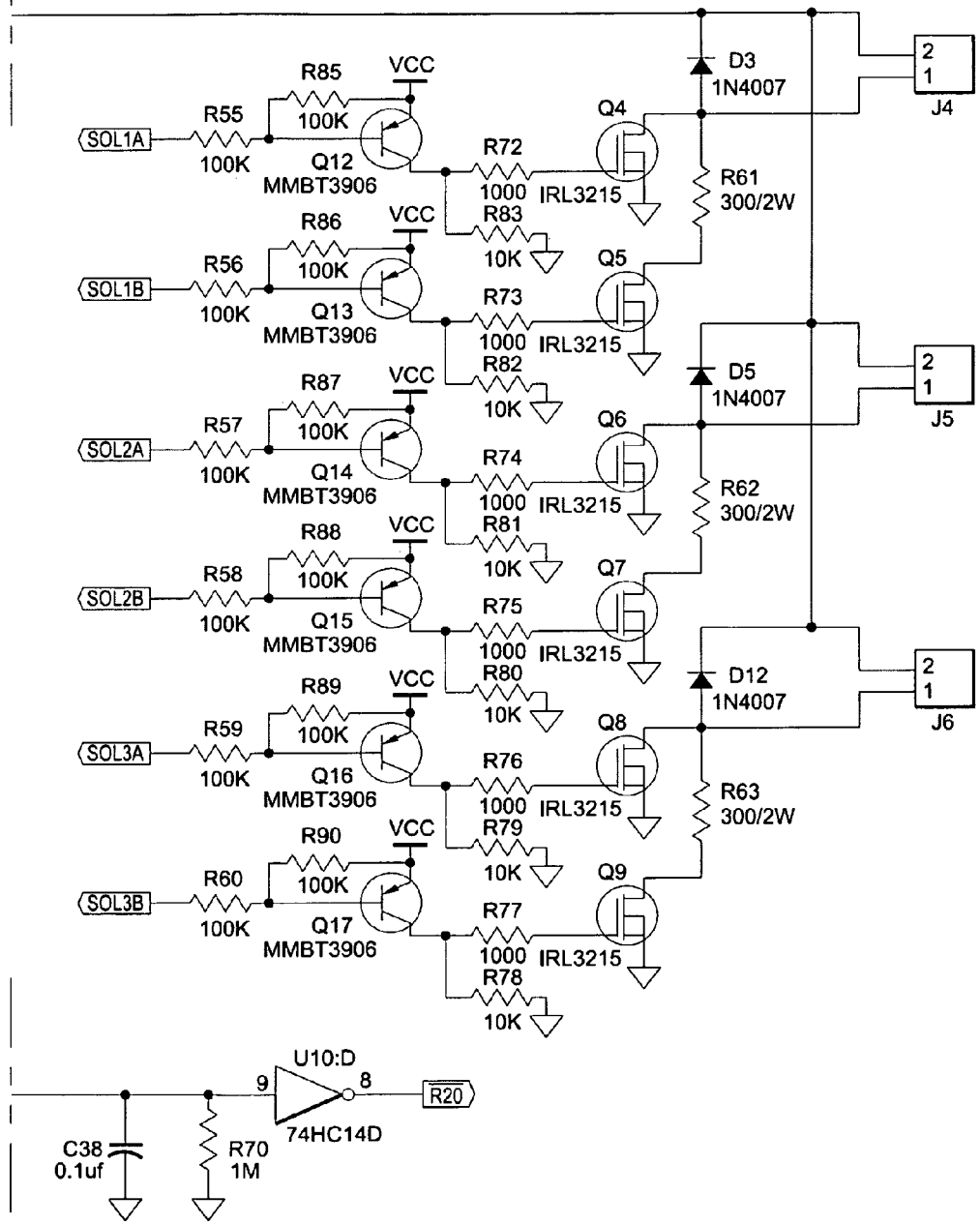
FIG. 18C schematically illustrates an exemplary circuit used for solenoid control for the first valve assembly, the second valve assembly, and the third valve assembly.
Figure 18D:
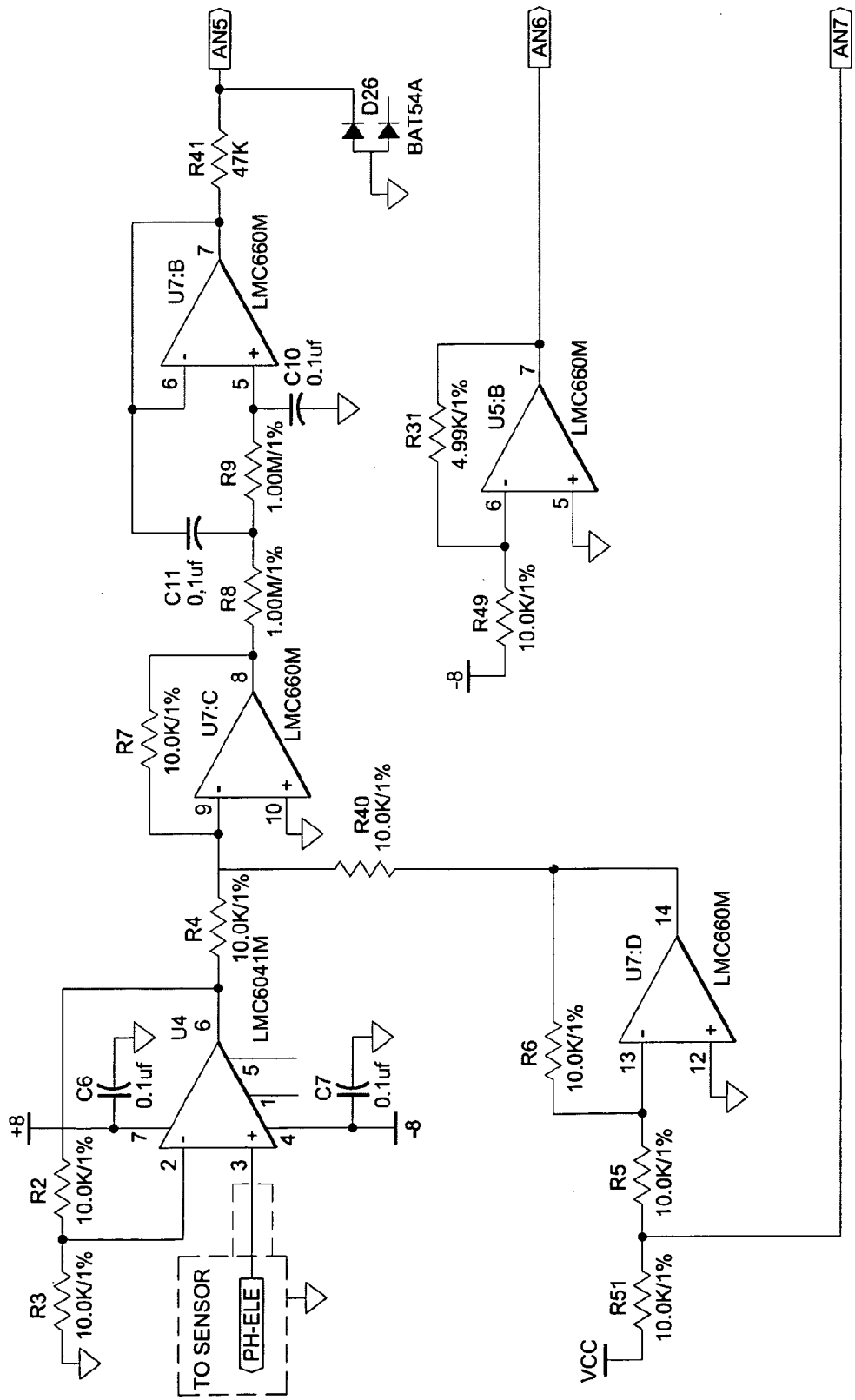
FIG. 18D schematically illustrates an exemplary circuit used during pH level measurements.
Figure 18E:
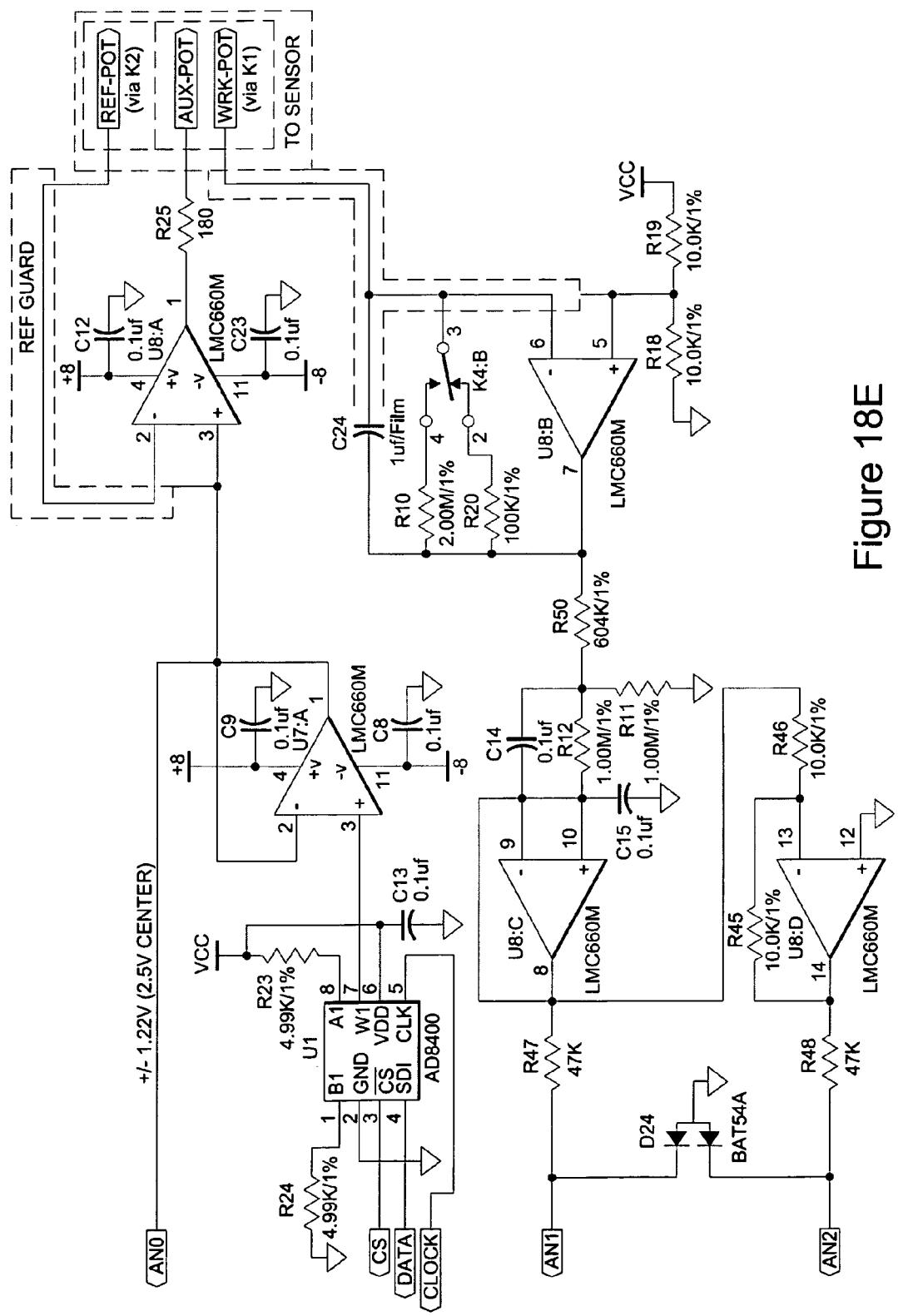
FIG. 18E schematically illustrates an exemplary circuit used during sterilizing agent level measurements.
Figure 18F:
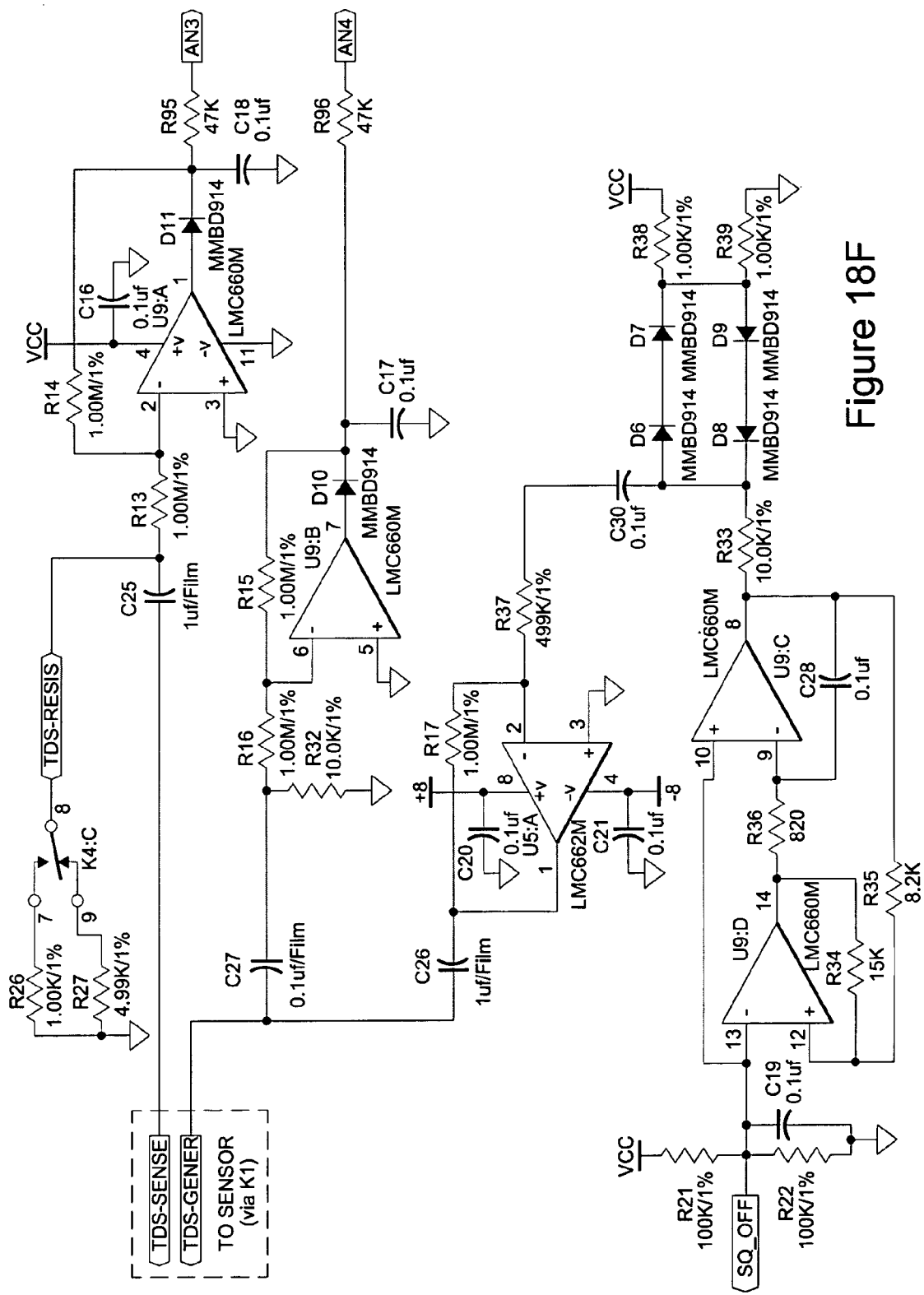
FIG. 18F schematically illustrates an exemplary circuit used during total-dissolved-solid level measurements.

In certain embodiments, the controller 120 comprises electronic circuitry configured to receive signals from the sensor assembly 110 and to transmit control signals to the valve assemblies 132, 142, 152. FIGS. 18A-18F schematically illustrate various portions of an exemplary controller 120 in accordance with certain embodiments described herein. FIG. 18A schematically illustrates an exemplary microprocessor and other exemplary control circuitry for the system 400. FIG. 18B schematically illustrates an exemplary circuit of a power supply for the system 400. FIG. 18C schematically illustrates an exemplary circuit used for solenoid control for the first valve assembly 132, the second valve assembly 142, and the third valve assembly 152. FIG. 18D schematically illustrates an exemplary circuit used during pH level measurements. FIG. 18E schematically illustrates an exemplary circuit used during sterilizing agent level measurements. FIG. 18F schematically illustrates an exemplary circuit used during total-dissolved-solid level measurements. Other circuitry configurations besides those schematically illustrated by FIGS. 18A-18F are also compatible with embodiments described herein.

The controller 120 of certain embodiments comprises a microprocessor which is programmed using software to perform the various actions of the system 400. The controller 120 of other embodiments comprises a microprocessor which is hard-wired to perform the various actions of the system 400. In certain embodiments, the microprocessor (labeled U2 in FIG. 18A) is a T89C51AC2 8-bit microcontroller unit available from Atmel Corporation of San Jose, Calif. Persons skilled in the art can select other microprocessors compatible with embodiments described herein.

In certain embodiments, a pressure switch J12 is responsive to the pressure of the circulation system by sending a corresponding signal to the microprocessor U2. The microprocessor U2 determines whether the pressure is sufficient for operation of the system 400. In certain embodiments, the pressure switch is a differential pressure switch. In other embodiments, a flow switch is used in place or in conjunction with the pressure switch. The flow switch is responsive to the water flow rate of the circulation system by sending a corresponding signal to the microprocessor U2 which determines whether the flow rate is sufficient for operation of the system 400. In certain other embodiments, the controller 120 comprises a magnetic switch interlock which turns off the power to the system 1300 in the event that the system 1300 is removed from the water feature.

In certain embodiments, the controller 120 is operable in a plurality of modes of operation. In a first mode of operation, the controller 120 performs pH level measurements. In a second mode of operation, the controller 120 performs sanitizing agent level measurements. In a third mode of operation, the controller 120 performs total-dissolved-solid level measurements.

When performing pH level measurements, a relay K3 switches the sensor reference to ground and switches the pH-sensitive electrode to a PH-ELE voltage provided by the circuit schematically illustrated by FIG. 18D. In certain embodiments, the ground of the pH-sensing circuit is selectively decoupled from a system ground and is selectively coupled to the auxiliary electrode 1170 when performing pH level measurements. This selectively decoupling from the system ground in certain embodiments advantageously avoids stray currents in the high-impedance pH-sensing circuit. When performing a sanitizing agent measurement or a TDS measurement, the relay K3 switches the sensor reference to a REF-POT voltage provided by the circuit schematically illustrated by FIG. 18E and switches the pH-sensitive electrode to ground. In certain embodiments, the pH-sensitive electrode is at ground or zero volts when the pH electrode is not in operation so that the corresponding input to the microprocessor U2 is not floating. In addition, a ground or zero level on the pH-sensitive electrode in certain embodiments corresponds to a pH of 7.0, thereby providing a control of whether the microprocessor U2 is operating correctly.

When performing pH level measurements or when performing TDS level measurements, a relay K1 switches the working electrode 1160 to a TDS-SENSE voltage and the auxiliary electrode 1170 to a TDS-GENER voltage, where both TDS-SENSE and TDS-GENER are provided by the circuit schematically illustrated by FIG. 18F. For pH level measurements, the working-electrode 1160 and the auxiliary electrode 1170 are thus AC-coupled to the circuit of FIG. 18E with no DC path that would otherwise affect the pH level measurement. When performing a sanitizing agent level measurement, the relay K1 switches the working electrode 1160 to a WRK-POT voltage and switches the auxiliary electrode 1170 to an AUX-POT voltage, where both WRK-POT and AUX-POT are provided by the circuit schematically illustrated by FIG. 18E. In certain embodiments, the relays K3, K1 comprise 5-volt relays which are controlled directly by I/O pins of the microprocessor U2, and have approximately 22 ohms to limit the current to approximately 25 milliamps.

System Operation

Figure 19:
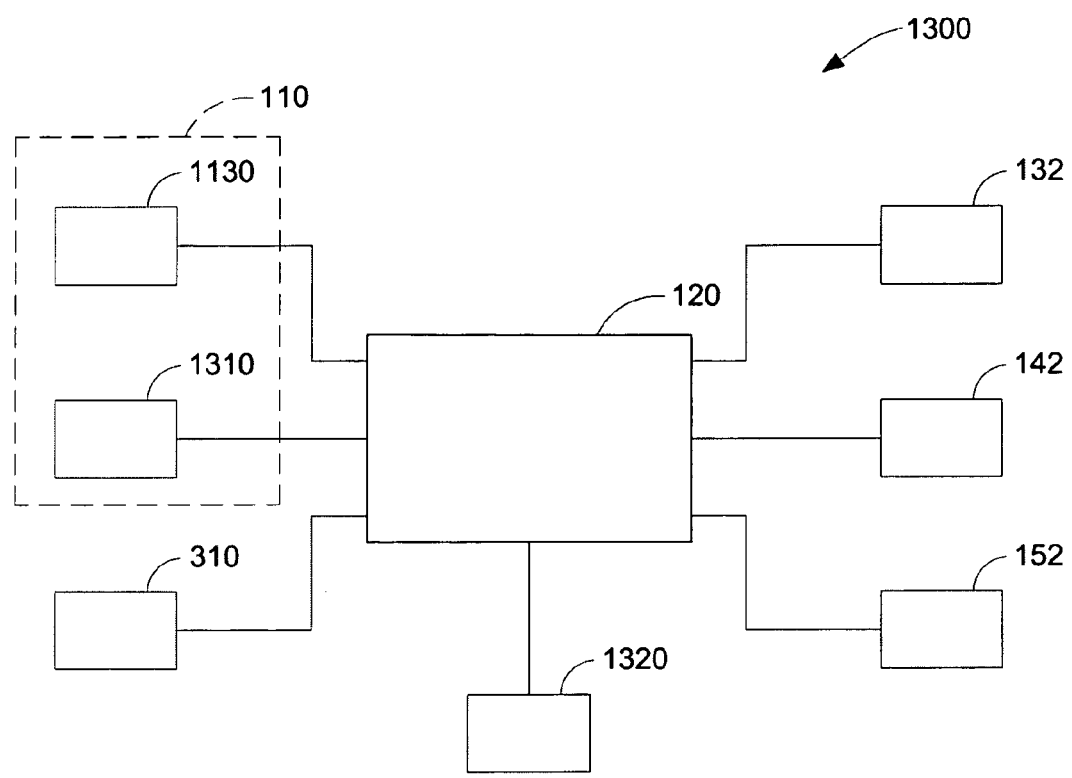
FIG. 19 schematically illustrates an exemplary system compatible with embodiments described herein.

FIG. 19 schematically illustrates an exemplary system 1300 compatible with embodiments described herein. The system 1300 comprises a sensor assembly 110 comprising a pH sensor 1140 and an amperometric sensor 1310, a controller 120, a first valve assembly 132, a second valve assembly 142, a third valve assembly 152, a flow sensor 310, and a display 1320. The controller 120 is electrically coupled to the pH sensor 1140, the amperometric sensor 1310, the flow sensor 310, the first, second, and third valve assemblies 132, 142, 152, and the display 1320. The controller 120 receives a pH signal from the pH sensor 1140, a sanitizing signal from the amperometric sensor 1310, and a flow rate signal from the flow sensor 310. The controller 120 transmits control signals to the first, second, and third valve assemblies 132, 142, 152 and status signals to the display 1320.

In certain embodiments, the display 1320 comprises an alphanumeric display (e.g., liquid-crystal display, cathode-ray tube, thin-film transistor display), while in other embodiments, the display 1320 comprises indicator lights (e.g., incandescent, fluorescent, light-emitting diodes). The display 1320 of certain embodiments comprises both an alphanumeric display and at least one indicator light. The display 1320 of certain embodiments further comprises buttons, switches, or other input devices electrically coupled to the controller 120 and through which the user can control or modify the programming of the controller 120. In certain embodiments, the display 1320 is spaced away from the other components of the system 1300. For example, if the controller 120 is installed underneath a spa skirt, the display 1320 can be coupled to the controller 120 by a communication interface. In certain other embodiments, the display 1320 is integral with the other components of the system 1300 and is viewable behind an easily accessible cover.

Figure 20A:
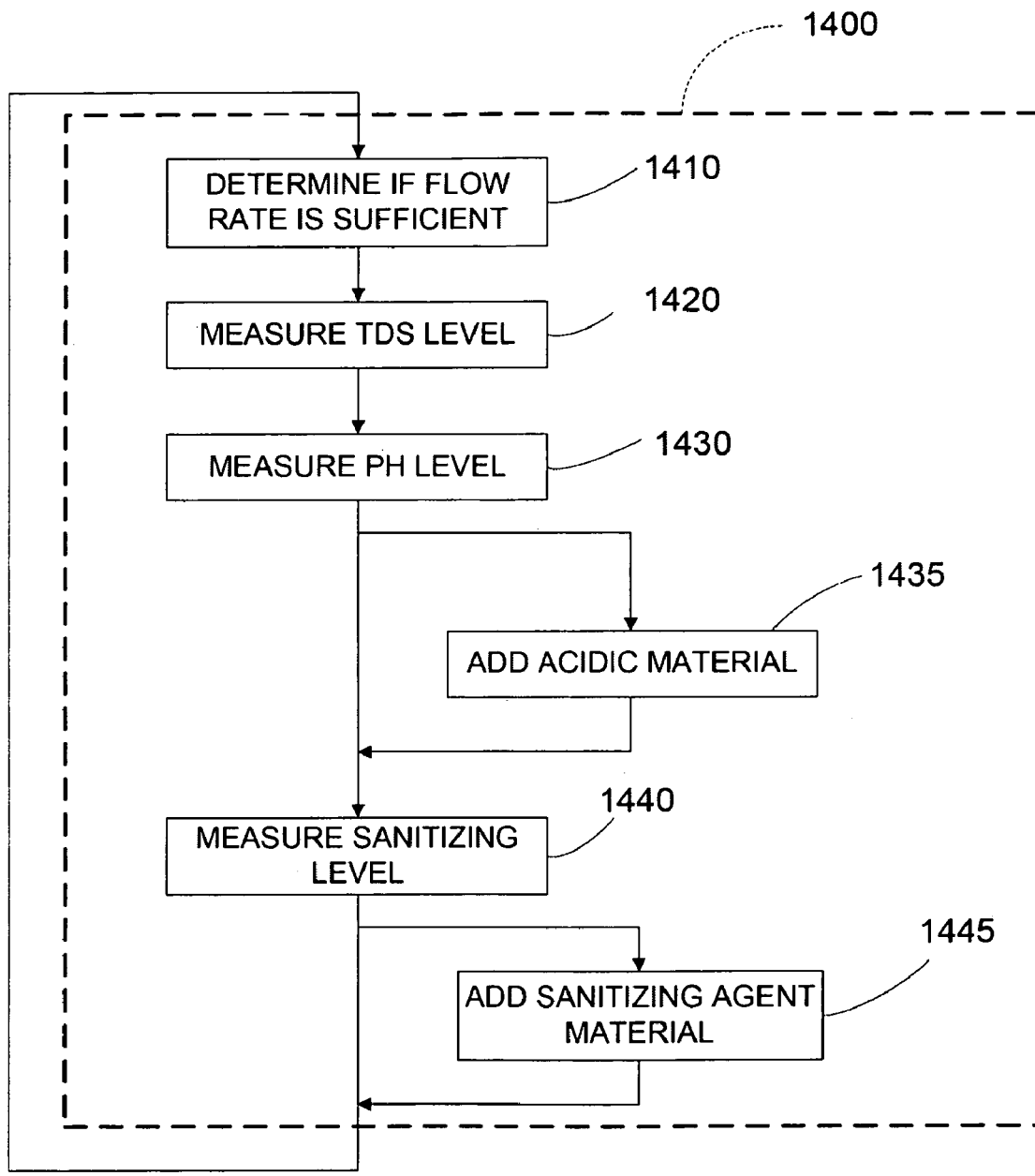
FIG. 20A is a flow diagram of an exemplary measurement cycle compatible with embodiments described herein.

FIG. 20A is a flow diagram of an exemplary measurement cycle 1400 compatible with embodiments described herein. The cycle 1400 comprises determining if the flow rate is sufficient for operation in an operational block 1410. If the flow rate is below a predetermined flow rate, then the controller 120 sends a "Flow Rate Failure" status signal to the display 1320. If the flow rate is above the predetermined flow rate, then the controller 120 continues the measurement cycle 1400. The cycle 1400 further comprises measuring the TDS level in an operational block 1420, measuring a pH level in an operational block 1430, measuring a sanitizing agent level in an operational block 1440. If the measured pH level is above a predetermined value, the cycle 1400 comprises adding pH-modifying material to the water feature in an operational block 1435. If the measured sanitizing agent level is below a predetermined value (e.g., a chlorine level below 1.5 ppm), the cycle 1400 comprises adding sanitizing agent material to the water feature in an operational block 1445. In certain embodiments, the system 1300 repeats the cycle 1400 at regular intervals (e.g., every four minutes). Other cycles 1400 compatible with embodiments described herein include other operational steps or have other sequences of operational steps.

Figure 20B:
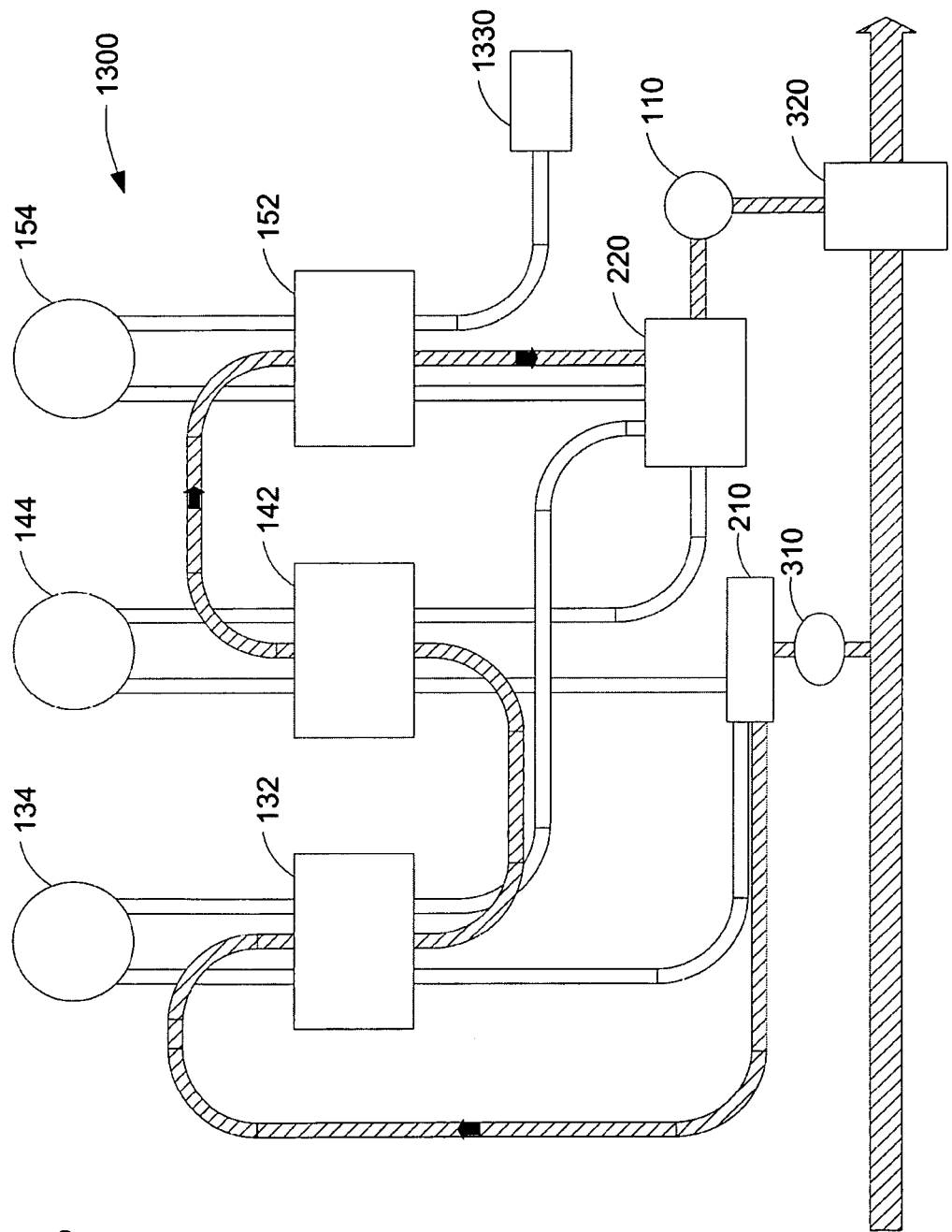
FIG. 20B schematically illustrates an exemplary fluid flow pattern for the system when in the measurement mode.

FIG. 20B schematically illustrates an exemplary fluid flow pattern for the system 1300 when in the measurement mode (e.g., in operational blocks 1410, 1420, 1430, 1440 of FIG. 20A). The system 1300 comprises the sensor assembly 110, controller 120 (not shown in FIG. 20B for clarity), first valve assembly 132, first container 134, second valve assembly 142, second container 144, third valve assembly 152, and third container 154. Each of the first, second, and third valve assemblies 132, 142, 152 has three valves configured as schematically illustrated by FIG. 5A. The system 1300 further comprises the pressure manifold 210, the vacuum manifold 220, the flow sensor 310 and the venturi tee 320. The system 1300 further comprises a vent 1330 fluidly coupled to the third valve assembly 152. Other configurations of the system 1300 are also compatible with embodiments described herein. The directions of fluid flow through the system 1300 for the measurement mode schematically illustrated by FIG. 20B are indicated by arrows.

In the measurement mode flow pattern of FIG. 20B, no sterilizing agent, no pH-modifying material, and no calibrant material is currently added to the water of the water feature. In the flow pattern of FIG. 20B, water flows from the water feature, past the flow sensor 310, through the pressure manifold 210, through the first, second, and third valve assemblies 132, 142, 152, through the vacuum manifold 220, through the sensor assembly 110 across the sensor electrodes 1143, 1144, 1160, 1170, and through the venturi tee 320 to return to the water feature. In this configuration, the sensor assembly 110 monitors the sanitization agent level and the pH level of the water flowing through the sensor assembly 110 and sends corresponding sanitization signals and pH signals to the controller 120.

During the measurement mode, the first, second, and third valve assemblies 132, 142, 152 are not energized in certain embodiments. As described above in relation to FIGS. 6A and 6B, the non-energized first, second, and third valve assemblies 132, 142, 152 close the valves coupled to the first, second, and third containers 134, 144, 154 and open the valves which permit water to flow from the pressure manifold 210, through the first, second, and third valve assemblies 132, 142, 152, to the vacuum manifold 220, as schematically illustrated by FIG. 20B.

In the operational block 1420 of FIG. 20, the system 1300 determines if the TDS level is above a predetermined level. The TDS level is of interest in certain embodiments in which the amperometric sensor 1310 needs a minimum TDS level to provide accurate measurements of the sanitizing agent level (e.g., at least approximately 200 ppm of NaCl or at least approximately 400 ppm of NaCl). In certain such embodiments, an initial salt charge is added to the water to ensure that the TDS level is above a predetermined level. In certain other embodiments, the sensitivity of the sanitizing agent level measurement of the amperometric sensor 1310 is dependent on the TDS level, as illustrated by Table 3, which gives relative percent deviations of the chlorine sensitivity of an amperometric sensor 1310 for various TDS levels. In certain embodiments, the controller 120 compensates for variations in the sensitivity of the amperometric sensor 1310 by using the measured TDS level and the known sensitivity as a function of the TDS level.

TABLE 3

Chlorine sensitivity versus TDS level (in ppm)

|  | 200 | 300 | 400 | 600 | 1000 |
|---|---|---|---|---|---|
| Sensitivity (mV/ppm) | 0.603 | 0.603 | 0.582 | 0.582 | 0.478 |
| Relative Percent Deviation | N/A | 0% | −2% | −2% | −12% |

Figure 21:
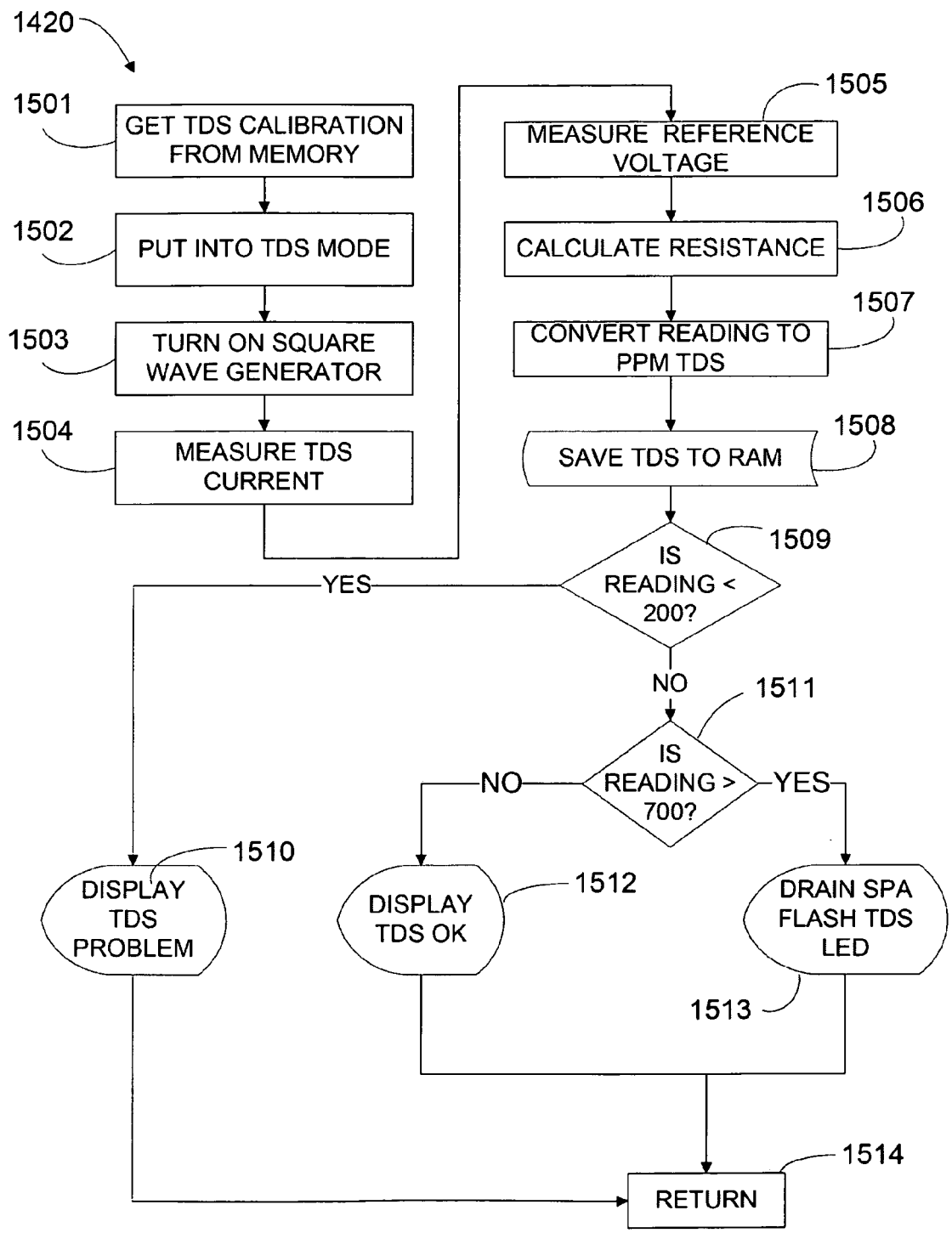
FIG. 21 is a flow diagram of an exemplary process for measuring the total-dissolved-solid (TDS) level using the amperometric sensor.

In certain embodiments, the amperometric sensor 1310 is used to measure the TDS level. FIG. 21 is a flow diagram of an exemplary process comprising operational blocks 1501-1514. The process of measuring the TDS level in the operational block 1420 comprises using the circuitry schematically illustrated by FIGS. 18A and 18F to measure the TDS level using the amperometric sensor 1310. In certain embodiments, if the TDS level is below a first predetermined level (e.g., 200 ppm) as determined in the operational block 1509, the controller 120 sends a "TDS Problem" error signal to the display 1320 and shuts down the system 1300 in an operational block 1510. If the TDS level is above a second predetermined level (e.g., 700 ppm or 2000 ppm) as determined in the operational block 1511, the controller 120 sends a "Drain Spa" error signal to the display 1320 in the operational block 1513. Other processes for measuring the TDS level are compatible with embodiments described herein.

Figure 22:
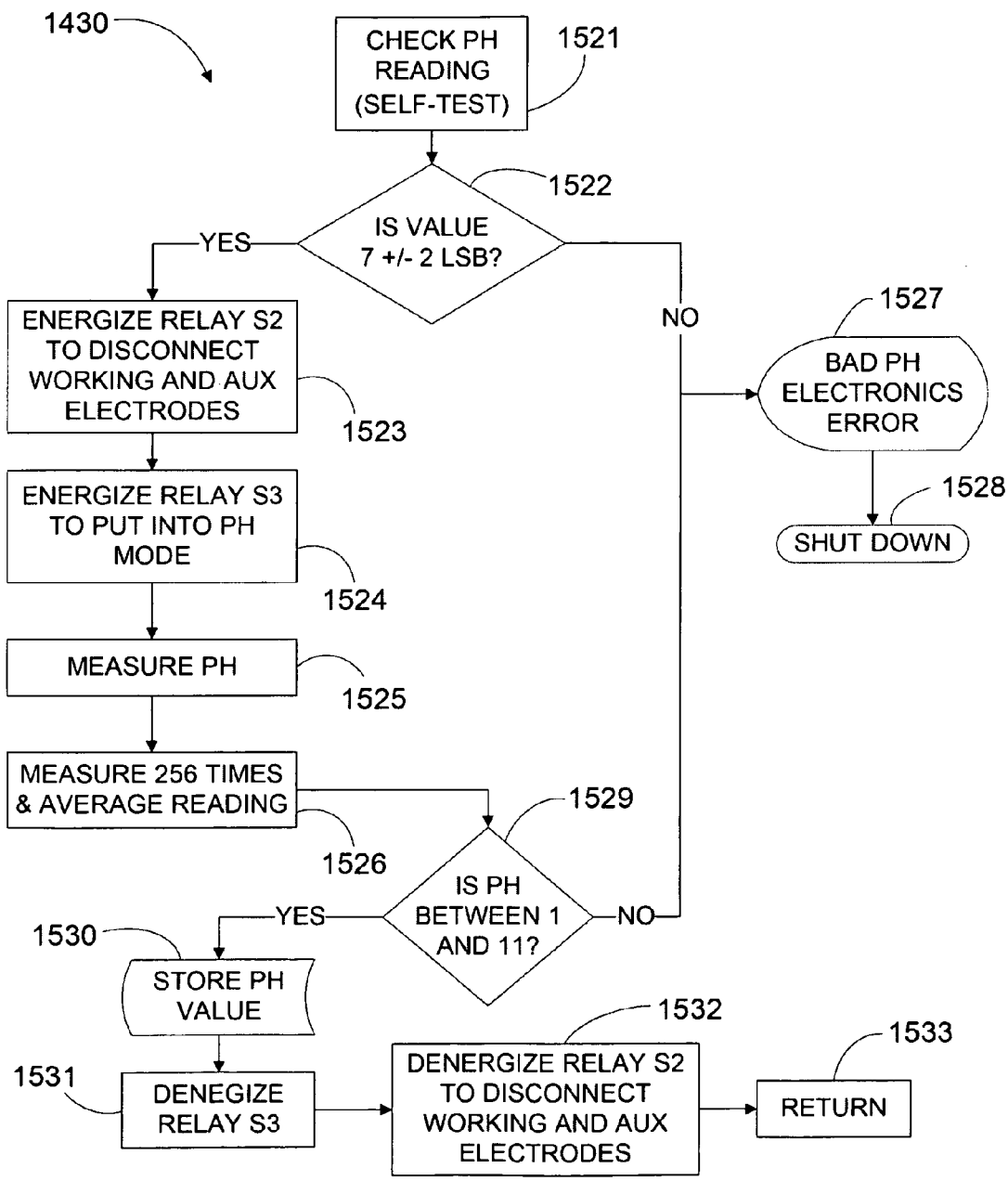
FIG. 22 is a flow diagram of an exemplary process for measuring the pH level.

In the operational block 1430 of FIG. 20, the system 1300 measures the pH level. FIG. 22 is a flow diagram of an exemplary process comprising operational blocks 1521-1533. The process of measuring the pH level in the operational block 1430 comprises using the circuitry schematically illustrated by FIGS. 18A and 18D to measure the pH level using the pH sensor 1140. In certain embodiments, if a self-test pH level in the operational block 1521 generates a value that is not substantially equal to 7.0 (e.g., a value which deviates from 7.0 by more than two lowest-significant bits of the controller 120) as determined in the operational block 1522, the controller sends a "Bad pH Electronics" error signal to the display 1320 in the operational block 1527 and shuts down the system 1300 in an operational block 1528. Similarly, if the measured pH level is not within a predetermined range (e.g., between 1 and 11) as determined in the operational block 1529, the controller 120 sends a "Bad pH Electronics" error signal to the display 1320 in the operational block 1527 and shuts down the system 1300 in the operational block 1528. Other processes for measuring the pH level are also compatible with embodiments described herein.

Figure 23:
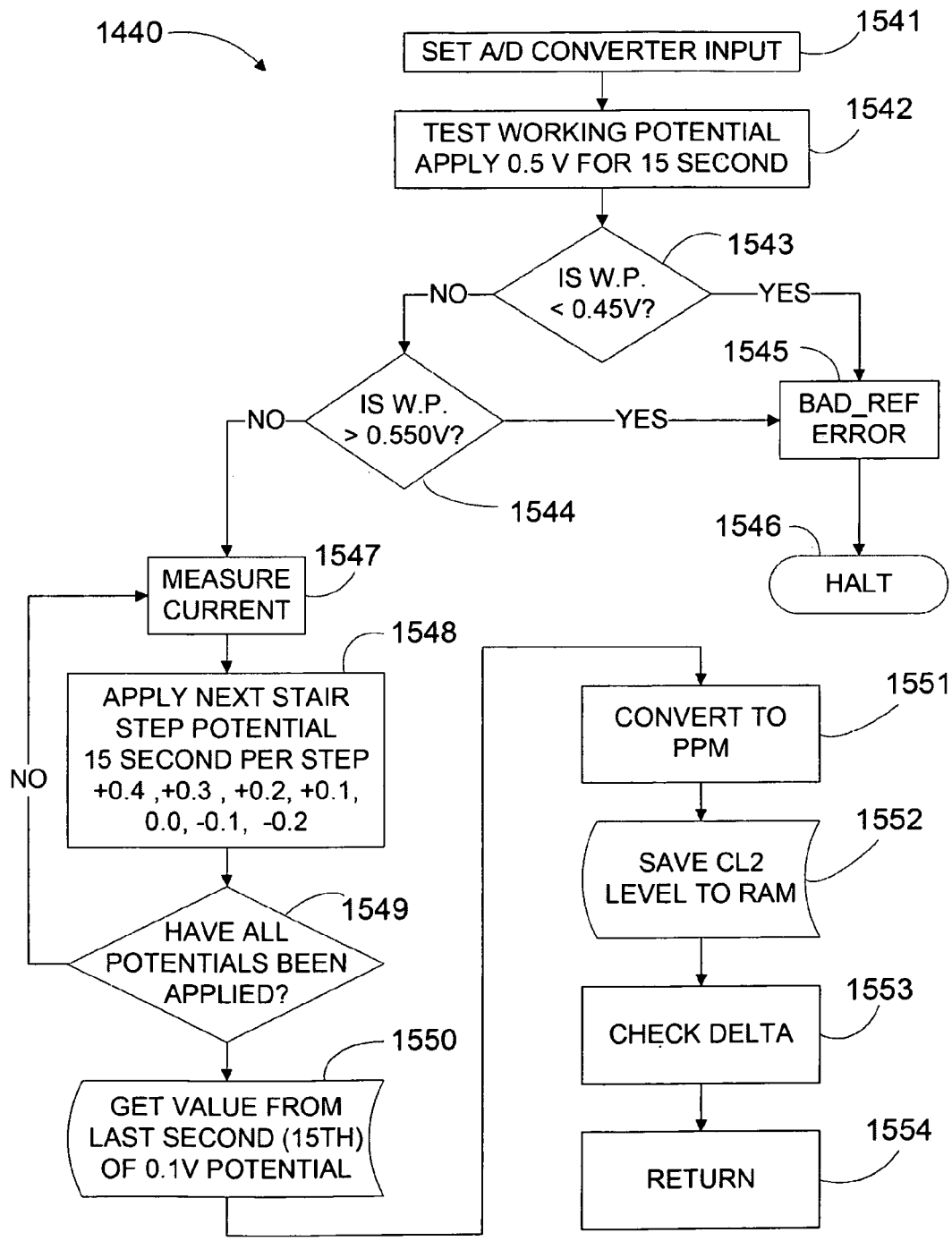
FIG. 23 is a flow diagram of an exemplary process for measuring the sanitizing agent level.

In the operational block 1440 of FIG. 20, the system 1300 measures the sanitizing agent level. FIG. 23 is a flow diagram of an exemplary process comprising operational blocks 1541-1554. The process of measuring the sanitizing agent level in the operational block 1440 comprises using the circuitry schematically illustrated by FIGS. 18A and 18E to measure the sanitizing agent (e.g., chlorine) level using the amperometric sensor 1310. In certain embodiments, if the potential of the working electrode 1160 is below 0.45 volts as determined in the operational block 1543 or is above 0.55 volts as determined in the operational block 1544, the controller 120 sends a "Bad Ref" error signal to the display 1320 in the operational block 1545. The system 1300 measures the chlorine level using the amperometric sensor 1310 in operational blocks 1547, 1548, 1549, 1550, converts the reading from the amperometric sensor 1310 into parts-per-million (ppm) in the operational block 1551, stores the chlorine level in memory in the operational block 1552, and checks the change (or delta) from a previous measurement of the chlorine level in an operational block 1553. Other processes for measuring the sanitizing agent level are also compatible with embodiments described herein.

Figure 24:
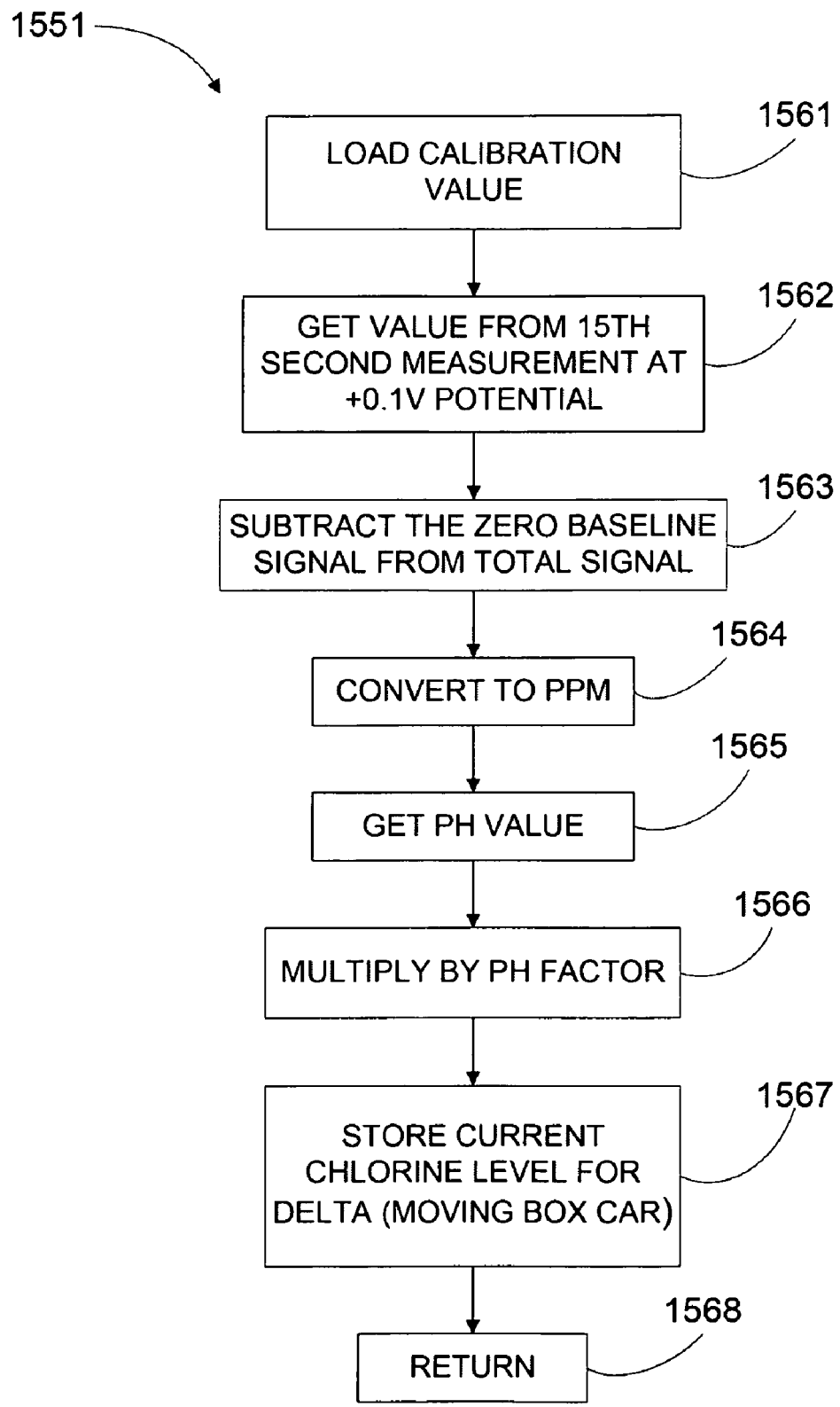
FIG. 24 is a flowchart of an exemplary process in which the reading from the amperometric sensor is converted into parts-per-million (ppm).
Figure 25:
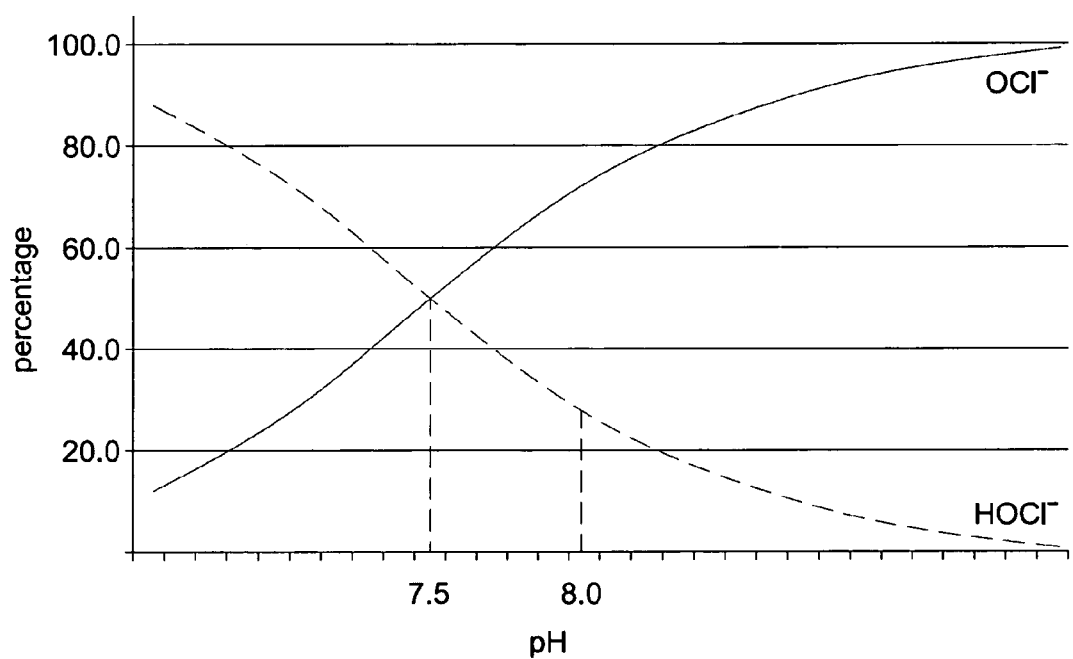
FIG. 25 is a graph of the $HOCl^-$ percentage and the $OCl^-$ percentage as a function of pH.

FIG. 24 is a flowchart of an exemplary process in which the reading from the amperometric sensor 1310 is converted into ppm in the operational block 1551, which comprises operational blocks 1561-1568. In certain embodiments in which the amperometric sensor 1310 primarily measures $HOCl^-$, and not $OCl^-$, a correction factor is applied to adjust for the pH level of the water since the equilibrium of the $HOCl^-$/$OCl^-$ dissociation is pH-dependent. For example, since the pKa of chlorine is 7.5, at a pH of 7.5, 50% of the chlorine in the water is in the form of $HOCl^-$ and 50% of the chlorine is in the form of $OCl^-$. But at a pH of 8.0, only 24% of the chlorine will be present as $HOCl^-$, with the remainder present as $OCl^-$. FIG. 25 is a graph of the $HOC^-$ percentage and the $OCl^-$ percentage as a function of pH.

In certain embodiments, the correction factor is included in the programming (e.g., software, hardware, or both) of the controller 120. Table 4 lists various values of the $[OCl^-]$ concentration and the $[HOCl^-]$ concentration, and the ratio $R=[OCl^-]/[HOCl^-]$ for various pH values.

TABLE 4

| pH | [OCl⁻] | [HOCl⁻] | R |
|---|---|---|---|
| 6.60 | 11.2 | 88.8 | 0.126 |
| 6.70 | 13.7 | 86.3 | 0.158 |
| 6.80 | 16.6 | 83.4 | 0.200 |
| 6.90 | 20.1 | 79.9 | 0.251 |
| 7.00 | 24.0 | 76.0 | 0.316 |

TABLE 4-continued

| pH | [OCl⁻] | [HOCl⁻] | R |
|---|---|---|---|
| 7.10 | 28.5 | 71.5 | 0.398 |
| 7.20 | 33.4 | 66.6 | 0.501 |
| 7.30 | 38.7 | 61.3 | 0.631 |
| 7.40 | 44.3 | 55.7 | 0.794 |
| 7.50 | 50.0 | 50.0 | 1.000 |
| 7.60 | 55.7 | 44.3 | 1.259 |
| 7.70 | 61.3 | 38.7 | 1.585 |
| 7.80 | 66.6 | 33.4 | 1.995 |
| 7.90 | 71.5 | 28.5 | 2.512 |
| 8.00 | 76.0 | 24.0 | 3.162 |
| 8.10 | 79.9 | 20.1 | 3.981 |
| 8.20 | 83.4 | 16.6 | 5.012 |
| 8.30 | 86.3 | 13.7 | 6.310 |
| 8.40 | 88.8 | 11.2 | 7.943 |
| 8.50 | 90.9 | 9.1 | 10.000 |
| 8.60 | 92.6 | 7.4 | 12.589 |
| 8.70 | 94.1 | 5.9 | 15.849 |
| 8.80 | 95.2 | 4.8 | 19.953 |
| 8.90 | 96.2 | 3.8 | 25.119 |
| 9.00 | 96.9 | 3.1 | 31.623 |
| 9.10 | 97.5 | 2.5 | 39.811 |
| 9.20 | 98.0 | 2.0 | 50.119 |
| 9.30 | 98.4 | 1.6 | 63.096 |
| 9.40 | 98.8 | 1.2 | 79.433 |
| 9.50 | 99.0 | 1.0 | 100.000 |

To calculate the actual chlorine concentration, the amperometric reading in ppm is divided by the [HOCl⁻] concentration. For example, a pH level of 7.9 corresponds to a [OCl⁻] concentration of 71.5% and a [HOCl⁻] concentration of 28.5%, and a ratio of 2.512. An amperometric reading before correction of 2.00 then corresponds to an actual value of 2.0/0.72=2.80 after correction.

Figure 26:
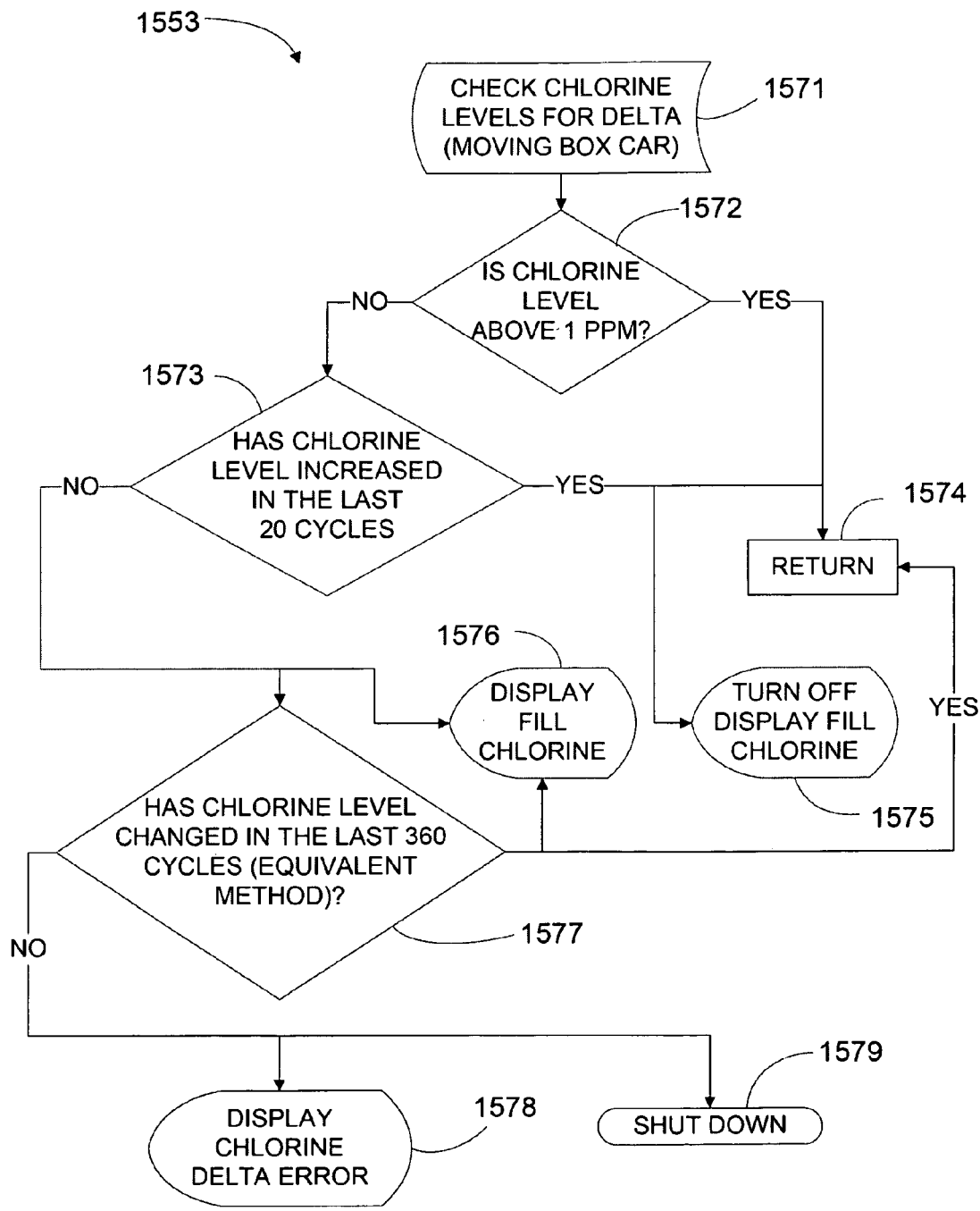
FIG. 26 is a flowchart of an exemplary process in which the system checks the delta of the chlorine level measurements.

FIG. 26 is a flowchart of an exemplary process in which the system 1300 checks the delta of the chlorine level measurements in the operational block 1553, which comprises operational blocks 1571-1579. In certain embodiments, changes of the chlorine levels are checked repeatedly in a moving box car calculation in an operational block 1571. In the moving box car calculation, a current chlorine level measurement is compared to previous chlorine level measurements which were a predetermined number of measurements previous to the current measurement. If the chlorine level drops below a predetermined level (e.g., 1 ppm) as determined in an operational block 1572, the controller 120 checks whether the chlorine level has increased within a first predetermined number of cycles (e.g., 20) as determined in an operational block 1573. If not, the controller 120 sends a "Fill Chlorine" error signal to the display 1320 in an operational block 1576. Furthermore, if the chlorine level has not changed within a second predetermined number of cycles (e.g., 360) as determined in the operational block 1577, the controller 120 sends a "Chlorine Delta Error" error signal to the display 1320 in an operational block 1578 and shuts down the system 1300 in an operational block 1579.

If the pH level is above a predetermined level (e.g., 7.5), the controller 120 sends a "pH High" error signal to the display 1320 and performs the operational block 1435 in which acidic material is added to the water feature. In certain embodiments, the controller 120 waits for a predetermined period of time (e.g., four minutes) between cycles in which acidic material is added to the water feature. If the pH level is below a second predetermined value (e.g., 7.0), the controller 120 sends a "pH Low" error signal to the display 1320. If the pH level is between the first predetermined level and the second predetermined level, the controller 120 sends a "pH OK" status signal to the display 120.

Figure 27A:
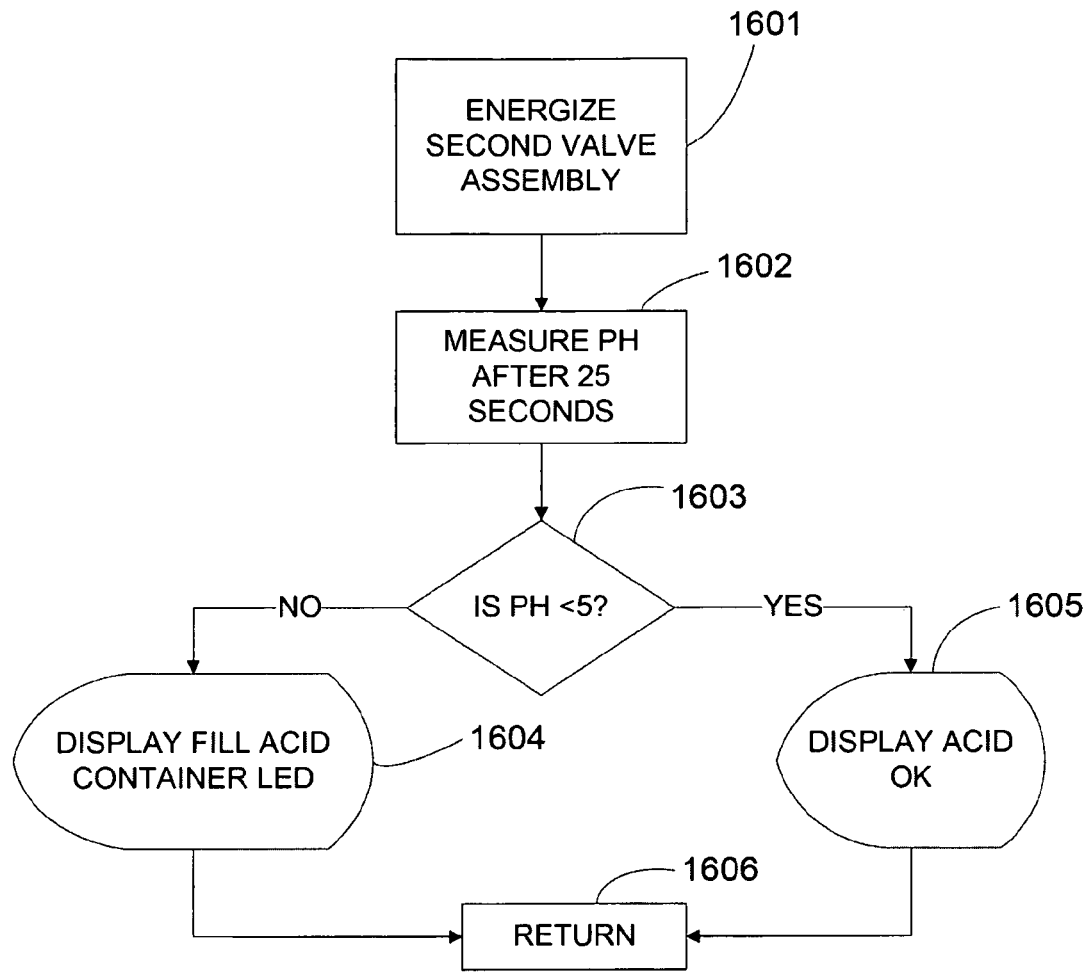
FIG. 27A is a flow diagram of an exemplary process for adding the pH-modifying material to the water feature.
Figure 27B:
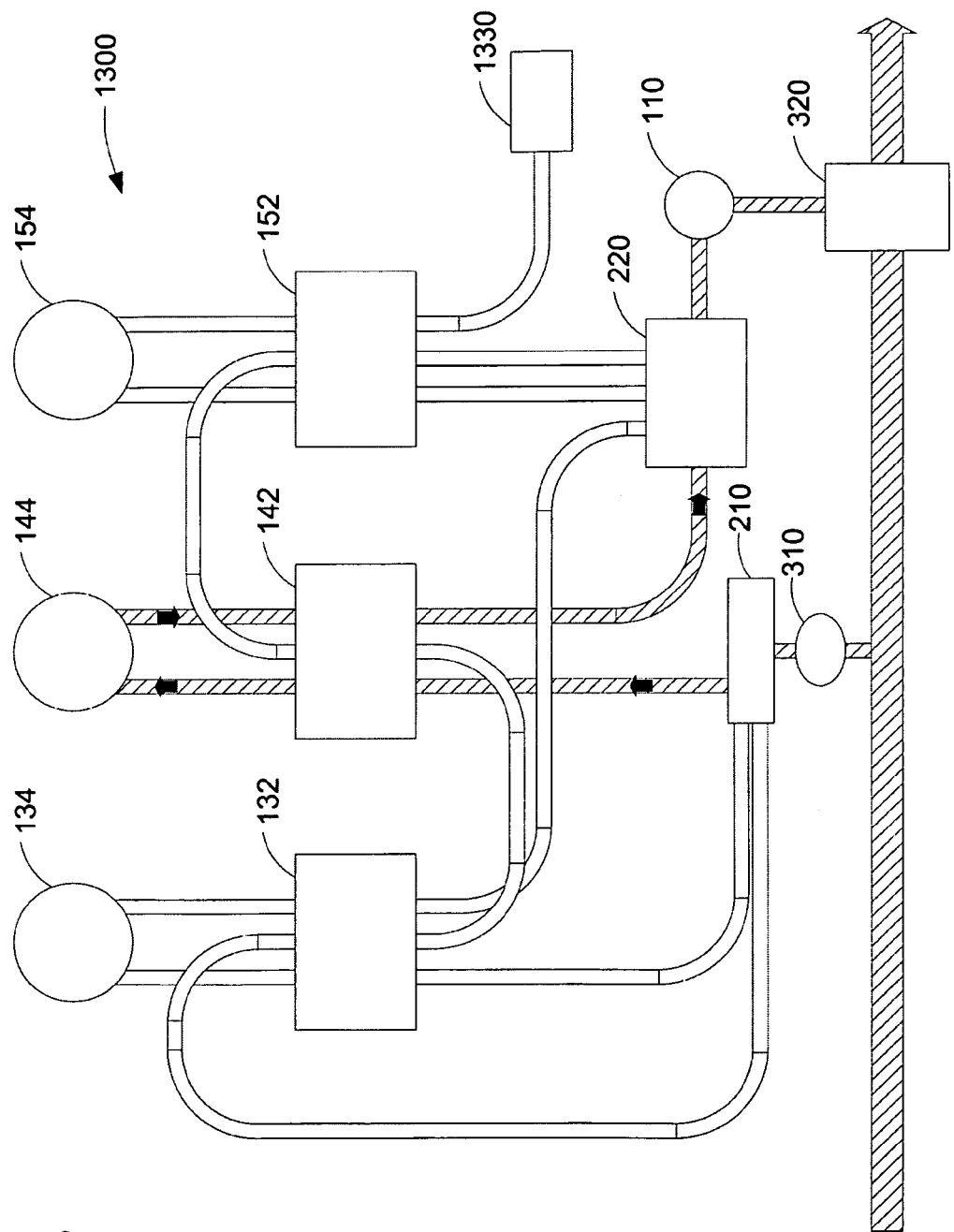
FIG. 27B schematically illustrates the fluid flow pattern of the system corresponding to FIG. 27A.

FIG. 27A is a flow diagram of an exemplary process for adding acidic material in the operational block 1435, which comprises operational blocks 1601-1606. In an operational block 1601, the second valve assembly 142 is energized, and FIG. 27B schematically illustrates the resulting fluid flow pattern for the system 1300. When energized, the second valve assembly 142 allows water to flow from the pressure manifold 210, into the second container 144 to mix with the acidic material contained therein, and to flow out of the second container 144, through the vacuum manifold 220, through the sensor assembly 110 and across the sensor electrodes 1143, 1144, 1160, 1170, through the venturi tee 320, to return to the water feature. In certain embodiments, the second valve assembly 142 halts the flow from the pressure manifold 210 to the vacuum manifold 220 schematically illustrated by FIG. 20B. In certain embodiments, the acidic material from the second container 144 advantageously flows across the sensor electrodes 1143, 1144, 1160, 1170 to remove salt build-up and keep the sensor electrodes 1143, 1144, 1160, 1170 clean. In certain other embodiments, a crystal modifier is added to the water to prevent sensor contamination due to deposits of iron, calcium sulfate, or calcium phosphate from changing the surface of one or more of the electrodes 1143, 1144, 1160, 1170.

In certain embodiments, the second valve assembly 142 is energized for a predetermined period of time (e.g., 30 seconds). The period of time of certain embodiments is variable by the controller 120 to provide more or less acidic material, depending on the pH level measurement. The period of time of certain embodiments is also variable to take into account the depletion of the acidic material in the second container 144.

In certain embodiments, the system 1300 monitors the pH level of the fluid coming from the second container 144 to monitor whether the second container 144 needs to be replaced or replenished. In an operational block 1602, the pH level of the fluid flowing from the second container 144 is measured. In embodiments in which an acidic material is used as the pH-modifying material, if the pH level is above a predetermined level (e.g., 5.0) as determined in the operational block 1603, the controller 120 sends a "Fill Acid Container" error signal to the display 1320 in an operational block 1604. If the pH level is below the predetermined level as determined in the operational block 1603, the controller 120 sends an "Acid OK" signal to the display 1320 in an operational block 1605. In certain embodiments, the display 1320 continues to indicate the error status of the system 1300 until the condition is corrected (e.g., acidic material is added to the second container 144 or the second container 144 is replaced, and the pH sensor 1140 detects a pH level below the predetermined level).

To ensure that the second container 144 is safe to open and to avoid exposure of the user to residual acid, certain embodiments generate the "Fill Acid Container" signal only when the pH level of the water from the second container 144 is approximately equal to the pH level of the water feature. In certain other embodiments, the controller 120 tracks the number of cycles in which acidic material is added to the water feature to determine whether the acidic material needs to be replenished. Certain other embodiments utilize a level switch, a float switch, a conductivity sensor, or another type of liquid sensor in the second container 144 to detect when the acidic material is depleted. The controller 120 responds to the signal indicative of depletion of the acidic material by sending a warning signal to the display 1320 to prompt the user to replace or replenish the second container 144. Certain other embodiments utilize a paddle wheel flow sensor coupled to the outlet of the second container 144 to monitor the depletion of the acidic material.

If the chlorine level is below a predetermined level (e.g., 2 ppm), the controller 120 sends an "Add Chlorine" error signal to the display 1320 and performs the operational block 1445 in which chlorine is added to the water feature. In certain embodiments, the controller 120 waits for a predetermined period of time (e.g., one to four minutes) between cycles in which acidic material is added to the water feature and cycles in which chlorine is added to the water feature. This period of time advantageously allows the previously-added acidic material to be more evenly distributed through the water before the addition of the chlorine material. If the chlorine level is above a second predetermined value (e.g., 4 ppm), the controller 120 sends a "Chlorine High" error signal to the display 1320. If the chlorine level is between the first predetermined level and the second predetermined level, the controller 120 sends a "Chlorine OK" status signal to the display 120.

Figure 28:
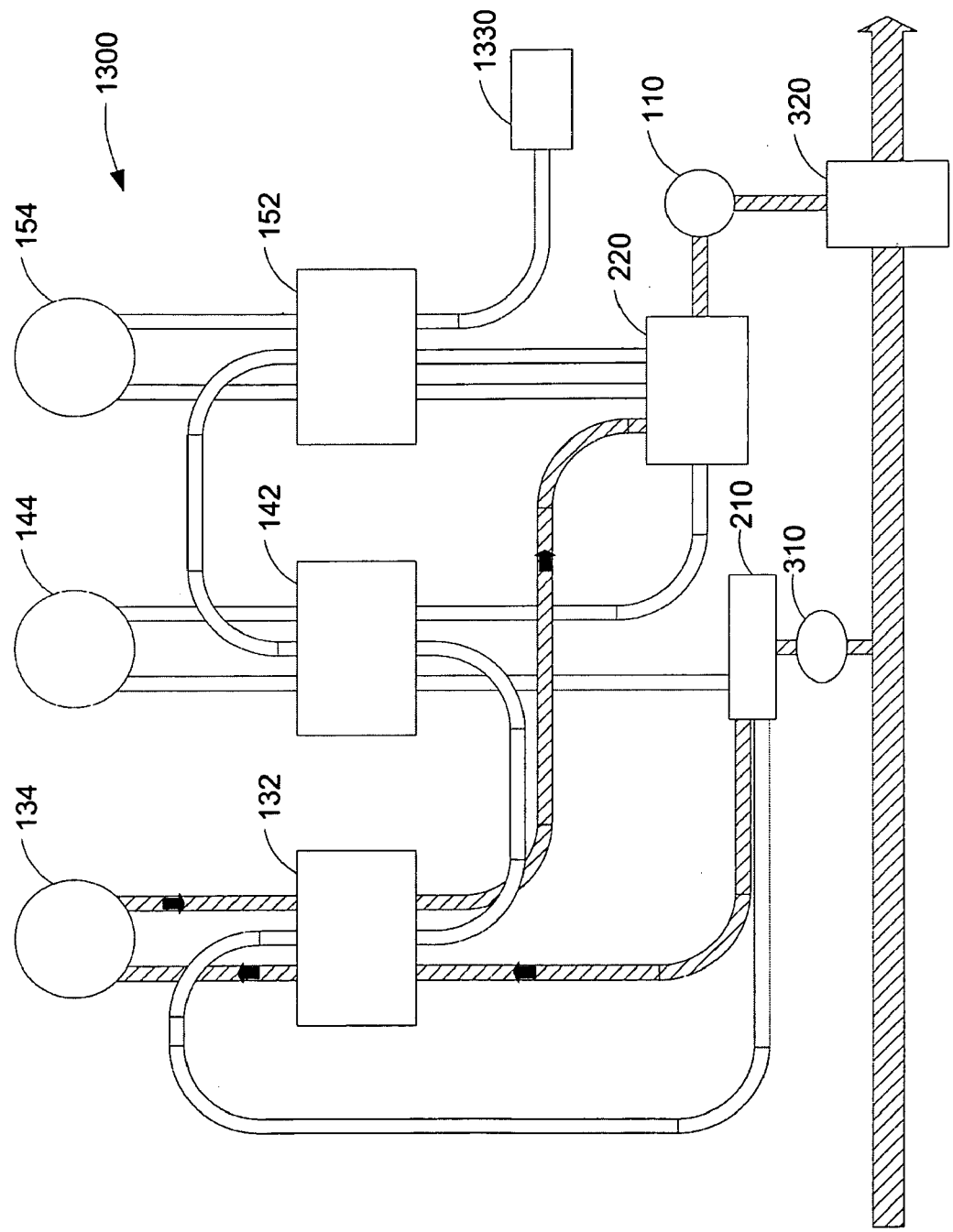
FIG. 28 schematically illustrates the fluid flow pattern for the system when adding sterilizing agent material to the water feature.

FIG. 28 is a fluid flow pattern for the system 1300 when adding sterilizing agent material to the water feature in the operational block 1445. The system 1300 energizes the first valve assembly 132, thereby allowing water to flow from the pressure manifold 210, into the first container 134 to mix with the sanitizing agent material contained therein, and to flow out of the first container 134, through the vacuum manifold 220, through the sensor assembly 110 and across the sensor electrodes 1143, 1144, 1160, 1170, through the venturi tee 320, to return to the water feature. In certain embodiments, the first valve assembly 132 also halts the flow of water from the pressure manifold 210 to the vacuum manifold 220 schematically illustrated by FIG. 20B. In certain embodiments, the first valve assembly 132 is energized for a predetermined period of time (e.g., 30 seconds). The period of time of certain embodiments is variable by the controller 120 to provide more or less chlorine, depending on the chlorine measurement. The period of time of certain embodiments is also variable to take into account the depletion of the sanitizing agent material in the first container 134. In certain embodiments in which dichlor is used as the sanitizing agent material, the chlorine level is adjusted before adjusting the pH level since dichlor is slightly acidic and can reduce the need for the acidic material.

In certain embodiments, the system 1300 monitors whether the first container 134 contains sanitizing agent or whether the first container 134 needs to be replaced or replenished. In certain embodiments in which concentrated sanitizing agent material will not adversely affect the sensor electrodes 1143, 1144, 1160, 1170 by changing their surfaces or otherwise damaging them, the sensor assembly 110 monitors the sanitizing agent level in the water flowing from the vacuum manifold 220 to the venturi tee 320 while sanitizing agent is being added to the water feature. If the sanitizing agent level is below a predetermined level, the controller 120 generates a "Fill Sanitizing Agent" signal which is sent to the display 1320. In other embodiments, the controller 120 tracks the number of cycles in which sanitizing agent is added to the water feature to determine whether the sanitizing agent needs to be replenished. Certain other embodiments, which feed liquid chemicals, utilize a level switch, a float switch, a conductivity sensor, or another type of liquid sensor in the first container 134 to detect when the sanitizing agent material is depleted. In certain embodiments, the controller 120 responds to a signal indicative of the depletion of the sanitizing agent material in the first container 134 by sending a warning signal to the display 1320, which prompts the user to replace or replenish the first container 134. Certain other liquid feed embodiments utilize a paddle wheel flow sensor coupled to the outlet of the first container 134 to monitor the depletion of the sanitizing agent material.

In certain embodiments, the system 1300 undergoes an auto-calibration cycle to check and adjust the calibration of the pH sensor 1140. The auto-calibration cycle of certain embodiments is performed periodically (e.g., every few weeks, monthly, or in response to measurements by the sensor assembly 120). During the auto-calibration cycle, the sensor assembly 110 is exposed to a calibrant material having a predetermined pH level (e.g., approximately 7.0 or between approximately 7.0 and approximately 7.5), and the calibrant material is then discharged into the water feature.

Figure 29:
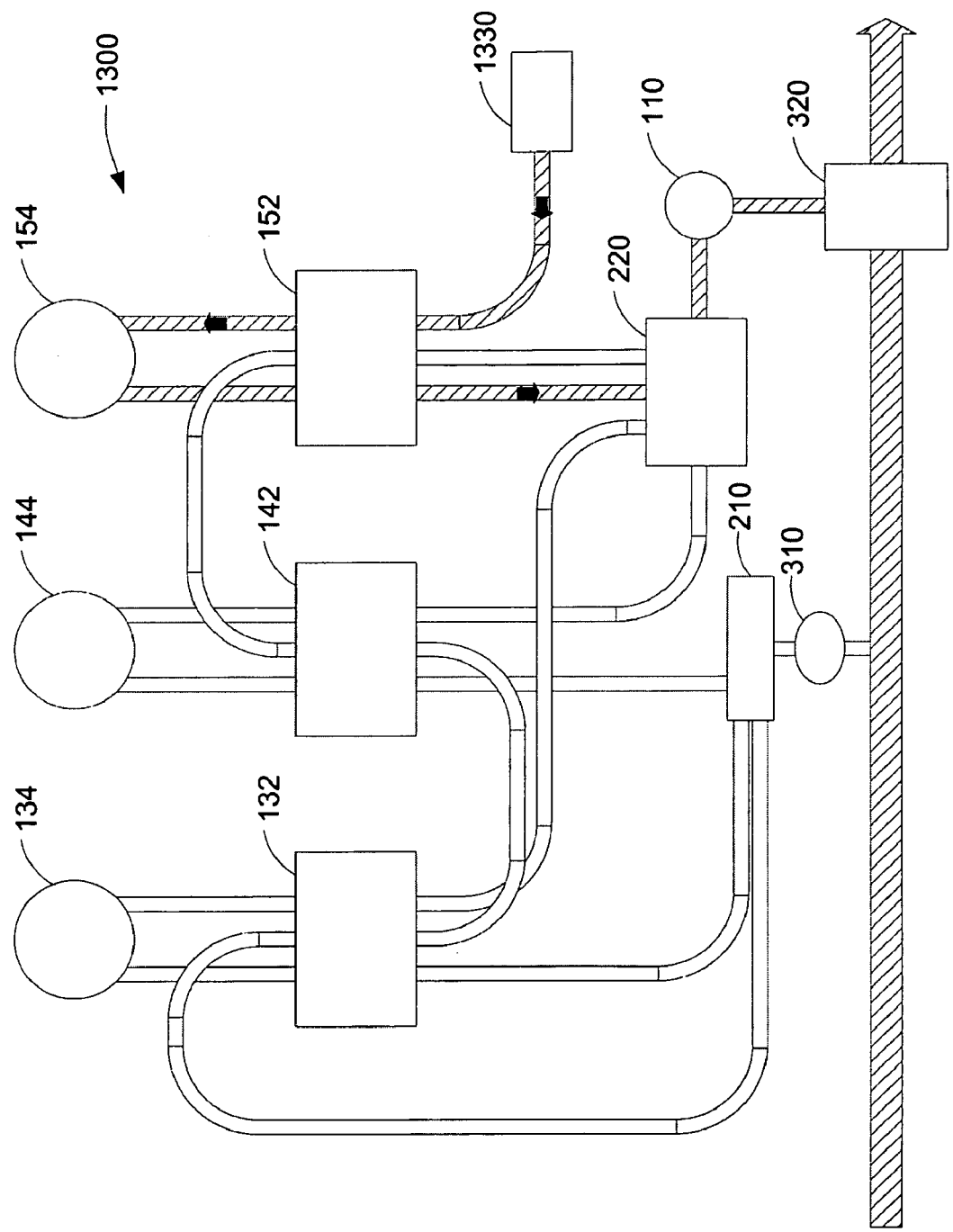
FIG. 29 schematically illustrates a fluid flow pattern for the system during the auto-calibration cycle.

FIG. 29 schematically illustrates a fluid flow pattern for the system 1300 during the auto-calibration cycle. The system 1300 energizes the third valve assembly 152, thereby allowing a gas (e.g., air) to flow from the vent 1330 into the third container 154. In addition, calibrant material is allowed to flow out of the third container 154, through the vacuum manifold 220 and across the sensor electrodes 1143, 1144, 1160, 1170, through the venturi tee 320, to the water feature. The air from the vent 1330 provides pressure to allow the flow of calibrant material from the third container 154. In certain embodiments, the third valve assembly 152 also halts the flow of water from the pressure manifold 210 to the vacuum manifold 220 schematically illustrated by FIG. 20B. In certain other embodiments in which allowing the calibrant material to enter the water feature may be undesirable, the calibrant material is not introduced into the water feature, but is discharged to a waste line.

In certain embodiments, a check valve of the third valve assembly 152 between the vent 1330 and the third container 154 advantageously prevents excessive exposure of the calibrant material to air, which could otherwise degrade the stability of the calibrant material or could otherwise lead to contamination of the calibrant material by microorganisms. In certain embodiments, the system 1300 comprises a check valve between the outlet of the third container 154 and the third valve assembly 152. This check valve can advantageously prevent backflow and contamination of the calibrant material within the third container 154 in the event that the third valve assembly 152 is energized without a reduced pressure in the vacuum manifold 220 or other system malfunction.

In certain embodiments, the third valve assembly 152 is energized for a predetermined period of time (e.g., 15 seconds, 20 seconds, or between approximately 5 seconds and approximately 30 seconds). The period of time of certain embodiments is variable by the controller 120 to provide sufficient calibrant material for the auto-calibration cycle. The period of time of certain embodiments is also variable to take into account the depletion of the calibrant material in the third container 154. In certain embodiments, the third valve assembly 152 is not energized until a predetermined amount of time (e.g., one minute) has elapsed since the latest addition of acidic material or sanitizing agent material to the water feature.

In certain embodiments, the system 1300 monitors whether the third container 154 contains calibrant material or whether the third container 154 needs to be replaced or replenished. In certain embodiments, the controller 120 tracks the number of cycles in which calibrant material is added to the water feature to determine whether the calibrant material needs to be replenished. Certain other embodiments utilize a level switch, a float switch, a conductivity sensor, or another type of liquid sensor in the third container 154 to detect when the calibrant material is depleted. Certain other embodiments utilize a paddle wheel flow sensor coupled to the outlet of the third container 154 to monitor the depletion of the calibrant material. If the calibrant material is below a predetermined level, the controller 120 generates a "Fill Calibrant" error signal which is sent to the display 1320. The system 1300 does not perform an auto-calibration cycle under this error condition.

Figure 30:
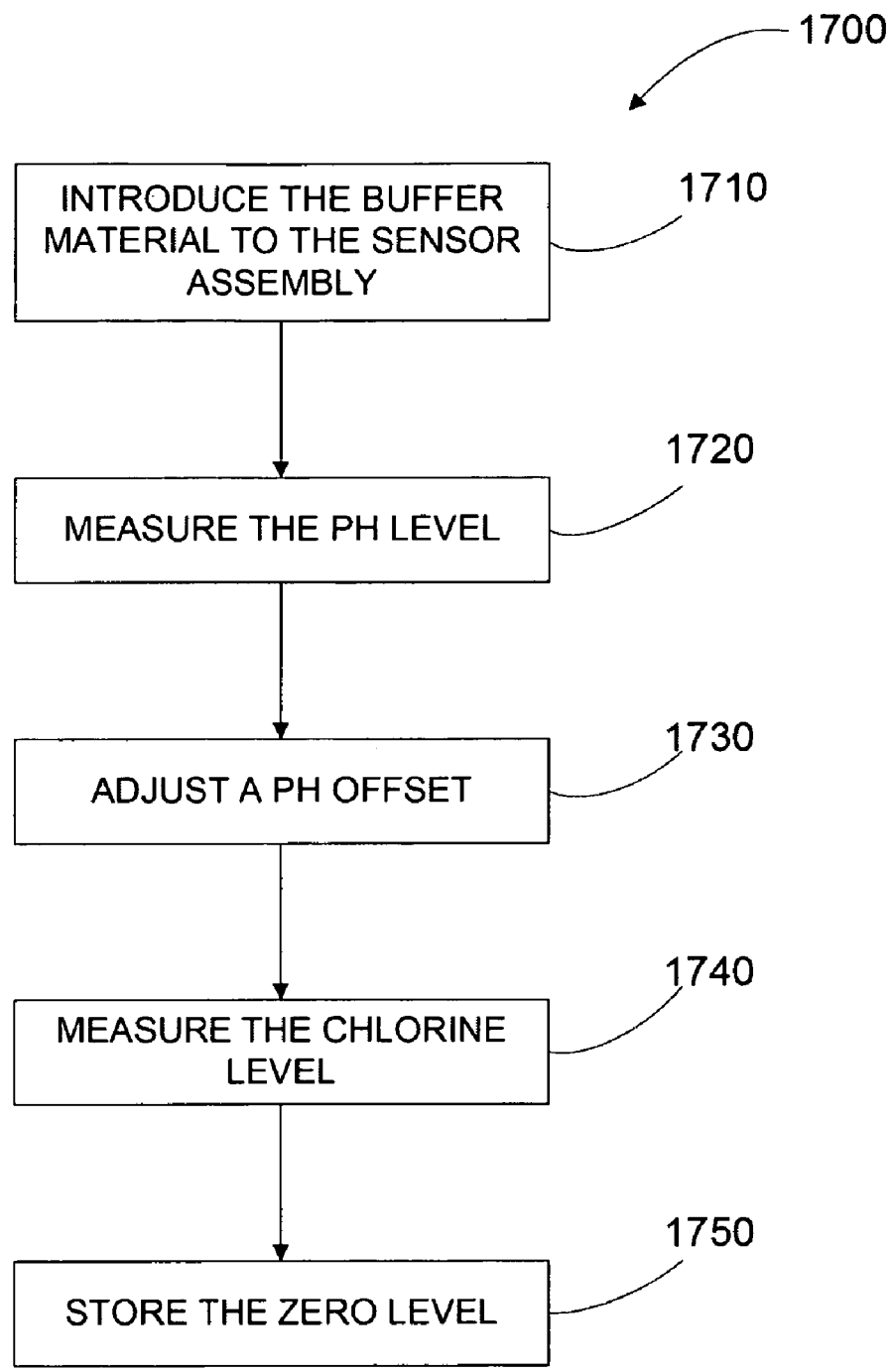
FIG. 30 is a flow diagram of an exemplary auto-calibration cycle compatible with embodiments described herein.

FIG. 30 is a flow diagram of an exemplary auto-calibration cycle 1700 compatible with embodiments described herein. In an operational block 1710, the calibrant material is introduced to the sensor assembly 110. In an operational block 1720, the pH sensor 1140 measures the pH level of the calibrant material. In an operational block 1730, the controller 120 adjusts a pH offset so that the measured pH level is adjusted to equal the predetermined pH level of the calibrant material (e.g., 7.0). In certain embodiments, after adjusting the calibration of the pH sensor 1140, the pH offset is stored in memory. If the pH offset is outside a predetermined range, the controller 120 transmits a "pH Sensor Error" signal to the display 1320 and shuts down the system 1300.

In certain embodiments, a single-point calibration is performed using a single calibrant material. In certain other embodiments, the system 1300 further comprises a fourth container with a second calibrant material which is used to provide an additional calibration point to characterize the response of the pH sensor 1140 to the pH of the fluid being measured.

The zero or blank level of some sanitizing agent sensors can change over the life of the sensor, such that the sensor exhibits some current even when no sanitizing agent material is present. This condition can get worse over the lifetime of the sensor due to improper operational dynamics (e.g., operation of the sensor without fluid flow). This excess current can be interpreted by the controller 120 as a higher sanitizing agent level than is actually present.

Previous calibration schemes for the sanitizing agent sensor have been cumbersome and time-consuming. Chlorine standardizing solutions have a limited shelf life, must be prepared under controlled conditions, and must be refrigerated until used. Other surrogates, such as iodine/iodate, have previously been used but have stability problems as well.

In embodiments in which the sanitizing agent sensor and the pH sensor 1140 use a common reference electrode, the same changes that occur in the reference electrode of the pH sensor 1140 also affect the sanitizing agent sensor. In addition, surface changes of the sanitizing agent sensor can change the sensitivity of the sanitizing agent sensor. Therefore, certain embodiments advantageously perform the auto-calibration cycle 1700 in situ. In certain embodiments in which the third container 154 comprises an electrolytic cell which generates chlorine on a regular basis, the calibrant material is also used to calibrate the sanitizing agent sensor whenever the pH sensor 1140 is calibrated.

In certain embodiments, the auto-calibration cycle 1700 further comprises calibration of the amperometric sensor 1310, or other sanitizing agent sensor of the system 1300 to correct for changes of the zero level. In an operational block 1740, the amperometric sensor 1310 measures the sanitizing agent level of the calibrant material. In embodiments in which the calibrant material does not contain a significant concentration of the sanitizing agent material (e.g., contains no chlorine), the measured chlorine level is used to define a zero level for the amperometric sensor 1310. The zero level is then stored in memory in the operational block 1750 and is used to calculate the actual chlorine level by subtraction of the zero level from the measured chlorine level. By performing the auto-calibration cycle 1700 at various times, certain embodiments advantageously calibrate the changing zero level from the measured sanitizing agent level. Certain embodiments advantageously provide chlorine calibration alone, pH calibration alone, a combination of chlorine and pH calibration, or a combination of chlorine, pH, and TDS calibration.

Figure 31:
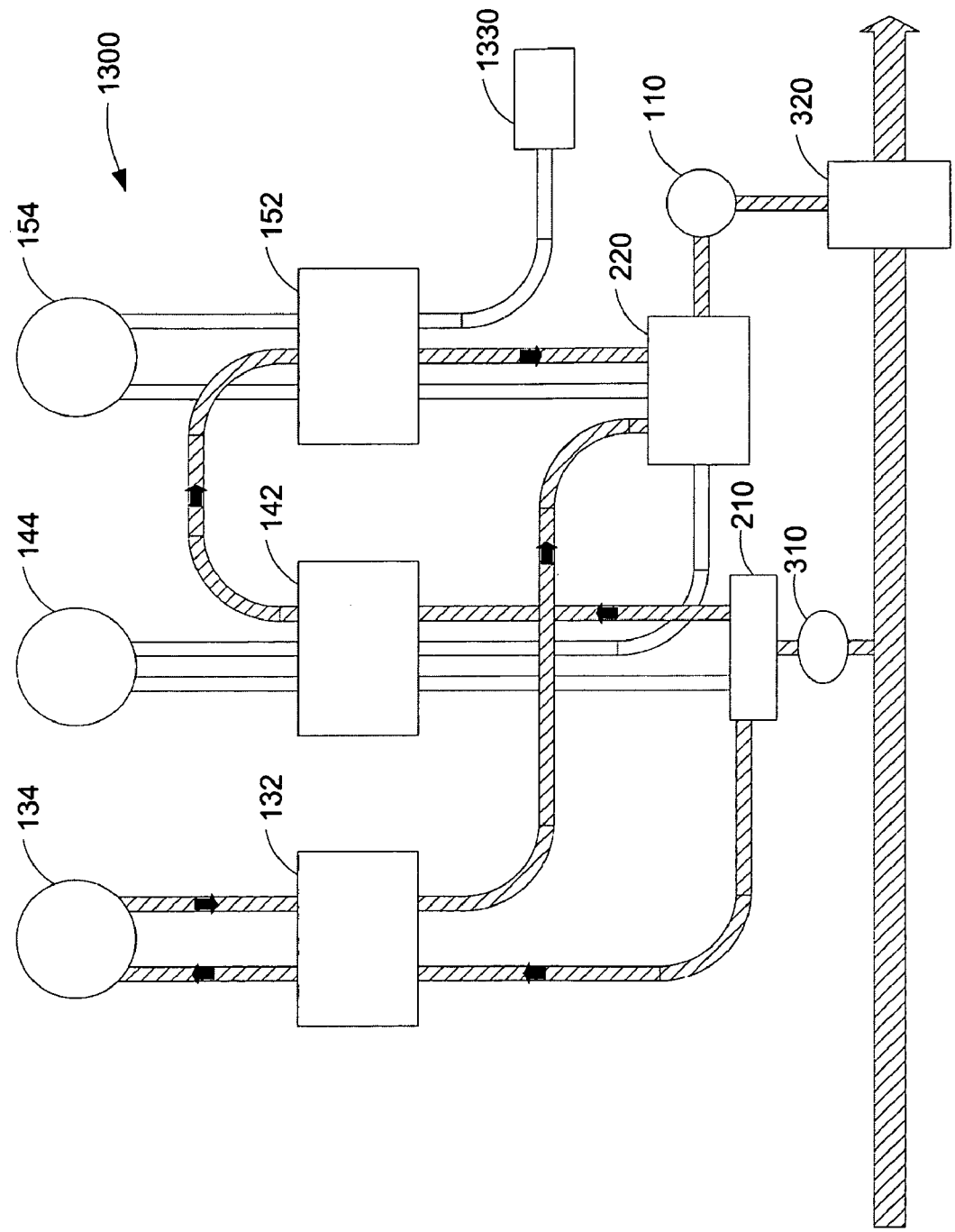
FIG. 31 schematically illustrates another configuration of the system which allows partial mixing compatible with certain embodiments described herein.

FIG. 31 schematically illustrates another configuration of the system 1300 which allows partial mixing compatible with certain embodiments described herein. In the configuration of FIG. 31, when the system 1300 is adding pH-modifying material to the water feature, there are two flow paths of water through the system 1300. In a first flow path, water flows from the water feature, through the flow sensor 310, through the pressure manifold 210, through the first valve assembly 132, through the third valve assembly 152, through the vacuum manifold 210, through the sensor assembly 210, through the venturi tee 320, to return to the water feature. In a second flow path, water flows from the water feature, through the flow sensor 310, through the pressure manifold 210, through the second valve assembly 142, into the second container 144 where the water mixes with the pH-modifying material, out of the second container 144, through the second valve assembly 142, through the vacuum manifold 220, through the sensor assembly 110, through the venturi tee 320, to return to the water feature. In certain embodiments, water flows through the first flow path and the second flow path substantially simultaneously. Certain such embodiments advantageously allow partial mixing of the water in the second flow path (i.e., water having pH-modifying material coming from the second container 144) with water in the first flow path. Other configurations of the system 1300 advantageously allow partial mixing of water having sanitizing agent material and water in the first flow path.

Figure 32:
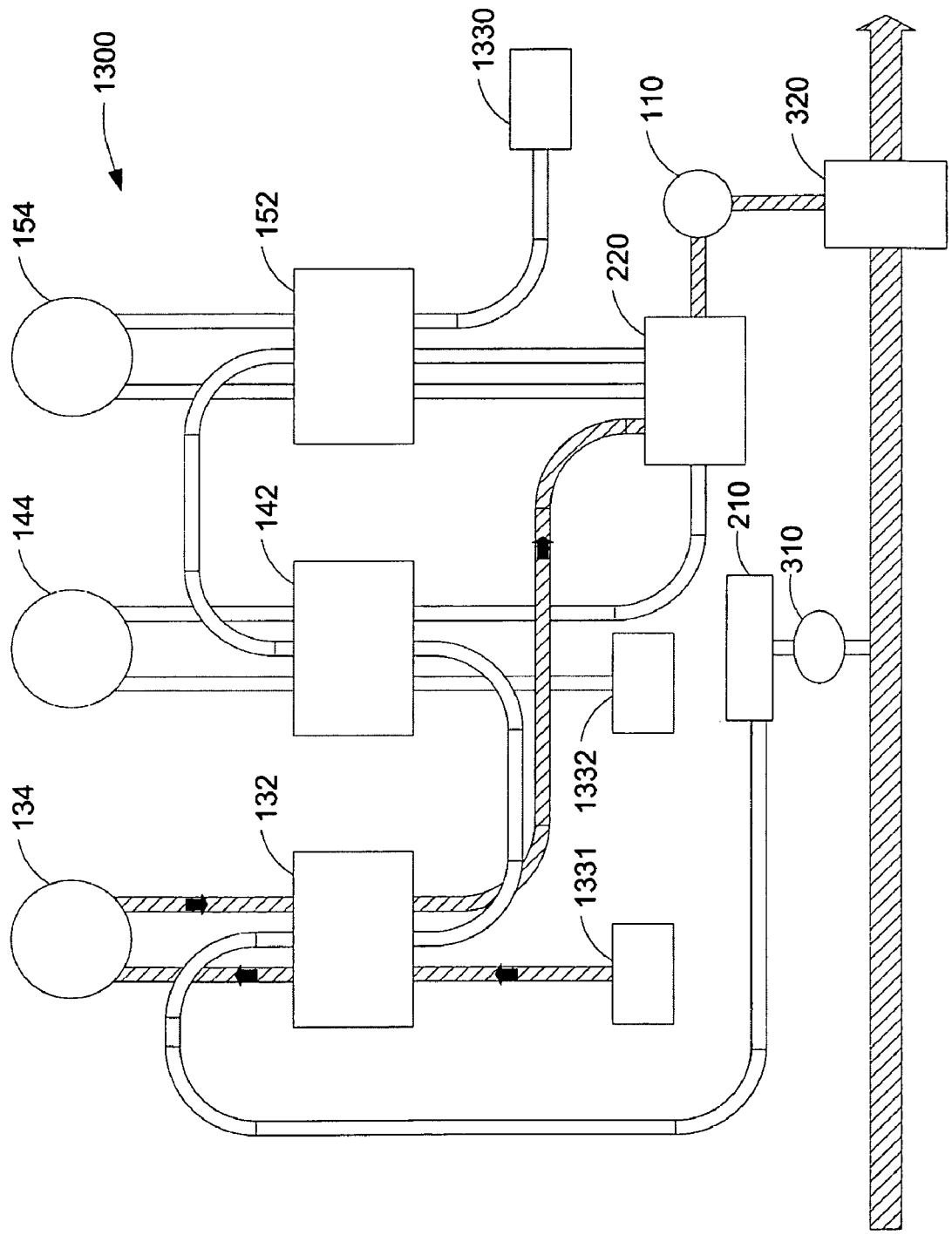
FIG. 32 schematically illustrates another configuration of the system which utilizes liquid sanitizing agent material and liquid pH-modifying material.

FIG. 32 schematically illustrates another configuration of the system 1300 which utilizes liquid sanitizing agent material and liquid pH-modifying material. The first container 134 is fluidly coupled to a first vent 1331 through the first valve assembly 132. The second container 144 is fluidly coupled to a second vent 1332 through the second valve assembly 142. In a manner similar to that described above in relation to the introduction of liquid calibrant material from the third container 154 using the third valve assembly 152 and a vent 1330, the system 1300 of FIG. 32 introduces either liquid pH-modifying material or liquid sanitizing agent material into the water feature. Other configurations are compatible with other combinations of a liquid pH-modifying material, a dry chemical pH-modifying material, a liquid sanitizing agent material, and a dry chemical sanitizing agent material.

In certain embodiments, additional chemical materials may be added to the water feature in the same manner as described herein. For example in embodiments in which a pH-reducing sanitizing agent material (e.g., trichlor tablets) is used, a source of soda ash may be introduced using a source comprising a container having soda ash and a valve assembly. Chemical materials which can be added include, but are not limited to, an alkaline material, a biocide material, an oxidizer material, a clarifier material, an enzyme material, and a fragrance material. In certain such embodiments, these other chemical materials are advantageously added to the water feature after the sensor assembly 110 to avoid coating or contaminating the sensor electrodes with these chemical materials.

Certain embodiments described herein advantageously provide at least one of the sanitizing agent material, the pH-modifying material, and the calibrant material without the need for pumps or complicated deliver mechanisms. Other certain embodiments provide one or more of the following advantages: automatic calibration, use with an ozone venturi, fail-safe operation, no corrosive gases are vented, maintenance-free, unattended operation for months or longer, verification of measurements for pH levels and chlorine levels, low cost, simplicity, and use of equipment already present in many water features, and capable of being retrofitted to existing water features.

Jetted or whirlpool tubs develop biofilms in the plumbing components with repeated use and without performing sanitization. Users are generally instructed to add bleach after usage, to circulate the water, and to then drain the tub. However, in practice, few users take the time to perform this sanitization process. Certain embodiments described herein can be used to advantageously provide a simple-to-use sanitization process for such tubs. One such embodiment uses a container filled with salt and having an electrolytic cell. The container would fill by gravity when the tub was filled with water and would immediately begin to generate chlorine while the tub was in use. After the user exits the tub, the user would activate a circuit which would open a valve assembly which would allow the chlorine solution to enter the plumbing through one or more of the bath jets. The air line to one jet would be normally open, then closed during the sanitization process. The water would be circulated for a period of time, after which the user would drain the tub. The use of salt in certain such embodiments advantageously provides ease-of-use and advantageously eliminates the need for handling chemicals.

In certain other embodiments, a two-tube pinch valve system is used with a chlorine container and a timed release following usage. After usage, the user can press a button which would activate a sanitization cycle which would release chlorine into the whirlpool bath with the circulating jets on to sanitize the plumbing. In certain embodiments, the chlorine cycles would increase as the chlorine in the container is depleted. Certain such embodiments would not have a chlorine sensor, while certain other embodiments would have a chlorine sensor. In another embodiment, trichlor tablets are used.

In certain embodiments, a timed control for introducing chemicals into the water feature is used rather than a response to chemical levels as measured by sensors. In certain such embodiments, a cycle for dispensing the chemical materials into the water is started in response to user input (e.g., pressing a button). In other embodiments, the cycles are scheduled and performed in response to clock signals. Certain such embodiments can be used with hot tubs and to dispense various chemicals (e.g., $H_2O_2$ oxidizer shock and/or biguanide, chlorine, acid). Certain such embodiments also comprise an electrolytic cell which can be used to increase the pH level of the water, since electrolysis in spas generally causes the pH level to rise.

When used with a swimming pool, certain embodiments utilize the suction and return ports from a pump rather than from a venturi tee. The pressure differential of the high and low pressures of the pump serve as the pressure and vacuum of the embodiments described above. In addition, certain embodiments when used with a swimming pool advantageously use a one-way valve to dispense the pH-modifying material.

Various embodiments have been described herein. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A sensor assembly for sensing a chemical level in water of a water feature, the sensor assembly comprising:
   a pH sensor; and
   a sanitizing agent sensor, wherein:
      the pH sensor and the sanitizing agent sensor share a common reference electrode;
      the sanitizing agent sensor comprises an amperometric sensor, the amperometric sensor comprising a working electrode and an auxiliary electrode; and
      the pH sensor comprises a ground, the assembly comprising circuitry such that the ground is selectively decoupled from a system ground and is selectively coupled to the auxiliary electrode during pH measurements.

2. The sensor assembly of claim 1, wherein the pH sensor is removably coupled to the sensor assembly.

3. The sensor assembly of claim 1, further comprising a memory device which stores information regarding at least one of the pH sensor and the sanitizing agent sensor.

4. The sensor assembly of claim 3, wherein the memory device comprises an electrically-erasable programmable read-only memory device.

5. The sensor assembly of claim 1, further comprising a temperature sensor.

6. The sensor assembly of claim 1, wherein the pH sensor is a combination pH sensor comprising a pH-sensitive electrode and a reference junction electrically coupled to the common reference electrode.

7. The sensor assembly of claim 1, wherein the common reference electrode is a double-junction reference electrode.

\* \* \* \* \*